(12) United States Patent
D'Imporzano et al.

(10) Patent No.: US 8,306,845 B2
(45) Date of Patent: Nov. 6, 2012

(54) CONSUMER AND SHOPPER ANALYSIS SYSTEM

(75) Inventors: Angelo D'Imporzano, Milan (IT); Davide Olivieri, Rome (IT); Francesco Trainiti, Milan (IT); Massimiliano Parri, Bientina (IT)

(73) Assignee: Accenture Global Services Limited, Dublin (IE)

( * ) Notice: Subject to any disclaimer, the term of this patent is extended or adjusted under 35 U.S.C. 154(b) by 429 days.

(21) Appl. No.: 12/406,542

(22) Filed: Mar. 18, 2009

(65) Prior Publication Data

US 2009/0307054 A1 Dec. 10, 2009

(30) Foreign Application Priority Data

Jun. 5, 2008 (IT) ................ T02008A0434

(51) Int. Cl.
*G06Q 30/00* (2006.01)
(52) U.S. Cl. ................................ 705/7.29
(58) Field of Classification Search ............ 705/7.29, 705/7.38, 7.39
See application file for complete search history.

(56) References Cited

U.S. PATENT DOCUMENTS

| | | | |
|---|---|---|---|
| 5,555,403 A | 9/1996 | Cambot et al. | |
| 6,247,008 B1 | 6/2001 | Cambot et al. | |
| 6,289,352 B1 | 9/2001 | Proctor | |
| 6,490,593 B2 | 12/2002 | Proctor | |
| 6,578,027 B2 | 6/2003 | Cambot et al. | |
| 2002/0184043 A1* | 12/2002 | Lavorgna et al. | 705/1 |
| 2003/0033179 A1* | 2/2003 | Katz et al. | 705/7 |
| 2005/0262059 A1 | 11/2005 | White | |
| 2006/0080156 A1* | 4/2006 | Baughn et al. | 705/7 |
| 2006/0085255 A1* | 4/2006 | Hastings et al. | 705/14 |
| 2006/0184414 A1* | 8/2006 | Pappas et al. | 705/10 |
| 2006/0242035 A1 | 10/2006 | Corbett et al. | |
| 2007/0022026 A1 | 1/2007 | Davidson et al. | |
| 2007/0118419 A1 | 5/2007 | Maga et al. | |

(Continued)

FOREIGN PATENT DOCUMENTS

EP 1736899 A2 12/2006

OTHER PUBLICATIONS

Brochure for "Consumer Packaged Goods: Consumer Value Management in a Box," 2007 Accenture, pp. 1-12.*

(Continued)

*Primary Examiner* — Jonathan G Sterrett
(74) *Attorney, Agent, or Firm* — Brinks Hofer Gilson & Lione

(57) ABSTRACT

Systems and methods are provided for analyzing data sets representing consumer and shopper behavior. A data processing system for analyzing sales of a company's consumer packaged goods includes an interface for receiving master and shipment data from sources internal to a company and sources external to the company. Master data and shipment data are stored on a database. A merge and aggregation component operates on shipment and consumption data to create a unique repository of shopper and consumer data. A transcoding and integration component operates on external and internal master data to create a unified master data repository. A set of analytics and reports use unified master data and shipment/consumption data to support Consumer and Shopper Analysis. A sub set of secondary analysis can be performed, capitalizing the Master Data unification and sell-in and sell-out data integration. Consumer and Shopper analysis are performed for clusters of buyers and key performance indicators (KPIs) are calculated for individual customer or groups of customers.

16 Claims, 50 Drawing Sheets

U.S. PATENT DOCUMENTS

2007/0185746 A1 8/2007 Chieu et al.
2008/0319829 A1* 12/2008 Hunt et al. ............... 705/10

OTHER PUBLICATIONS

MacDonald, A., et al. "Customer Value Management for the Consumer Packaged Goods Industry," Partners: Business Objects and Accenture, Jan. 2005, pp. 1-2.*

Brochure for "Consumer Packaged Goods: Consumer Value Management in a Box," 2007 Accenture, 12 pages.

MacDonald, A., et al.; "Customer Value Management for the Consumer Packaged Goods Industry," *Partners:Business Objects and Accenture*, Jan. 2005, 2 pages.

Pease, Jeffrey; "Customer Value Management: New Techniques for Maximizing the Lifetime Profitability of your Customer Base," White Paper, 2001 Business Objects, 12 pages; www.businessobjects.com/pdf/solutions/white_paper_cvm_new_techniques.pdf.

DAMA Presentation Genentech Customer Master Experience, Aug. 2005, printed from the Internet at http://sfdama.org/Presentations/Genentech_Customer_Master_Experience.pdf, 24 pages.

Microsoft, XML for Analysis Specification, version 1.0, 72 pp., Apr. 24, 2001.

Application as filed Jan. 28, 2011 for U.S. Appl. No. 13/016,795.

European Search Report from EP Application No. 10425351.3-2201 (parent of U.S. Appl. No. 13/016,795) dated Aug. 5, 2011.

Australian Patent App. No. 2009202218, Patent Examination Report No. 2, dated Aug. 21, 2012.

Haley, Russell I., Benefit Segmentation: A Decision-oriented Research Tool, Journal of Marketing, vol. 32 (Jul. 1968), pp. 30-35 (retrieved from http://ravi-shanker.com/courseoutline/marketingmanagement/Resources/READINGS/Reading%208%20%20Benefit%20Segmentation%20A%20Decision%20Oriented%20Research%20Tool.pdf on Sep. 17, 2012).

* cited by examiner

Fig. 9b

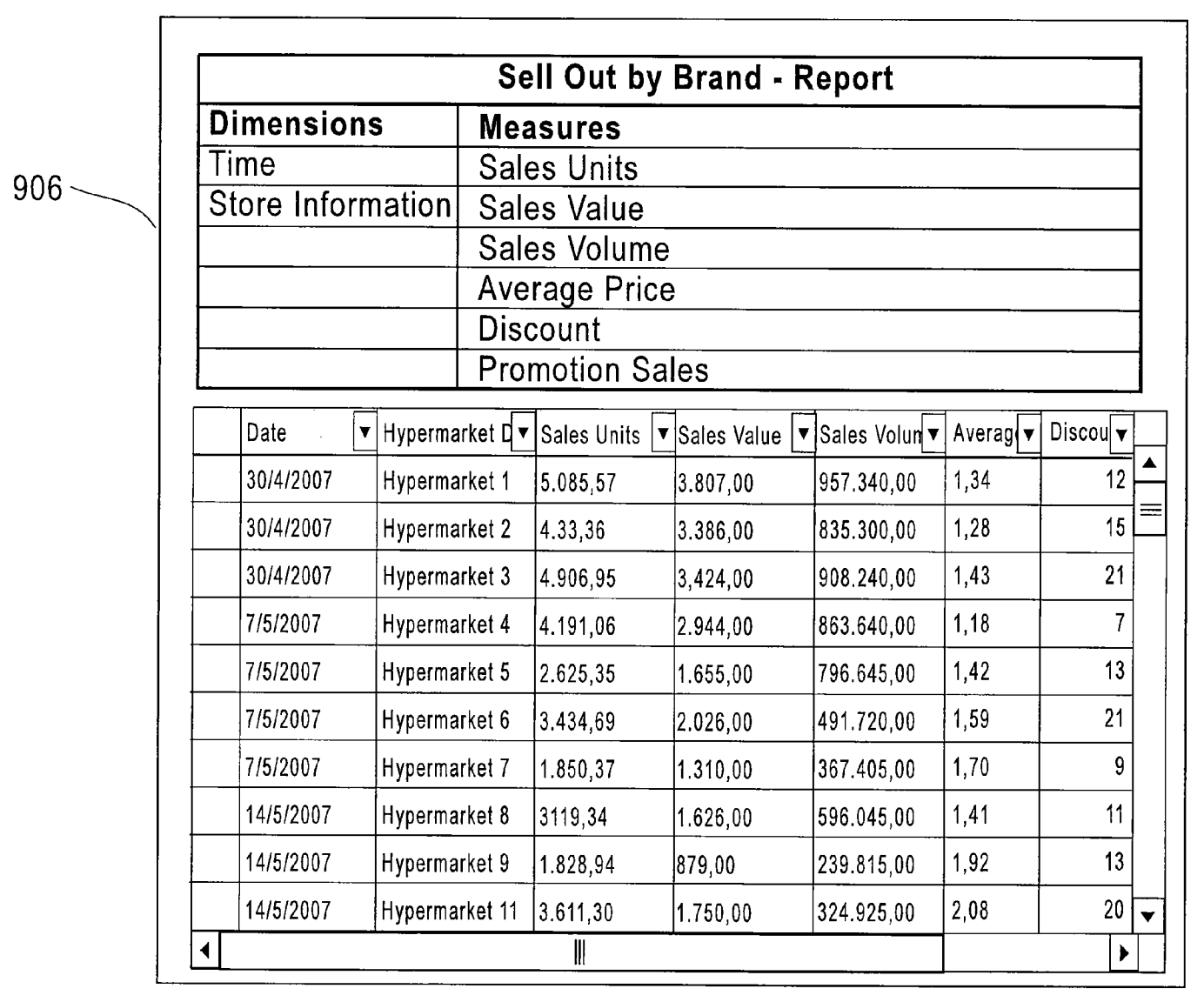

| Dimensions | Measures | Sell Out by Brand - Report | | | | |
|---|---|---|---|---|---|---|
| Time | Sales Units | | | | | |
| Store Information | Sales Value | | | | | |
| | Sales Volume | | | | | |
| | Average Price | | | | | |
| | Discount | | | | | |
| | Promotion Sales | | | | | |

| Date ▼ | Hypermarket ▼ | Sales Units ▼ | Sales Value ▼ | Sales Volum ▼ | Averag ▼ | Discou ▼ |
|---|---|---|---|---|---|---|
| 30/4/2007 | Hypermarket 1 | 5.085,57 | 3.807,00 | 957.340,00 | 1,34 | 12 |
| 30/4/2007 | Hypermarket 2 | 4.33,36 | 3.386,00 | 835.300,00 | 1,28 | 15 |
| 30/4/2007 | Hypermarket 3 | 4.906,95 | 3.424,00 | 908.240,00 | 1,43 | 21 |
| 7/5/2007 | Hypermarket 4 | 4.191,06 | 2.944,00 | 863.640,00 | 1,18 | 7 |
| 7/5/2007 | Hypermarket 5 | 2.625,35 | 1.655,00 | 796.645,00 | 1,42 | 13 |
| 7/5/2007 | Hypermarket 6 | 3.434,69 | 2.026,00 | 491.720,00 | 1,59 | 21 |
| 7/5/2007 | Hypermarket 7 | 1.850,37 | 1.310,00 | 367.405,00 | 1,70 | 9 |
| 14/5/2007 | Hypermarket 8 | 3119,34 | 1.626,00 | 596.045,00 | 1,41 | 11 |
| 14/5/2007 | Hypermarket 9 | 1.828,94 | 879,00 | 239.815,00 | 1,92 | 13 |
| 14/5/2007 | Hypermarket 11 | 3.611,30 | 1.750,00 | 324.925,00 | 2,08 | 20 |

906

Fig. 10
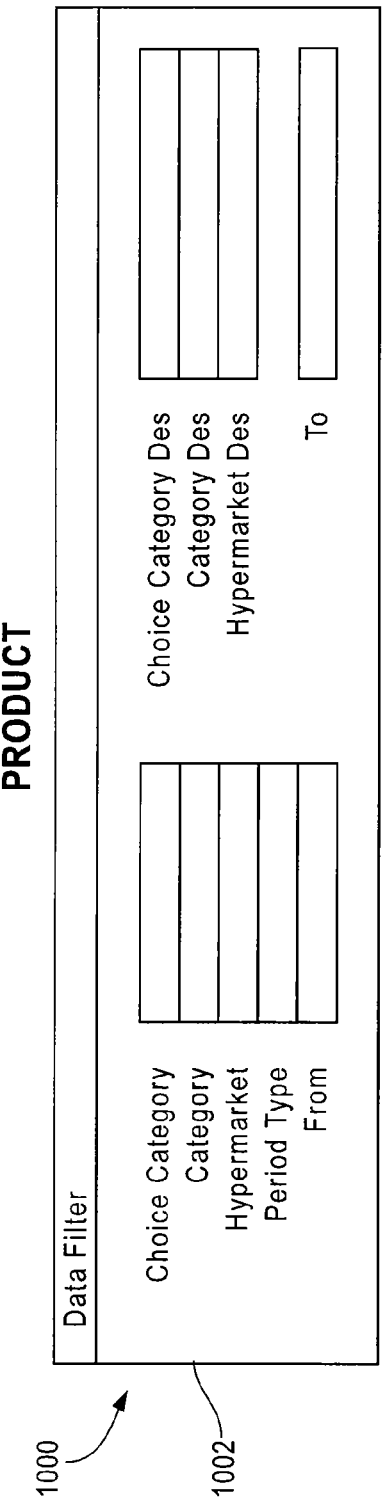
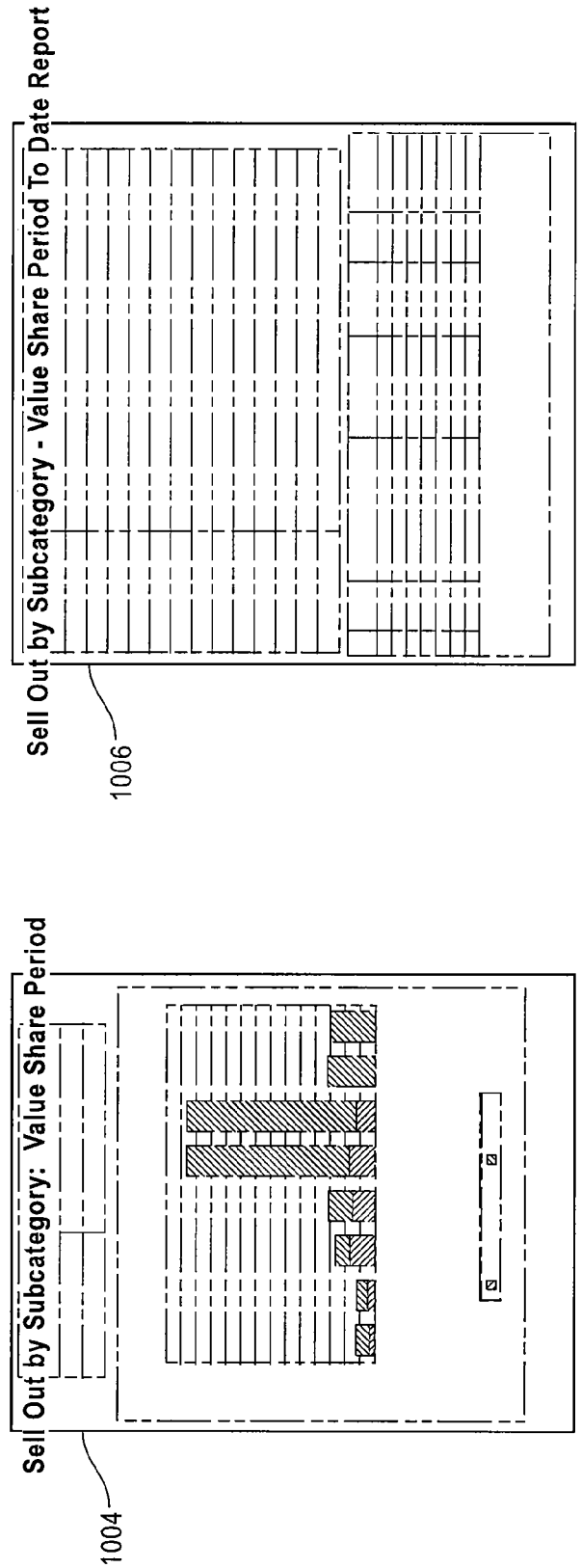

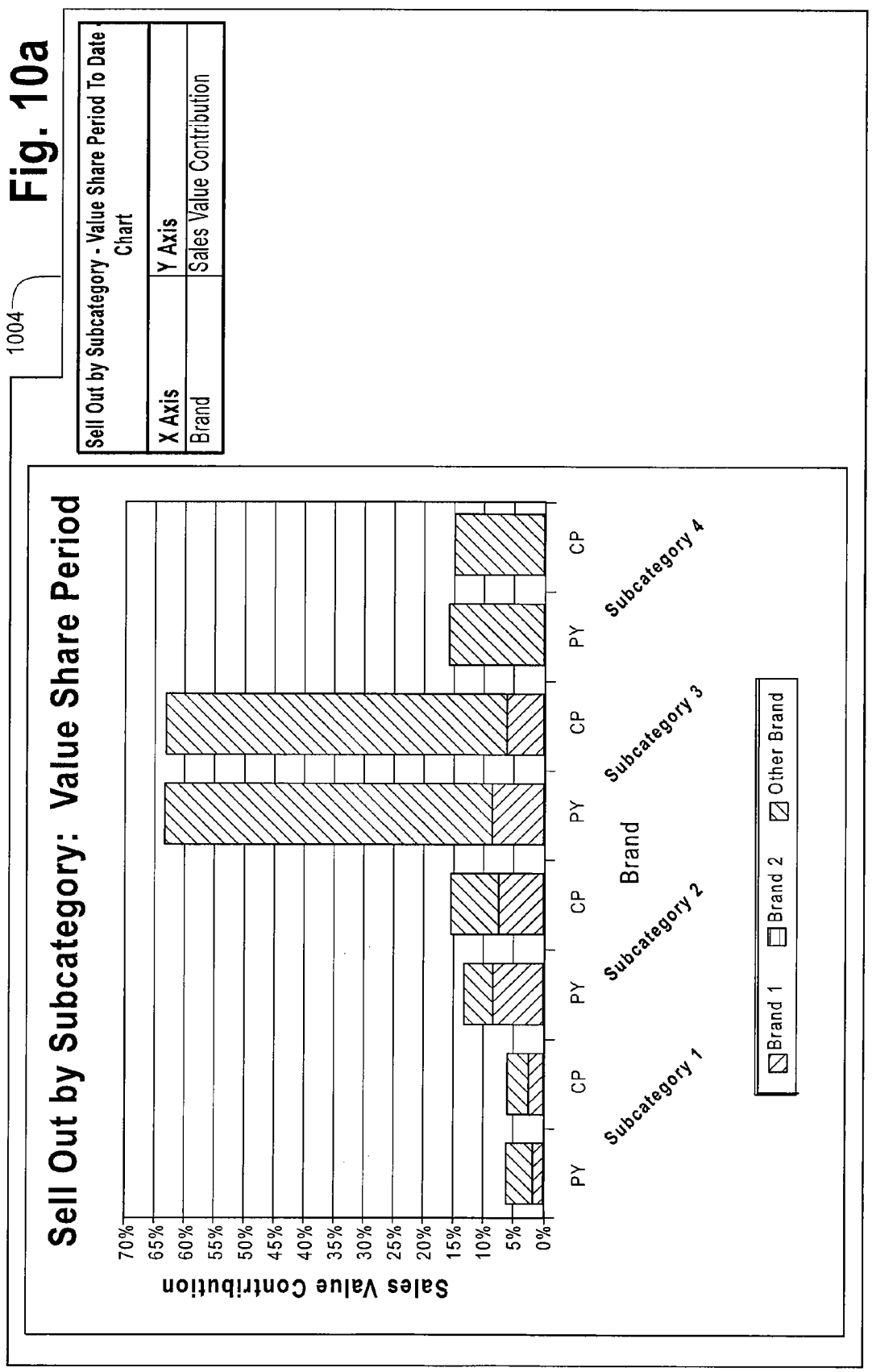

Fig. 10b

Sell Out by Subcategory - Value Share Period To Date Report

| Dimensions | Measures |
|---|---|
| Frequency | Category Sales Value CP |
| Period | % Change Category Sales Value CP |
| Category | Subcategory Sales Value CP |
| Subcategory | % Change Subcategory Sales Value CP |
| Brand | Subcategory Sales Value Contribution to Category |
| Store Information | % Change Subcategory Sales Value Contribution to Category |
| | Brand Sales Value |
| | % Change Brand Sales Value |
| | Brand Sales Value Contribution to Subcategory CP |
| | Brand Sales Value Contribution to Subcategory PY |
| | % Change Brand Sales Value Contribution to Subcategory |
| | Brand Sales Value Contribution to Category CP |
| | % Change Brand Sales Value Contribution to Category |

| Frequency ▼ | Period ▼ | Subcategory Des ▼ | Subcategory ▼ | Brand ▼ | Hypermarket ▼ |
|---|---|---|---|---|---|
| Week | 02/04/2007 - 07/10/2007 | FRESH | Subcategory 1 | Other Brand | Hypermarket 1 |
| Week | 02/04/2007 - 07/10/2007 | FRESH | Subcategory 3 | Other Brand | Hypermarket 2 |
| Week | 02/04/2007 - 07/10/2007 | FRESH | Subcategory 4 | Other Brand | Hypermarket 3 |
| Week | 02/04/2007 - 07/10/2007 | FRESH | Subcategory 2 | Other Brand | Hypermarket 4 |
| Week | 02/04/2007 - 07/10/2007 | FRESH | Subcategory 3 | Brand 1 | Hypermarket 5 |
| Week | 02/04/2007 - 07/10/2007 | FRESH | Subcategory 2 | Brand 1 | Hypermarket 6 |
| Week | 02/04/2007 - 07/10/2007 | FRESH | Subcategory 1 | Brand 1 | Hypermarket 7 |
| Week | 02/04/2007 - 07/10/2007 | FRESH | Subcategory 1 | Brand 2 | Hypermarket 8 |

| Sell Out by Subcategory - Trend Report | |
|---|---|
| Dimensions | Measures |
| Frequency | Category Sales Value CP |
| Period | % Change Category Sales Value CP |
| Category | Subcategory Sales Value CP |
| Subcategory | % Change Subcategory Sales Value CP |
| Brand | Subcategory Sales Value Contribution to Category |
| Store Information | % Change Subcategory Sales Value Contribution to Category |
| | Brand Sales Value |
| | % Change Brand Sales Value |
| | Brand Sales Value Contribution to Subcategory CP |
| | Brand Sales Value Contribution to Subcategory PY |
| | % Change Brand Sales Value Contribution to Subcategory |
| | Brand Sales Value Contribution to Category CP |
| | % Change Brand Sales Value Contribution to Category |

1106

| Frequency ▼ | Period | ▼ | Category | ▼ | Subcategory ▼ | Brand | ▼ | Hypermarket ▼ |
|---|---|---|---|---|---|---|---|---|
| Month | 1/4/2007 | | Frozen Food | | Meats | Other Brand | | Hypermarket 1 |
| Month | 1/5/2007 | | Frozen Food | | Meats | Other Brand | | Hypermarket 2 |
| Month | 1/6/2007 | | Frozen Food | | Meats | Other Brand | | Hypermarket 3 |
| Month | 1/7/2007 | | Frozen Food | | Meats | Other Brand | | Hypermarket 4 |
| Month | 1/8/2007 | | Frozen Food | | Meats | Other Brand | | Hypermarket 5 |

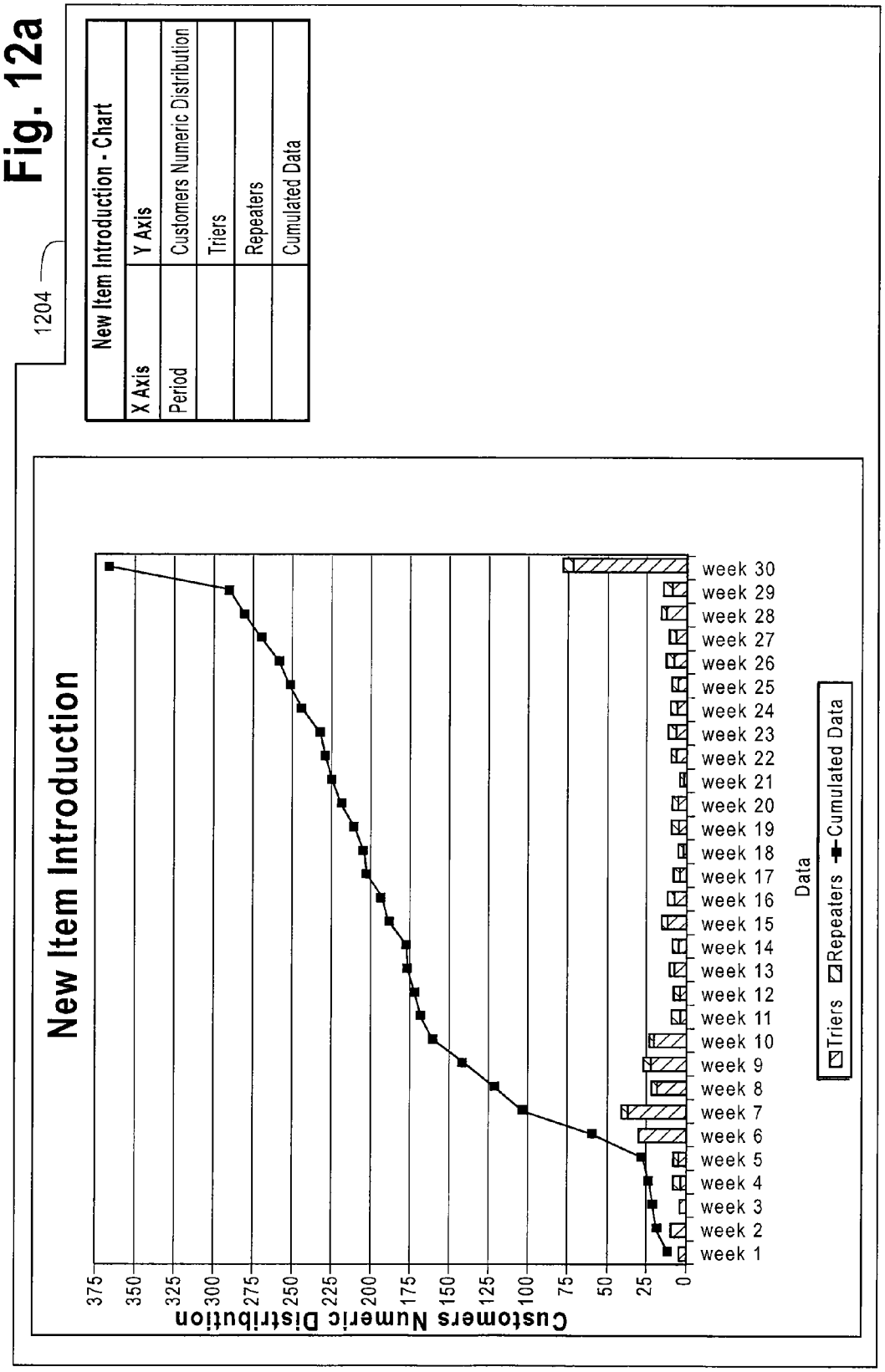

Fig. 12b

New Item Introduction - Report

| Dimensions | Measures |
|---|---|
| Time | Number of Triers |
| Store Information | Triers % |
| EAN | Number of Repeaters |
| | Repeaters % |
| | Number of Customers (Cumulated) |

| Period | Hypermarket D | EAn | Numb | Tries % | Number of R | Repea | Custo |
|---|---|---|---|---|---|---|---|
| 12/2/2007 | Hypermarket 1 | Product | 4 | 100,00 | 1 | 80,00 | 10 |
| 19/2/2007 | Hypermarket 2 | Product | 9 | 100,00 | 1 | 60,00 | 17 |
| 5/3/2007 | Hypermarket 3 | Product | 4 | 80,00 | 3 | 72,34 | 24 |
| 12/3/2007 | Hypermarket 4 | Product | 5 | 62,50 | 5 | 62,50 | 26 |
| 19/3/2007 | Hypermarket 5 | Product | 7 | 77,70 | 4 | 97,00 | 60 |
| 26/3/2007 | Hypermarket 6 | Product | 34 | 77,32 | 3 | 100,00 | 105 |
| 2/4/2007 | Hypermarket 7 | Product | 40 | 97,00 | 2 | 77,70 | 124 |
| 9/4/2007 | Hypermarket 8 | Product | 16 | 92,45 | 3 | 80,00 | 140 |

1206

Fig. 13
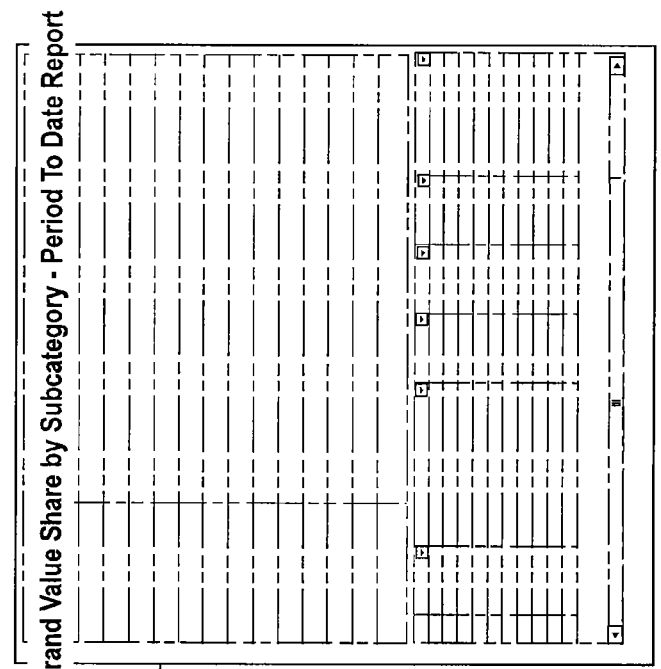
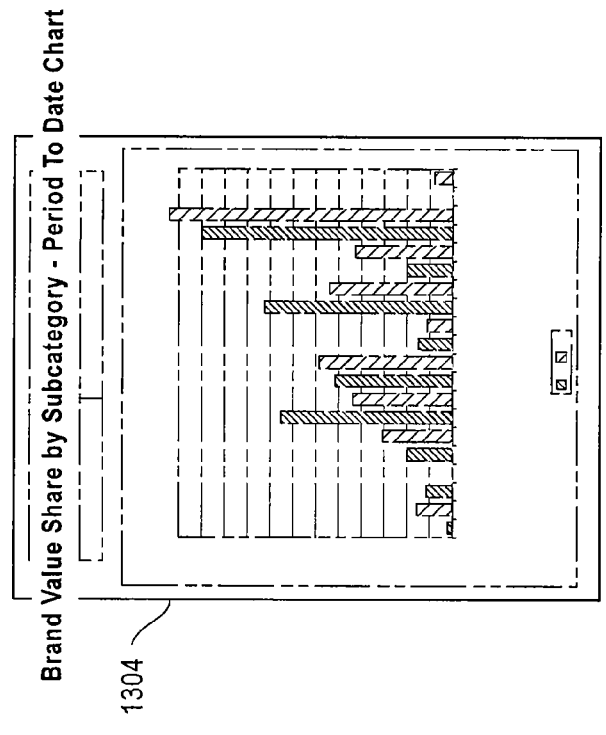

Fig. 13b

Brand Value Share by Subcategory - Period To Date Report

| Dimensions | Measures |
|---|---|
| Frequency | Category Sales Value CP |
| Period | % Change Category Sales Value CP |
| Category | Subcategory Sales Value CP |
| Subcategory | % Change Subcategory Sales Value CP |
| Brand | Subcategory Sales Value Contribution to Category |
| Store Information | % Change Subcategory Sales Value Contribution to Category |
| | Brand Sales Value |
| | % Change Brand Sales Value |
| | Brand Sales Value Contribution to Subcategory CP |
| | Brand Sales Value Contribution to Subcategory PY |
| | % Change Brand Sales Value Contribution to Subcategory |
| | Brand Sales Value Contribution to Category CP |
| | % Change Brand Sales Value Contribution to Category |

| Frequency ▼ | Period ▼ | Category ▼ | Subcateg ▼ | Brand ▼ | Hypermarket Des |
|---|---|---|---|---|---|
| Week | 1/3/2007 - 02/10/2007 | Sauce | FRESH | Brand 1255 | Hypermarket 1 |
| Week | 1/3/2007 - 02/10/2007 | Sauce | FRESH | Brand 1277 | Hypermarket 2 |
| Week | 1/3/2007 - 02/10/2007 | Sauce | FRESH | Brand 1287 | Hypermarket 3 |
| Week | 1/3/2007 - 02/10/2007 | Sauce | FRESH | Brand 1292 | Hypermarket 4 |
| Week | 1/3/2007 - 02/10/2007 | Sauce | FRESH | Brand 1303 | Hypermarket 5 |
| Week | 1/3/2007 - 02/10/2007 | Sauce | FRESH | Brand 1315 | Hypermarket 6 |
| Week | 1/3/2007 - 02/10/2007 | Sauce | FRESH | Brand 1316 | Hypermarket 7 |
| Week | 1/3/2007 - 02/10/2007 | Sauce | FRESH | Brand 1317 | Hypermarket 8 |
| Week | 1/3/2007 - 02/10/2007 | Sauce | FRESH | Brand 1 | Hypermarket 9 |
| Week | 1/3/2007 - 02/10/2007 | Sauce | FRESH | Brand 2 | Hypermarket 10 |

Brand Value Share Trend by Subcategory Report

| Dimensions | Measures |
|---|---|
| Frequency | Category Sales Value CP |
| Period | % Change Category Sales Value CP |
| Category | Subcategory Sales Value CP |
| Subcategory | % Change Subcategory Sales Value CP |
| Brand | Subcategory Sales Value Contribution to Category |
| Store Information | % Change Subcategory Sales Value Contribution to Category |
| | Brand Sales Value |
| | % Change Brand Sales Value |
| | Brand Sales Value Contribution to Subcategory CP |
| | Brand Sales Value Contribution to Subcategory PY |
| | % Change Brand Sales Value Contribution to Subcategory |
| | Brand Sales Value Contribution to Category CP |
| | % Change Brand Sales Value Contribution to Category |

| Frequency ▼ | Period | Category ▼ | Subcat ▼ | Brand ▼ | Hypermarket Des ▼ |
|---|---|---|---|---|---|
| Month | 1/1/2007 | FRESH | Gastronor | Brand | Hypermarket 1 |
| Month | 1/2/2007 | FRESH | Gastronor | Brand | Hypermarket 2 |
| Month | 1/3/2007 | FRESH | Gastronor | Brand | Hypermarket 3 |
| Month | 1/4/2007 | FRESH | Gastronor | Brand | Hypermarket 4 |
| Month | 1/5/2007 | FRESH | Gastronor | Brand | Hypermarket 5 |
| Month | 1/6/2007 | FRESH | Gastronor | Brand | Hypermarket 6 |
| Month | 1/7/2007 | FRESH | Gastronor | Brand | Hypermarket 7 |
| Month | 1/8/2007 | FRESH | Gastronor | Brand | Hypermarket 8 |

1406

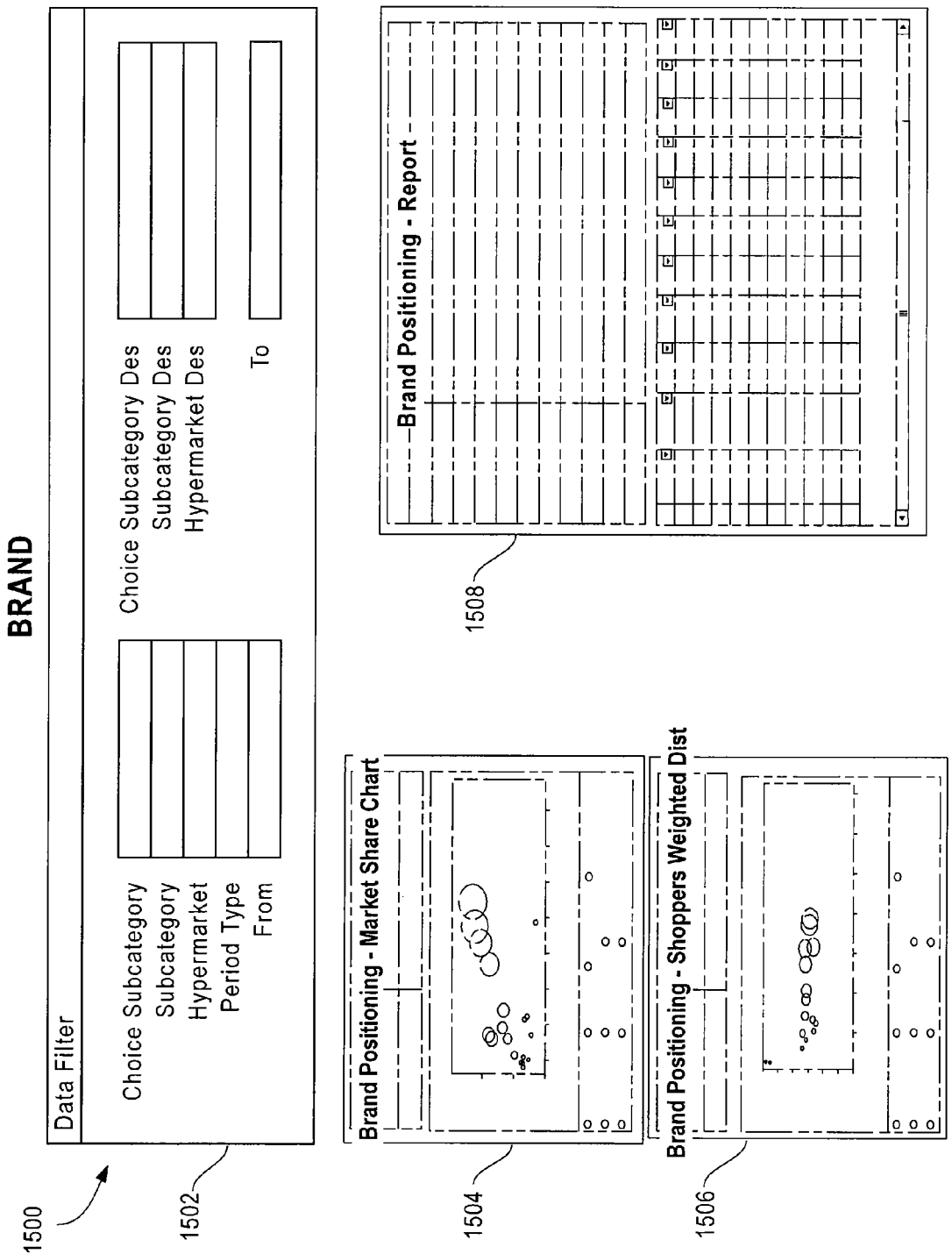

Fig. 15b

Brand Positioning - Report

| Dimensions | Measures |
|---|---|
| Brand | Category Market Share |
| | Category Market Share PP |
| | Weighted Distribution |
| | Weighted Distribution |
| | Market Share |
| | Market Share PP |
| | Relative Penetration |
| | Relative Penetration PP |
| | Purchase Frequency |
| | Purchase Frequency PP |

| Brand ▼ | Category M ▼ | Category ▼ | Weighte ▼ | Weight ▼ | Market ▼ | Market ▼ | Relative ▼ | Relati ▼ | Purcha ▼ | Purcha ▼ |
|---|---|---|---|---|---|---|---|---|---|---|
| BRAND 1287 | 38,90 | 42,11 | 56,09 | 57,64 | 21,82 | 24,27 | 37,05 | 38,41 | 151,40 | 150,07 |
| BRAND | 36,51 | 33,52 | 50,87 | 44,33 | 18,58 | 14,87 | 31,02 | 27,10 | 163,98 | 163,58 |
| BRAND 1317 | 23,71 | 23,17 | 43,76 | 42,33 | 10,38 | 9,81 | 31,78 | 31,21 | 137,69 | 135,62 |
| BRAND 1282 | 24,61 | 27,10 | 32,71 | 32,45 | 8,05 | 8,79 | 20,42 | 20,36 | 160,20 | 159,38 |
| BRAND 1316 | 20,77 | 23,07 | 23,06 | 28,79 | 4,79 | 6,64 | 13,98 | 17,93 | 164,94 | 160,58 |
| BRAND 1255 | 26,24 | 25,82 | 13,60 | 15,63 | 3,57 | 4,04 | 10,07 | 12,21 | 135,02 | 128,04 |
| BRAND 1278 | 19,66 | 20,18 | 17,68 | 12,94 | 3,48 | 2,61 | 12,85 | 7,97 | 137,60 | 162,42 |
| BRAND 1307 | 20,52 | 23,68 | 15,98 | 10,41 | 3,28 | 2,46 | 9,40 | 5,97 | 170,05 | 174,42 |
| BRAND 1301 | 19,16 | 19,18 | 16,73 | 16,84 | 2,21 | 3,23 | 9,69 | 9,62 | 172,65 | 175,03 |
| BRAND 1289 | 39,41 | 39,29 | 7,63 | 6,29 | 2,90 | 2,47 | 2,48 | 2,21 | 296,64 | 284,44 |

Pareto Analysis - Report

| Dimensions | Measures |
|---|---|
| Year | Category % |
| Period | Value % |
| Store Information | Quantity % |
| Subcategory | Volume % |
| Brand | Value PP % |
| | Quantity PP % |
| | Volume PP % |

| Year ▼ | Period ▼ | Hypermarket ▼ | Subcategory ▼ | Brand ▼ |
|---|---|---|---|---|
| 2007 | January - March | Hypermarket | Sauce | Brand |
| 2007 | January - March | Hypermarket | Sauce | Brand |
| 2007 | January - March | Hypermarket | Sauce | Brand |
| 2007 | January - March | Hypermarket | Sauce | Brand |
| 2007 | January - March | Hypermarket | Sauce | Brand |
| 2007 | January - March | Hypermarket | Sauce | Brand |
| 2007 | January - March | Hypermarket | Sauce | Brand |
| 2007 | January - March | Hypermarket | Sauce | Brand |

Joiners, Leavers and Repeaters Customers' Analysis Report

| Dimensions | Measures |
|---|---|
| Year | Stable Customers |
| Period | New Customers |
| | Lost Customers - Brand |
| | Lost Customers - Brand Category |
| | Stable Customers % |
| | New Customers % |
| | RPR |

| Year ▼ | Period ▼ | Hyperm ▼ | Stable ▼ | New Cu ▼ | Lost Cu ▼ | Lost Cu ▼ |
|---|---|---|---|---|---|---|
| 2006 | 4 | All | 7641 | 15746 | 7212 | 7206 |
| 2007 | 1 | All | 8485 | 16465 | 6694 | 8208 |

| Brand Switching - Report | |
|---|---|
| Dimensions | Measures |
| Year | Sales Volume |
| Period | Sales Volume PP |
| Store Information | Sales Volume % |
| Subcategory | Customers Num Distrib |
| Segment | Customers Num Distrib PP |
| | Customers Num Distrib % |

| Period ▼ | Freque ▼ | Year ▼ | Hyperm ▼ | Subcate ▼ | Brand ▼ | Segme ▼ |
|---|---|---|---|---|---|---|
| 1 | Quarterly | 2007 | All | Sauce | Brand | NEW |
| 1 | Quarterly | 2007 | All | Sauce | Brand 1287 | NEW |
| 1 | Quarterly | 2007 | All | Sauce | Brand 1316 | NEW |
| 1 | Quarterly | 2007 | All | Sauce | Brand 1303 | NEW |
| 1 | Quarterly | 2007 | All | Sauce | Brand 1292 | NEW |
| 1 | Quarterly | 2007 | All | Sauce | Brand1317 | NEW |
| 1 | Quarterly | 2007 | All | Sauce | Brand1315 | NEW |
| 1 | Quarterly | 2007 | All | Sauce | Brand1255 | NEW |
| 1 | Quarterly | 2007 | All | Sauce | Brand 2 | NEW |

1806

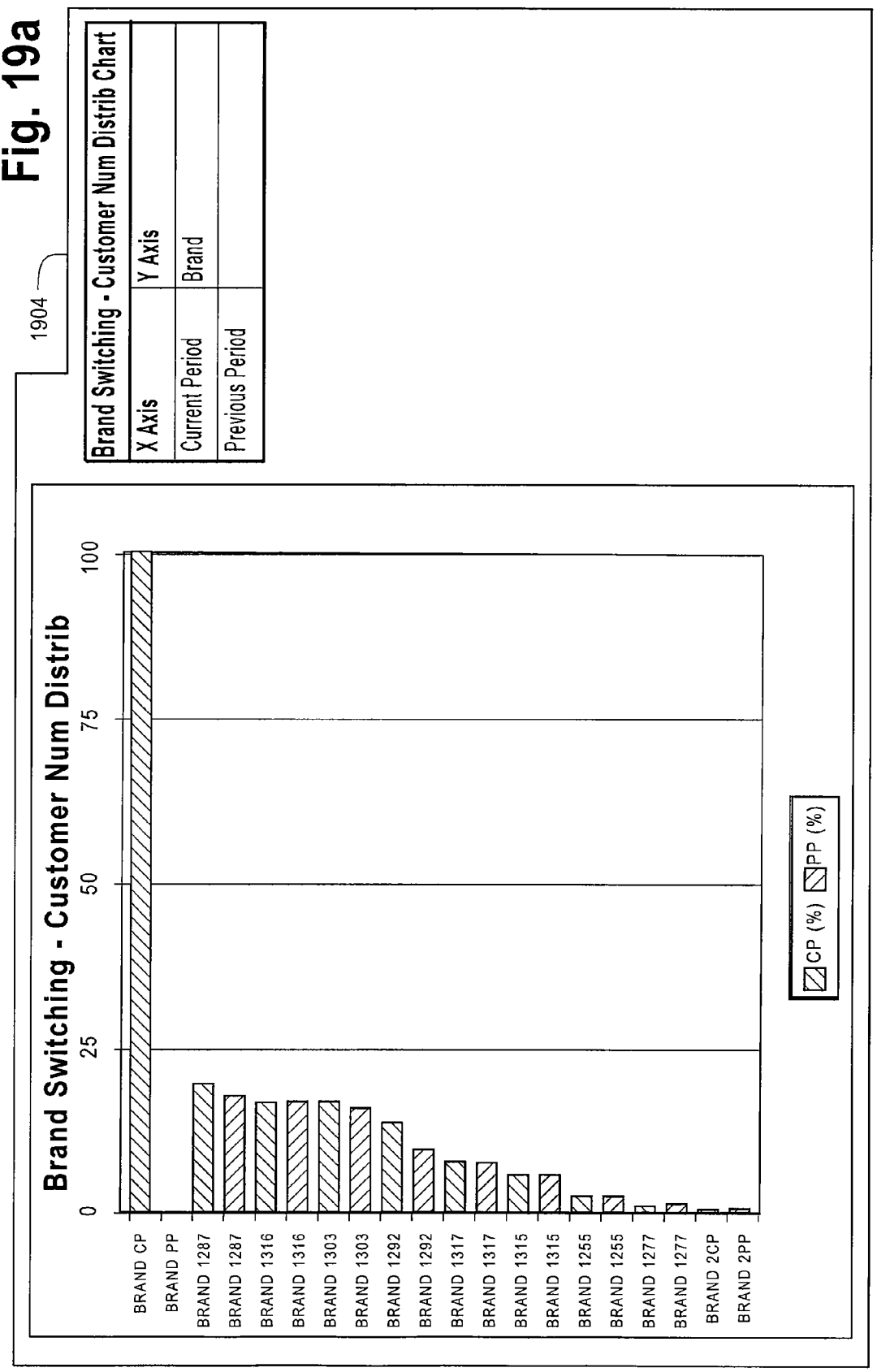

Fig. 19b

Brand Switching - Report

| Dimensions | Measures |
|---|---|
| Year | Sales Volume |
| Period | Sales Volume PP |
| Store Information | Sales Volume % |
| Subcategory | Customers Num Distrib |
| Segment | Customers Num Distrib PP |
| | Customers Num Distrib % |

| Period ▼ | Frequel ▼ | Year ▼ | Hyperm ▼ | Subcate ▼ | Brand ▼ | Segme ▼ |
|---|---|---|---|---|---|---|
| 1 | Quarterly | 2007 | All | Sauce | Brand | NEW |
| 1 | Quarterly | 2007 | All | Sauce | Brand 1287 | NEW |
| 1 | Quarterly | 2007 | All | Sauce | Brand 1316 | NEW |
| 1 | Quarterly | 2007 | All | Sauce | Brand 1303 | NEW |
| 1 | Quarterly | 2007 | All | Sauce | Brand 1292 | NEW |
| 1 | Quarterly | 2007 | All | Sauce | Brand1317 | NEW |
| 1 | Quarterly | 2007 | All | Sauce | Brand1315 | NEW |
| 1 | Quarterly | 2007 | All | Sauce | Brand1255 | NEW |
| 1 | Quarterly | 2007 | All | Sauce | Brand 2 | NEW |

1906

Fig. 20a
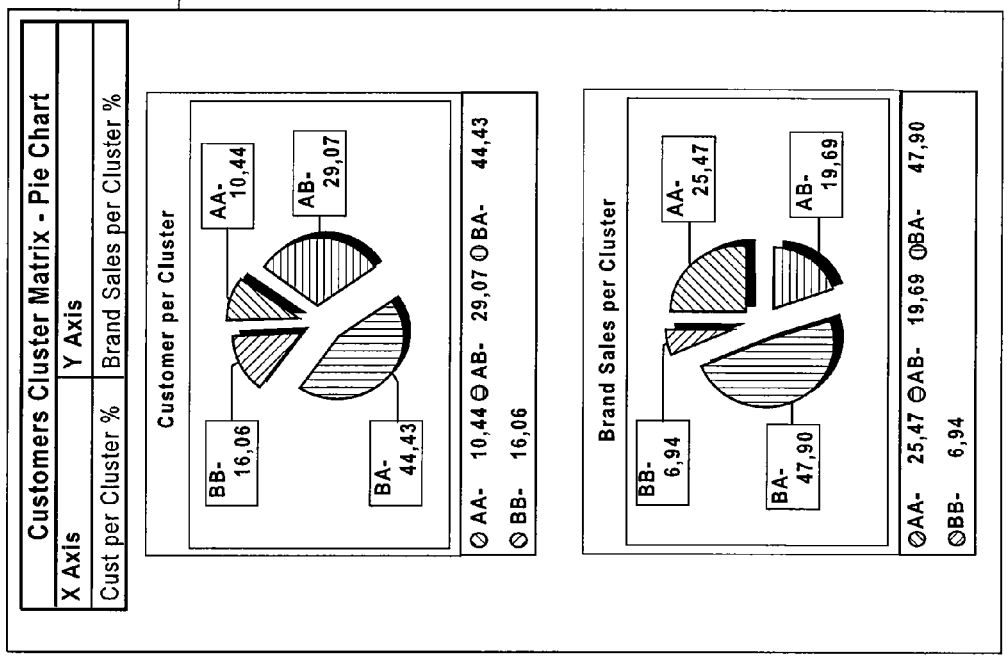
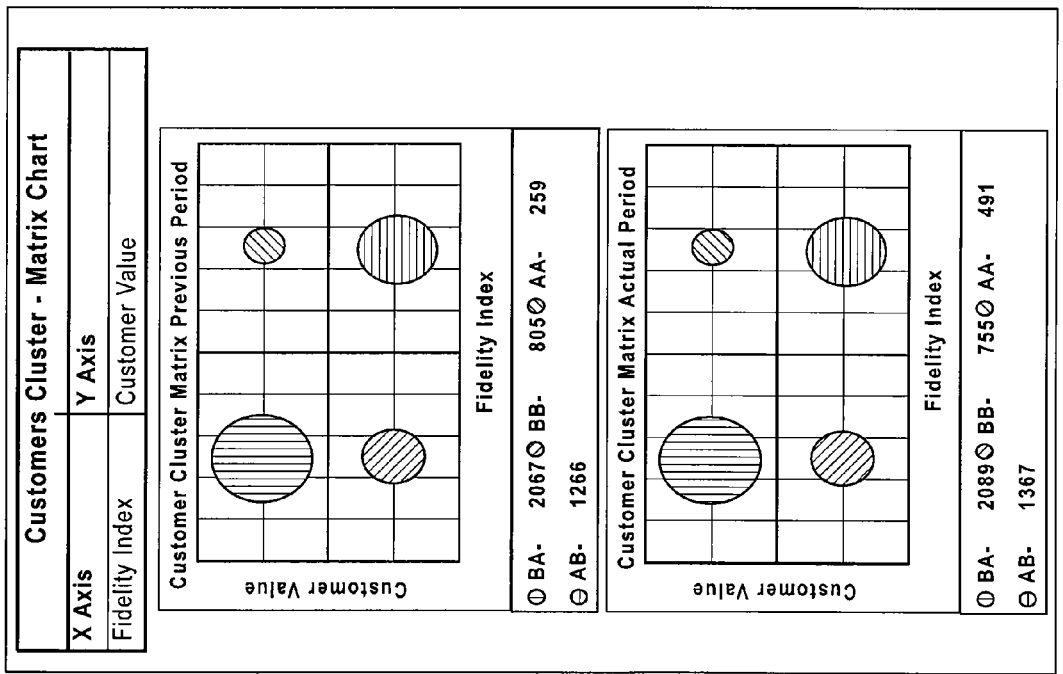

Fig. 20b

Customers Cluster Report

| Dimensions | Measures |
|---|---|
| Store Information | Number of Customer per Cluster CP |
| Cluster Type | Number of Customer per Cluster PP |
| Cluster | Number of Customer per Cluster CP % |
| | Brand Sales Value CP |
| | Brand Sales Value CP % |

| Hypermarket | Cluster Type | Cluster | Number of Cust |
|---|---|---|---|
| All | AA | High Fidelity - High Value | 1,383,00 |
| All | AB | High Fidelity - Low Value | 1,472,00 |
| All | BA | Low Fidelity - High Value | 372,00 |
| All | BB | Low Fidelity - Low Value | 65,00 |

2008

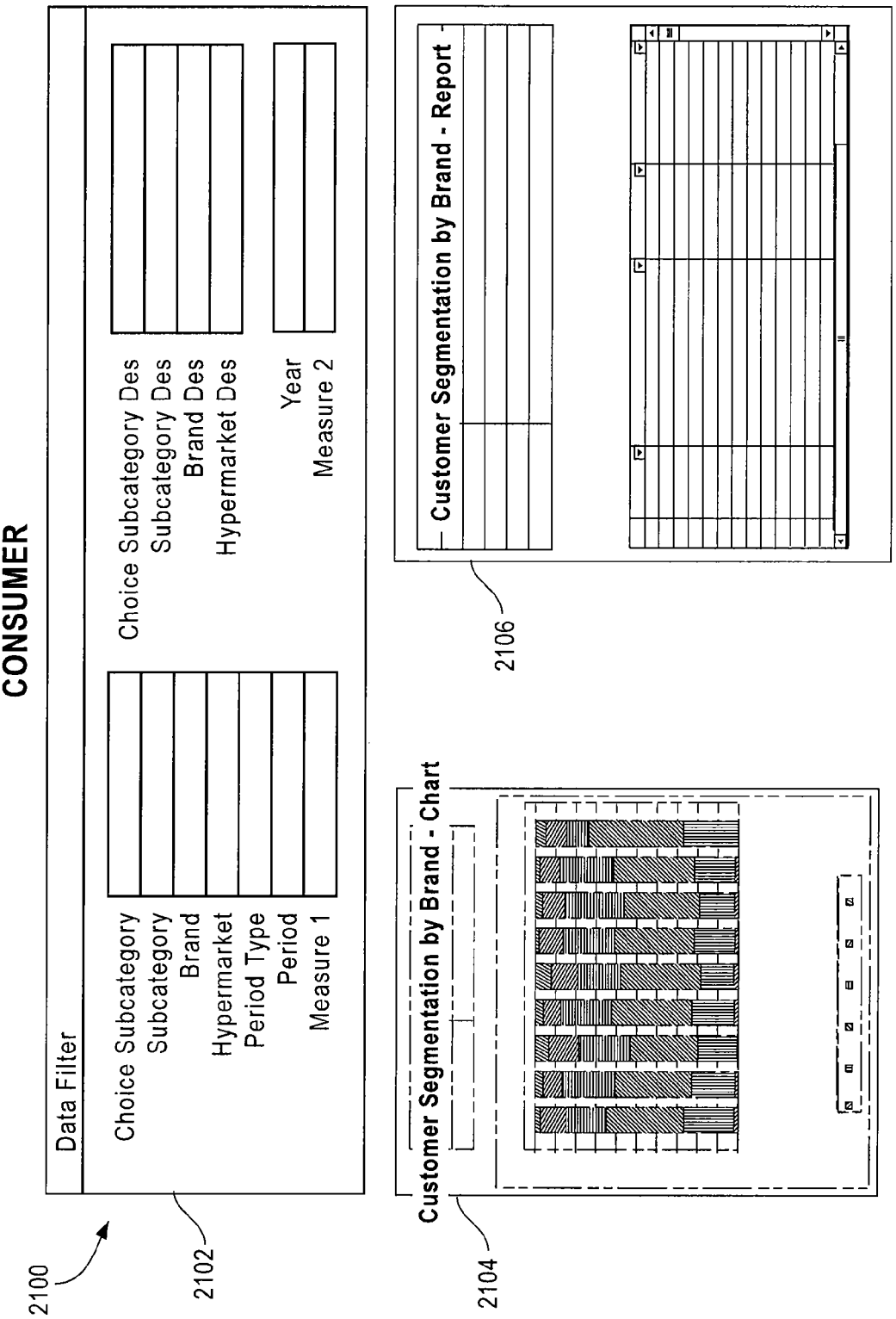

Fig. 21b

| Customer Segmentation by Brand - Report | |
|---|---|
| Dimensions | Measures |
| Period | First Criterion |
| Store Information | Second Criterion |
| Subcategory | Customers Numeric Distribution - Subcategory |
| Brand | Customers Numeric Distribution - Brand |

| Period | | Store Information | Subcategory Desc | Brand |
|---|---|---|---|---|
| 1/1/2007 | | Hypermarket | Sauce | Brand 1255 |
| 1/1/2007 | | Hypermarket | Sauce | Brand 1255 |
| 1/1/2007 | | Hypermarket | Sauce | Brand 1255 |
| 1/1/2007 | | Hypermarket | Sauce | Brand 1255 |
| 1/1/2007 | | Hypermarket | Sauce | Brand 1255 |
| 1/1/2007 | | Hypermarket | Sauce | Brand 1287 |
| 1/1/2007 | | Hypermarket | Sauce | Brand 1287 |
| 1/1/2007 | | Hypermarket | Sauce | Brand 1287 |
| 1/1/2007 | | Hypermarket | Sauce | Brand 1287 |
| 1/1/2007 | | Hypermarket | Sauce | Brand 1287 |

Customer Segmentation by Brand - Report

| Dimensions | Measures |
|---|---|
| Period | First Criterion |
| Store Information | Second Criterion |
| Subcategory | Customers Numeric Distribution - Subcategory |
| Brand | Customers Numeric Distribution - Brand |

| Period ▼ | ▼ | Hypermarket ▼ | Subcategory De ▼ | Brand |
|---|---|---|---|---|
| 1/1/2007 | | Hypermarket | Sauce | Brand 1255 |
| 1/1/2007 | | Hypermarket | Sauce | Brand 1255 |
| 1/1/2007 | | Hypermarket | Sauce | Brand 1255 |
| 1/1/2007 | | Hypermarket | Sauce | Brand 1255 |
| 1/1/2007 | | Hypermarket | Sauce | Brand 1255 |
| 1/1/2007 | | Hypermarket | Sauce | Brand 1255 |
| 1/1/2007 | | Hypermarket | Sauce | Brand 1287 |
| 1/1/2007 | | Hypermarket | Sauce | Brand 1287 |
| 1/1/2007 | | Hypermarket | Sauce | Brand 1287 |
| 1/1/2007 | | Hypermarket | Sauce | Brand 1287 |
| 1/1/2007 | | Hypermarket | Sauce | Brand 1287 |
| 1/1/2007 | | Hypermarket | Sauce | Brand 1287 |

2206

CONSUMER AND SHOPPER ANALYSIS SYSTEM

BACKGROUND

The present invention relates generally to processing systems for collecting, processing, and presenting data, as well as monitoring business processes. More particularly, the invention relates to data processing systems for collecting consumer sales and marketing data, performing data analysis, and presenting the results of the analysis.

Data analysis systems are common in enterprise resource planning and performance management systems. For example, an exemplary system for collecting, analyzing and reporting corporate tax and financial information is disclosed in US Application Publication No. US 2007/0022026 A1, entitled Tax Scorecard Reporting System, to Davidson et al. Such systems may be available for analyzing and reporting many different types of corporate information. However, busy executives are overloaded with information from numerous systems reporting data of all kinds. Executives need a complete but concise and timely view of key performance trends across the business to verify operational targets and analyze performance to determine changes to operations to achieve optimum profitability. The information necessary to gain insight in a competitive marketplace requires input from not only a company's operations, but also from the marketplace players—competitors and consumers. Accordingly, there is a need for more sophisticated systems for data integration and analysis that can manage the increased information flow from internal and external sources. Accordingly, there is a need for managing the input from multiple different systems, integrating the information to provide a single data source of high integrity, and delivering the precise information in a timely and accessible manner to business executives at all levels of the enterprise. Also, there is a need for a system to provide sophisticated analysis of the information to provide insights into a company's performance to allow the executives to make effective decisions.

SUMMARY

In one embodiment, the present invention includes a data processing system for analyzing shopper packaged goods retail sales data and consumer data. The system comprises: a data integration interface for receiving market and sales data from a plurality of data collection source systems external to a company and sales and shipment data from a data collection system internal to the company; a data integration component coupled with the data integration interface for transforming the received data into a unified, harmonized master data set; a unified master data store for receiving and storing said unified, harmonized master data set; a plurality of analysis modules for analyzing data in the unified master data store, the plurality of analysis modules including a market insight module comprising a plurality of analysis components comprising product analysis, brand analysis, shopper analysis and consumer analysis for analyzing said data; a database for storing a library of key performance indicators and business rules in communication with the plurality of analysis components; a user interface component associated with each of the plurality of analysis components; the user interface presenting input fields for data filters to be input to the plurality of analysis components, said input data defining the filters applied to the generated report; and a reporting component for generating reports illustrating the analyses in a plurality of dimensions and a plurality of measures.

Preferably, another embodiment of the data processing system includes an alert and audit engine in communication with the plurality of analysis modules; and an alert presentation component for displaying alerts generated by the alert and audit engine when said one of the plurality of analysis modules calculates a measure that exceeds a predetermined threshold. It is preferred that the reporting component is configured to provide reports for a plurality of information channels including web access, automated e-mail distributions and automated board packs. In addition, it is preferred that the data integration component comprises a merge and aggregation module for receiving shipment and consumption data and creating a unique repository of shopper and consumer data, and it is more preferred that the data integration component further comprises a transcoding and integration module for receiving external and Internal Master Data and creating said unified, harmonized master data set. Preferably, the user interface presentation module associated with the plurality of modules includes input fields for receiving filters for product hierarchy level, store information, interval period, and date range.

Considering the analysis components of the data processing system, it is preferred that the analysis components are configured to apply the business rules to the received data to calculate predetermined key performance indicators associated with the analysis component. Preferably, the product analysis component operates only on the data internal to the company comprising sales data associated with a selected product, but no data external to the company comprising competitor data; the brand analysis component operates on the data internal to the company comprising sales data associated with a selected brand and data external to the company comprising competitor data associated with a competitor brand; the shopper analysis component operates on data external to the company comprising sales data collected from a retailer loyalty card program and data external to the company comprising sales data associated with competitor products; and the consumer analysis; operates only on data external to the company. Preferably, the plurality of analysis modules further comprise a logistics module, a supply chain module, a sales module, a sales force module, a promotion module, a market insight module, and a customer module operative coupled for analyzing predetermined portions the unified data sets.

In another embodiment, the present invention includes a method of analyzing data for shopper packaged goods sales data of a company and consumer data. The method comprises: receiving data internal to the company, the data comprising master sales data associated with products and shipment data associated with products; receiving data external to the company, the data comprising sales data from retailers and consumer research companies; merging and aggregating the internal data comprising the shipment data and the external data comprising the consumer research data to create a merged data set; trans-coding and integrating the internal master data and the external sales data from retailers to create a unified master data set; storing the unified master sales data in a data store; selecting a data analysis to be performed, said data analysis selected from the group consisting of product analysis, brand analysis, shopper analysis and consumer analysis; receiving selected parameters from input fields of a user interface associated with the selected data analysis for restricting the analysis of data; retrieving a set of business rules and key performance indicators associated with the selected data analysis; for each selected data analysis, analyzing portions of the merged data set and the unified master sales data across the selected parameters in accordance with the retrieved business rules to calculate values for the retrieved key performance indicators; and generating a report illustrating the analysis in a plurality of dimensions and for a plurality of measures.

Preferably, another embodiment of the method further includes providing the report in a plurality of information channels including web access, automated e-mail distribution and automated board packs. It is also preferred that the method include creating in the reports a graphical representation of the calculated values of the key performance measures, and even more preferred that the reports include a plurality of graphical representations displayed in a single view of three or four sections of a display. Preferably, the method further includes displaying alerts generated when a calculated value for a key performance indicator exceeds a predetermined threshold. It is preferred that another embodiment of the method further includes selecting a portion of the data sets associated with the selected parameters for product hierarchy level, store information, interval period, and date range Considering the analysis components of the method, it is preferred in several embodiments that the product analysis operates only on the data internal to the company comprising sales data associated with a selected product, but no data external to the company comprising competitor data; that the brand analysis operates on the data internal to the company comprising sales data associated with a selected brand and data external to the company comprising competitor data associated with a competitor brand; that the shopper analysis operates on data external to the company comprising sales data collected from a retailer loyalty card program and data external to the company comprising sales data associated with competitor products; and that the consumer analysis, operates only on data external to the company.

BRIEF DESCRIPTION OF SEVERAL VIEWS OF THE DRAWINGS

The consumer and shopper analysis system may be better understood with reference to the following drawings and description. The elements in the figures are not necessarily to scale, emphasis instead being placed upon illustrating the principles of the capability analysis techniques. In the figures, like-referenced numerals designate corresponding parts throughout the different views.

FIGS. 9, 9a and 9b show an exemplary screen display for a parametric filter user interface, a graphical report, and an analytical result data table, respectively, for the product sales analysis per brand.

FIGS. 10, 10a and 10b show an exemplary screen display for a parametric filter user interface, a graphical report, and an analytical result data table, respectively, for the product sales trend analysis per sub category.

FIGS. 11, 11a and 11b show an exemplary screen display for a parametric filter user interface, a graphical report, and an analytical result data table, respectively, for the product analysis for new item introduction.

FIGS. 12, 12a and 12b show an exemplary screen display for a parametric filter user interface, a graphical report, and an analytical result data table, respectively, for the product analysis for new item introduction.

FIGS. 13, 13a and 13b show an exemplary screen display for a parametric filter user interface, a graphical report, and an analytical result data table, respectively, for the brand value share analysis per sub category (cumulative brand share in the selected period).

FIGS. 14, 14a and 14b show an exemplary screen display for a parametric filter user interface, a graphical report, and an analytical result data table, respectively, for the brand value share trend analysis per sub category.

FIGS. 15, 15a and 15b show an exemplary screen display for a parametric filter user interface, a first graphical report, a second graphical report and an analytical result data table, respectively, for the brand positioning analysis.

FIGS. 16, 16a and 16b show an exemplary screen display for a parametric filter user interface, a graphical report, and an analytical result data table, respectively, for the brand analysis using Pareto analysis.

FIGS. 17, 17a and 17b show an exemplary screen display for a parametric filter user interface, a graphical report, and an analytical result data table, respectively, for the brand analysis for customer joiners, leavers and repeaters.

FIGS. 18, 18a, 18b, 19, 19a and 19b show exemplary screen displays for a parametric filter user interface, a graphical report, and an analytical result data table, respectively, for the brand switching analysis per sub category.

FIGS. 20, 20a and 20b show an exemplary screen display for a parametric filter user interface, a first graphical report, a second graphical report, and an analytical result data table, respectively, for the shopper analysis per customer clusters.

FIGS. 21, 21a, 21b, 22, 22a and 22b show exemplary screen displays for a parametric filter user interface, a graphical report, and an analytical result data table, respectively, for the shopper analysis for customer cluster segmentation.

DETAILED DESCRIPTION

The elements illustrated in the FIGS. interoperate as explained in more detail below. Before setting forth the detailed explanation, however, it is noted that all of the discussion below, regardless of the particular implementation being described, is exemplary in nature, rather than limiting. For example, although selected aspects, features, or components of the implementations are depicted as stored in program, data, or multipurpose system memories, all or part of systems and methods consistent with the customer value management analysis and reporting system technology may be stored on or read from other machine-readable media, including secondary storage devices such as hard disks, floppy disks, and CD-ROMS; electromagnetic signals; or other forms of machine readable media either currently known or later developed.

Furthermore, although this specification describes specific components of a customer value management analysis and data processing system, methods, systems, and articles of manufacture consistent with the consumer sales data processing system technology may include additional or different components. For example, a processor may be implemented as a microprocessor, microcontroller, application specific integrated circuit (ASIC), discrete logic, or a combination of other types of circuits acting as explained herein. Databases, tables, and other data structures may be separately stored and managed, incorporated into a single memory or database, or generally logically and physically organized in many different ways. The programs and metrics discussed below may be parts of a single program, separate programs, or distributed across several memories and processors.

Figure 1:
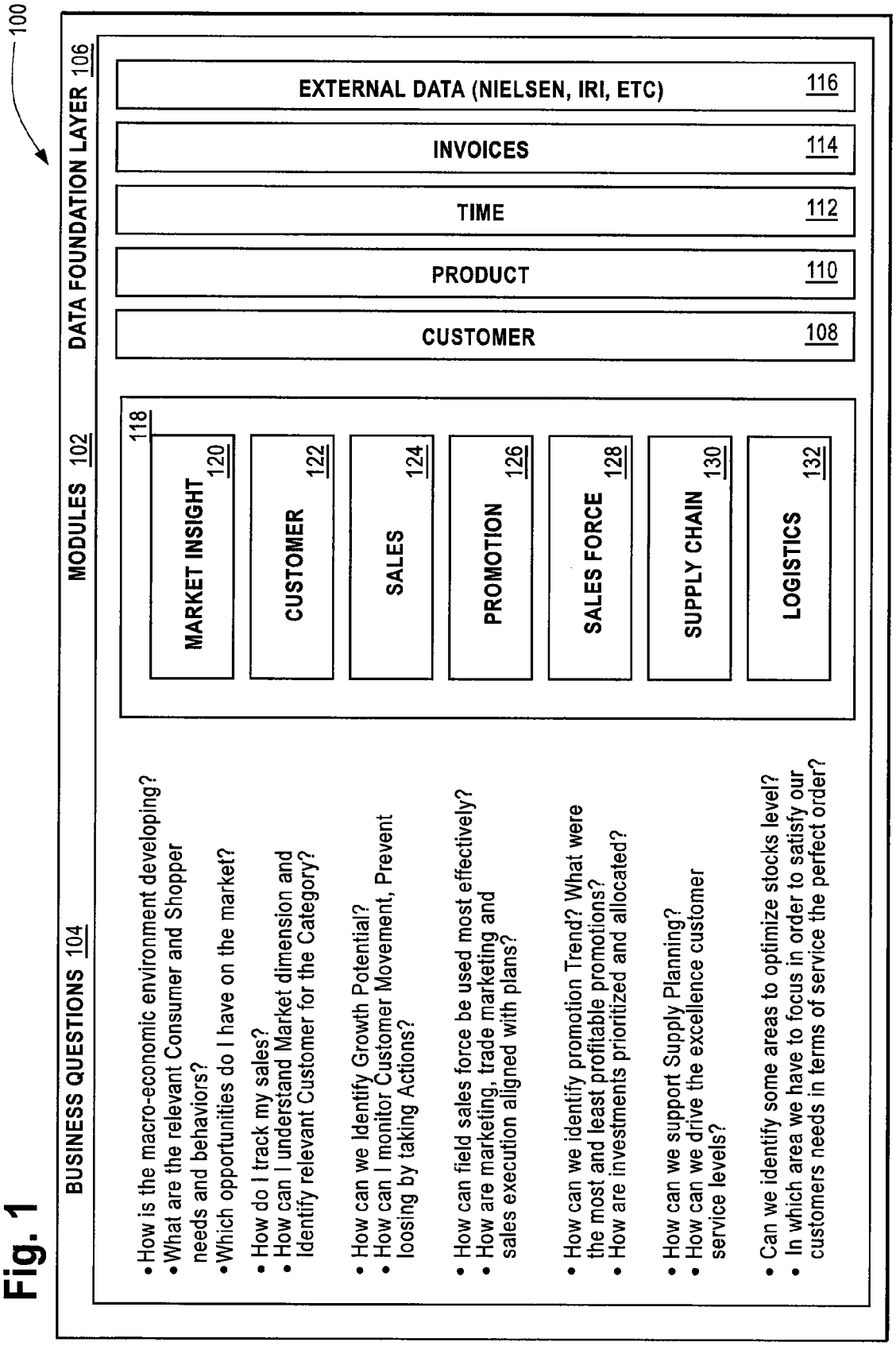
FIG. 1 shows a conceptual overview diagram of a Customer Value Management system for analysis of sales and other data.

Referring now to FIG. 1, in one embodiment, the present invention may be a portion of a larger asset referred to as CVM (Customer Value Management), which is shown as a conceptual diagram of a system 100 including 7 CVM modules as an integration layer 102 between Business questions 104 and Data Foundation Layer 106. In fact, the first column 104 contains a list of common Business Questions related to each CVM module, while the third column 106 contains a list of dimensions belonging to the Data Foundation Layer (Customer 108, Product 110, Time 112, Invoices 114, and External Data Sources 116, such Nielsen, IRI, etc.). FIG. 1 shows the 7 CVM modules 118 by subject area and gathers one module in each box. The modules are ordered following the business evolution line: Market Insight 120, Customer 122, Sales 124, Promotion 126, Sales Force 128, Supply Chain 130 and Logistics 132. Sales are the drivers for the analysis in each module and follow the entire sales cycle from potential sales in analyzing the market and competitors to final delivery of the goods at the consumer and the shopper analysis level. The implementation of the CVM system may assist a company in carrying out best practices for analyzing and managing their product sales cycle.

Market Insight 120 is the first step to analyze the market and define the strategy looking at competitors and consumer and shopper behavior. Consumer and Shopper analysis are located in this first module, as are Market Trends analysis and Positioning & Competitor analysis processes.

Customer module 122 provides a detailed analysis at the customer level to track trends, consumer loyalty and new Joiners or Leavers Sales module 124 provides a set of Store detailed analysis, which includes Point of Sale (POS) Performance (Gains and Losses); POS Performance Change and POS Revenues (Sales, stock, good rotation) and the Brand elaboration.

Promotion module 126 provides a set of analysis to track the on going promotional campaigns and to plan the promotional strategy. These analyses include Campaign & Promo Calendars, Promotion Pressure differentiated per product/client, Trade Spend effectiveness and Promotional Spending Control (product-client-agent).

Sales Force module 128 provides a detailed analysis to check Sale Force Performances, Efficiency on Order Tracking, Accuracy, Field Execution (accrued vs. activated) and other specific Sales Force parameters, such as Monitoring Peripheral Contracts and Agreements.

Supply Chain module 130 provides a set of analysis to monitor orders life time cycle and forecast accuracy, which includes Customer Service Work-Load, Order Fulfillment Efficiency, and Demand & Supply Planning Accuracy.

Figure 2:
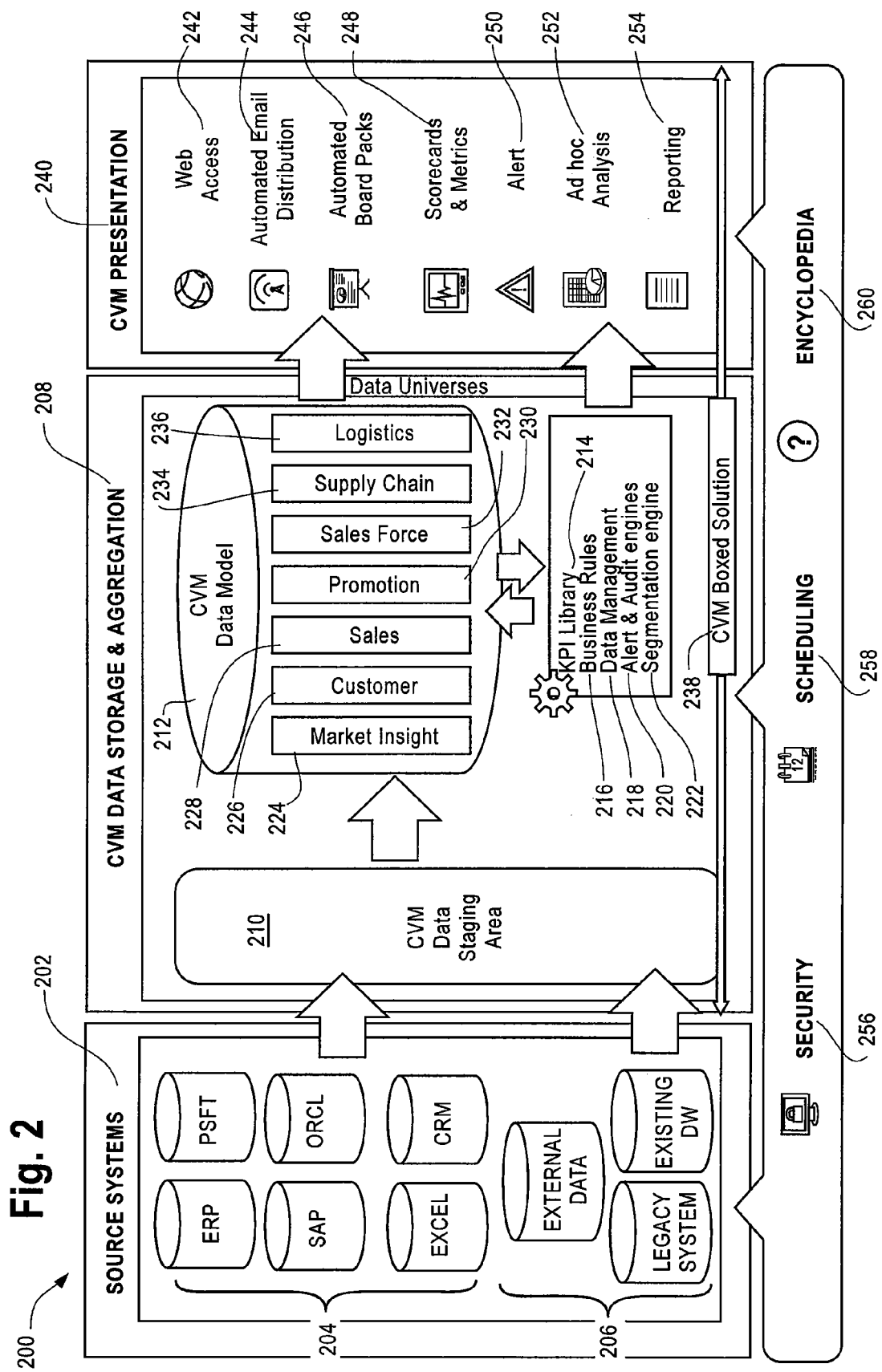
FIG. 2 shows an overview representation of an architecture plan of one embodiment of a system incorporating the data processing system of FIG. 1.

Logistics module 132: the last step to track deliveries, stock strategies, such as availability and rotation, Efficiency analysis, Lead Time analysis for stock coverage or warehouse rotation and other logistic information Referring to FIG. 2, an overview representation of the architectural platform 200 is shown for an overall stem referred to as CVM (Customer Value Management). The entire infrastructure is composed of three main layers:

1. Bottom Layer 202—Source Systems: the current level contains many of the infrastructure feeding systems belonging to the company (ERP, SAP, Oracle, Excel) 204 or coming from external sub-system (legacy systems or External DWH) 206.
2. Middle Layer 208—CVM Data Storage and aggregation: this level contains the Staging area 210 for Data coming from Source Systems and the CVM Data warehouse with the elaboration engine to integrate, aggregate and store data in the CVM data model 212 associated with the stored KPI libraries 214 and Business Rules 216. The middle layer also contains the data management application 218, alert and audit engines 220 and segmentation engine 222 for operating on the CVM data. The CVM Data model 212 houses data structure for performing analysis using seven different analytical modules: Market Insight 224, Customer 226, Sales 228, Promotion 230, Sales Force 232, Supply Chain 234 and Logistics 236. The compilation of the CVM data model 212, analytical modules and rules databases comprise the business intelligence of the CVM boxed solution 238, which provides the key analytical expertise driving the system.
3. Top Layer 240—CVM Presentation: this level contains the technologies to present analytical reports efficiently and effectively. The reports may be accessible via Web access 242, automated e-mail distributions 244, automated board packs 246, supported by Scorecards, Metrics and Reporting Objects 248, may be facilitated using Alerts 250, allows Ad-hoc analysis 252, and provides generalized custom reporting 254.

Data exchange between Bottom Layer 202 and Middle Layer 208 is governed by specific security rules and profiles 256. This is the access point to the CVM Boxed Solution 238, composed of Middle Layer 208 and Top Layer 240 only. The features may be available in different combinations depending on the technology used for the report presentations. The system is supported by a scheduling tool 258 and by the Encyclopedia 260, a reference guide for reporting objects.

Figure 3:
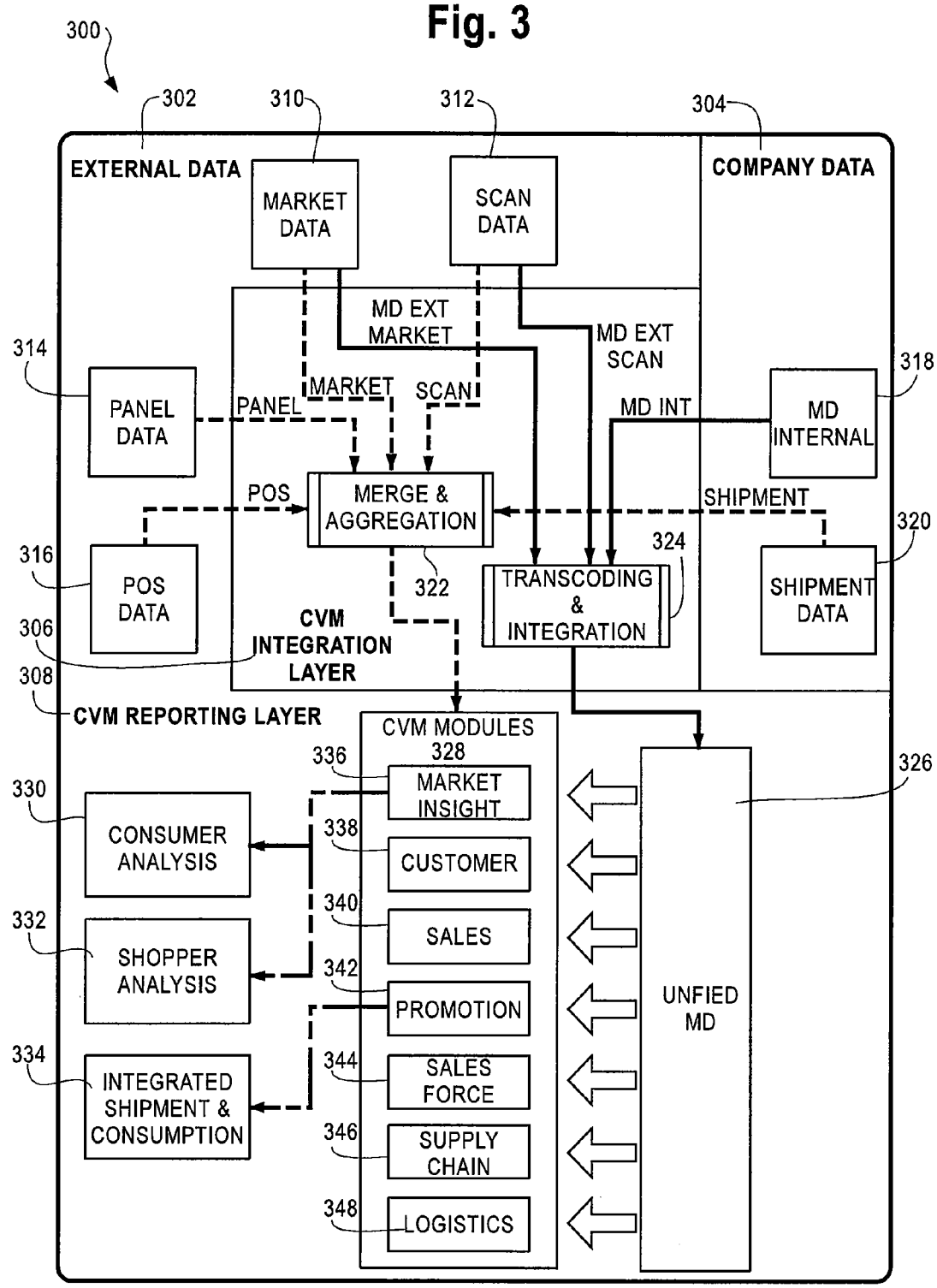
FIG. 3 shows another representation of an architecture plan for another embodiment of a system incorporating the data processing system of FIG. 1.

Referring now to FIG. 3 shows an embodiment of a technical architecture for implantation of a CVM system 300 starting from the source systems up to the CVM Report level. The elements of the architecture include four layers: a first Source Data Layer: comprising External Data 302; a second Source Data Layer: comprising Internal Data 304; a CVM Integration Layer 306; and a CVM Reporting Layer 308. The data flowing into the CVM integration layer 306 are from several source systems including Market Data 310, which is an external data source containing consumption competitors data and related Master Data; Scan Data 312, which is an external data source containing consumption scanning data and related Master Data coming from Retailers Systems; Panel Data 314, which is external data source containing consumers and shoppers panel data; POS (point of sale) Data 316, which is external data source containing store data coming directly from Retailers and belonging to loyalty programs and CRM systems; MD Internal 318, which is company data source containing Internal Master Data; and Shipment Data 320, which is company data source containing Internal Shipment Data. The data from all sources include data relating to customers, products, timing, invoices and external data from market data suppliers such as AC Nielsen, IRI etc.

The CVM integration layer 306 includes a Merge and Aggregation 322 module for processing Shipment and Consumption Data from POS, panel, market and scan data sources. This layer also includes a trans-coding and Integration module 324 for trans-coding and integration internal and external Master Data. Trans-coding is the process of transforming the format and representation of content to make it universally accessible. This module allows for the integration of disparate data into a unified harmonized data structure universally accessible to the CVM analytical modules.

The CVM reporting layer 308 includes a source data system of Unified Master Data 326. This is an data repository for the CVM analytical modules and contain the data in the data structures according to the needs of the analytical modules comprising external and internal Master Data integrated. The CVM Modules 328 operates on data stored in the Unified Master Data repository 326 and aggregated shipment and consumption data retrieved from the merge and aggregation module 322. The Shopper Analysis 330 and Consumer Analysis 332 components are sub-parts of the Market Insight Analysis module 336. The CVM analysis modules are supported by reporting tools, which include specific reporting templates for the various analytics including Shopper and Consumer Analysis. The Integrated Shipment and Consumption Analysis 334 is a sub-part of the Promotion Analysis module 342.

As noted above, the system of FIG. 1 may be considered a portion of a larger system called CVM (Customer Value Management), which includes several analytical tools organized in seven modules: Market Insight, Customer, Sales, Promotion, Sales Force, Supply Chain and Logistics, as shown also in FIGS. 2 and 3. Sales are the drivers for the analysis in each module and follow the entire sales cycle from potential sales in analyzing the market and competitors to final delivery of the goods at the consumer and the shopper analysis level. The seven CVM analysis modules 328 as shown in FIG. 3 are organized by subject area. The modules are ordered following the business evolution line, and are described below Market Insight 336 is the first step to analyze the market and define the strategy looking at competitors and consumer and shopper behavior. Consumer Analysis 330 and Shopper Analysis 332 are located in this first module, as well as other analysis components (not shown) such as Market Trends and Position & Competitors. The results of this analysis module provide operational metrics to give insight into business questions such as: How is the macro-economic environment developing? What are the relevant Consumer and Shopper needs and behaviors? and Which opportunities are there on the market?

Customer 338 provides a detailed analysis at customer level to track trends, analyze consumer loyalty and new Joiners or Leavers, as well as providing customer insights. The results of this analysis module provide operational metrics to give insight into business questions such as: How to understand market dimension and identify relevant customers for the product category? How to monitor customer movement and prevent losses by taking action?

Sales 340 provide a set of Store detailed analysis and the Brand elaboration. The analysis components of this module include POS performance (gains and losses); POS performance change; POS revenues (sales, stock, goods rotation); and Brand performance (gains and losses). The results of this analysis module provide operational metrics to give insight into business questions such as: How to track sales? How to identify growth potential?

Promotion 342 provides a set of analysis components to track the on going promotional campaigns and to plan the promotion strategy. The analysis components of this module include Campaigns & Promo Calendars, Promotion Pressure differentiated from product/client; Trade Spend effectiveness; and promotional spending control (product-client-agent). The results of this analysis module provide operational metrics to give insight into business questions such as: How to identify promotion trends? What were the most and least profitable promotions? How are marketing, trade marketing and sales execution aligned with plans?

Sales Force 344 provides a detailed analysis to check Performances, Efficiency, Accuracy and other specific Sales Force parameters. The analysis components of this module include Sales Force Performance; Sales Force Efficiency on Order Tracking; Field Execution (Accrued vs. Activated); and Monitoring Peripheral Contracts and Agreements. The results of this analysis module provide operational metrics to give insight into business questions such as: How can field sales force be used most effectively? How are investments prioritized and allocated?

Supply Chain 346 provides a set of analysis to monitor orders life time cycle and forecast accuracy. The analysis components of this module include Customer Service Work-Load; Order Fulfillment Efficiency; and Demand & Supply Planning Accuracy. The results of this analysis module provide operational metrics to give insight into business questions such as: How to support Supply Planning? How to drive the excellence customer service levels?

Logistics 348 provides the last step to track deliveries, stock strategies and other logistic information. The analysis components of this module include Stock Availability; Stock Rotation; Efficiency Analysis; Lead Time for stock coverage and warehouse rotation; and Other Logistic Information. The results of this analysis module provide operational metrics to give insight into business questions such as: How to identify areas to optimize stock levels? In which areas to focus to satisfy customers needs in terms of servicing the perfect order?

The system generates a set of important analysis in the larger context of the Commercial Insight. There are several and different reasons for this importance. Growing competition not only among competitors but also with retailers (e.g.: Private Labels) is increasing. Inter-brand competition is becoming the new challenge to win. The balance of Branding Power is shifting from manufacturers to retailers. Customers Alliances—powerful retailers increasingly are seen as "customers allied" in driving down prices and making choices (trade and consumer marketing are becoming different sides of the same coin). Comprehensive integration of external market data provides greater insight. Consumer Analysis and Shopper Analysis are performed using data fully integrated and coming from many different sources where data are supplied in a completely different way. The CVM Integration layer shown in the FIGS. 2 and 3 represents the location where the harmonization and the data cleansing are performed to normalize comparable values from the different data providers. Harmonization and Integration are very important for two reasons: (1) it allows putting together in the same box internal data and data coming from external data sources, customers, and consumer; and (2) data harmonized and integrated have different meaning and different content and they allow performing complex analysis on several functional streams. Brand Trust: Shoppers and Consumers care more about prices and are less loyal to the brand. Stakeholders' expectations: firms are working harder to extract more value from each contact, increasing stakeholder's expectations. Greater concentration: overcrowding of modern trade chains and purchasing groups causes a reduction in the contracting power of manufacturers. Information Asymmetry: manufacturers are in a permanent situation of information asymmetry regarding the sales data coming from retailers scanners. Proliferation of products: goods and services are continuously increasing on the market.

The characteristic of high performing companies is the ability to deliver growth, profitability and peer competitiveness. However, they must also be able to position themselves well for the future, and deliver a consistent performance over a long period of time. The prerequisite of high performance is a correct understanding of all the aspects concerning insight. It is fundamental to have a privileged access to data in order to carry out the best interpretation of the signs coming from the environment and the market which firms compete in. A deep knowledge of Commercial Insight drivers is the first step to success.

Figure 4:
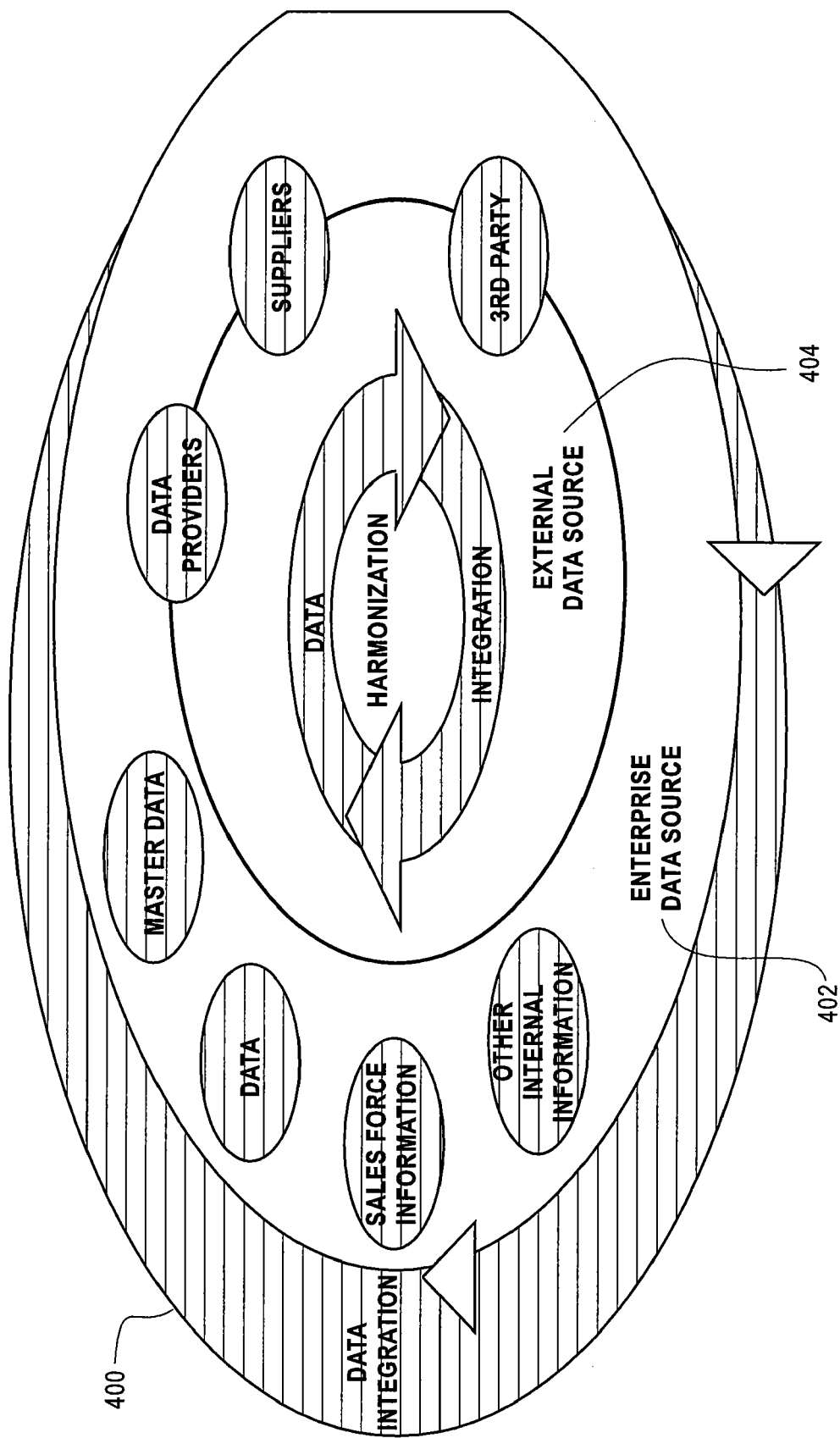
FIG. 4 shows a conceptual process flow of a data integration interface.

Large Consumer Goods & Services (CG&S) companies or Consumer Packaged Goods (CPG) companies and retailers need usually to work with huge quantity of data coming from different sources. The system preferably performs a main classification between External and Enterprise Data Sources. Information coming from different data providers, need to be harmonized to be used together. Referring now to FIG. 4, a conceptual diagram of the processes performed in the CVM integration layer 400 is shown. Internal data sources 402 and external data sources 404 are collected together and integrated to provide a harmonized data set that is universally accessible to a variety of analytical tools. This provides greater efficiency in that a single master data repository can be used rather than requiring the duplication of data for separate databases supporting the different analysis modules. Different levels of integration can be performed: alignment, harmonization (cross coding) and fusion. Collecting information is important to enable Insight.

Figure 5:
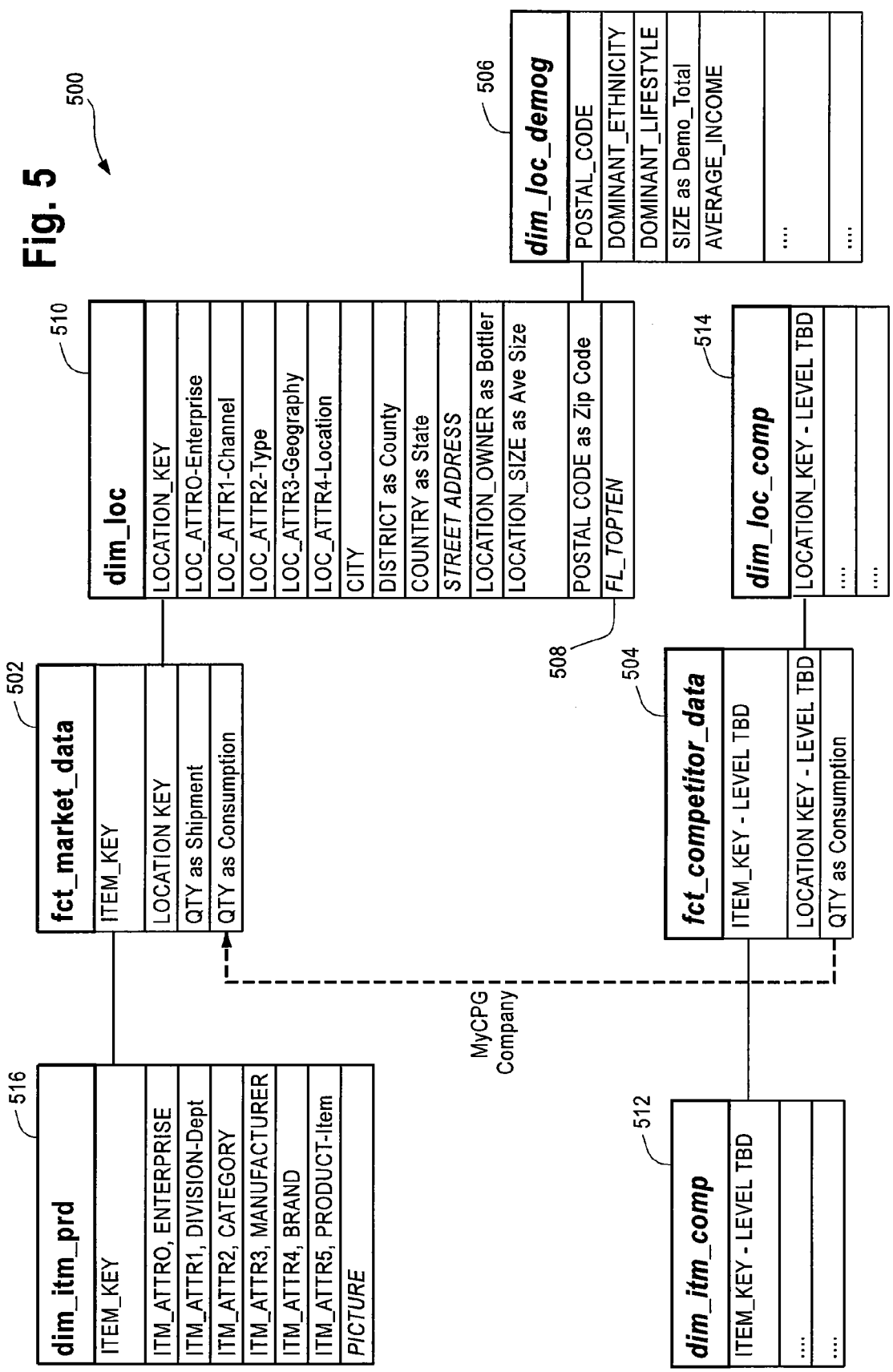
FIG. 5 shows an exemplary data model of sales and market data useful in the present invention.

Referring to FIG. 5, a data structure 500 is shown that illustrates the harmonization integration of data from various sources. The data model 500 provides the structure for the harmonized integrated data stored in the Unified MD database 326 shown in FIG. 3. The data model 500 supports the Consumer Analysis and includes two fact tables 502 and 504 and one table 506 for Demographic data. The use of two fact tables is due to the different aggregation level of Shipment data of a Company X (Internal data of the Company X) and Consumption data both of Competitors and of the Company X, which are from external sources. The relevant factors for these data model tables are summarized as follows:

| Fact Tables | |
|---|---|
| Name: | fct_market_data 502 |
| Long Description: | Shipment data for Company X (and consumption data derived from Ac Nielsen data) |
| Granularity: | Store/Item detail |
| Key Measures: | |
| Data Source: | Internal (Company X for the Shipment) and External (Ac Nielsen/Retailers) in case Consumption data of Company X will be stored in this table also. |
| Notes: | BO Native |
| Name: | fct_competitor_data 504 |
| Long Description: | Competitors data (only consumption?) |
| Granularity: | TBD (Ac Nielsen data level: Item/National Account?) |
| Key Measures: | |
| Data Source: | External (Ac Nielsen for competitors data, Nielsen or Retailer for Consumption data of Company X) |

| -continued | |
|---|---|
| Demographic Table | |
| Name: | dim_loc_demog 506 |
| Long Description: | Demographic Information for single Postal Code area |
| Granularity: | Postal Code level |
| Key Measures: | |
| Data Source: | External (Ac Nielsen) |

Preferably, the Consumption data is sourced from Ac Nielsen and from retailers. Ac Nielsen provides the same granularity of other CPG Companies data. Competitor Data (by Ac Nielsen) and internal Master Data are matched for comparing the consumption data of different CPG Companies. Company ABC data (by Ac Nielsen) and internal Master Data is matched for comparing Company ABC consumption and shipment data. This provides the opportunity and possibility of storing Consumption data for Company ABC also in the FCT_MARKET_DATA table 502 (Shipment data). Retailers' data has a finer granularity than of the Competitors data. This allows the choice of the table(s) in which to store Company ABC Consumption data (in FCT_MARKET_DATA table 502 or FCT_COMPETITOR_DATA table 504, or both) depending on the granularity of the information for Company ABC Consumption data. Demographic data may be provided by linking some demographic information to every store according to its postal code in the DIM_LOC_DEMOG table 506. An attribute for a Top Ten Stores Flag 508 may be included in the DIM_LOC table 510. This attribute may be related to the Store Shipment volume for a predetermined period. The Nielsen Master data may be managed by using two tables, DIM_ITM_COMP 512 for product and DIM_LOC_COMP 514 for customer, to store the Nielsen Master data. The data tables are set up to allow the Nielsen Master data to be mapped to the Company ABC Master Data. Promotion and Supply Chain measures and KPIs may be added into this Data Model.

Shopper and Consumer Analysis Overview

Due to the large number of variables involved in the business, it is not easy to predict or determine what will be the shopper or consumer behavior. Often the answer is not intuitive. For example, why the shopper associates many times two products belonging to completely different categories? Is there a driver or reading key to understand the shopper selections?

Shopper and Consumer analysis are fundamental measures of a business's success. Understanding Consumers and Shoppers behavior is the key to improving business performances. Many companies monitor Consumers and Shoppers trends, using different data sources, to understand which products are preferred by the buyers. From the beginning, it is important understand the difference between a Shopper and a Consumer. A Shopper is the person who buys the products, but not necessarily consumes it. A Consumer is simply the person who consumes the products bought by someone else. Many times Shopper and Consumer are different actors and it is important for CG&S companies, and especially for retailers, to take different decisions following Shopper or Consumer behavior.

Shopper and Consumer analysis, however, only provides a portion of the overall Customer Value Management picture, used to integrate and consolidate information coming from CG&S companies, Retailer and the Market in general. For numerous and varied reasons, some retailers may be more profitable than others and some shoppers may decide to buy products from one retailer rather than one other. For example, a company in the business of providing bakery products (biscuits, crackers, etc.), may have several different types of customers. Some customers may be National Key Account and some may be local retail stores. A Shopper may decide to buy bakery products in the National Key Account (e.g., a nationwide or regional large chain retail store) preferring the large variety of items or may decide to use the local retail store choosing the relationship with the retailer. All these factors and more may contribute to performing a deeper Shopper and Consumer analysis.

Today's shoppers and consumers, demand a very different relationship with their preferred suppliers. Better informed, qualified and able to get what they want, they expect to be treated as intelligent individuals. Increasingly they have little time to spare, so it is vital that manufacturers and retailers meet their needs quickly and efficiently. If they don't, consumers will switch to other brands that are prepared to do so.

Consumers can buy through so many different channels and, in this way it is very difficult to accurately target their needs. Retailers have plenty of information about consumer buying patterns, but it's largely historical. It doesn't answer the crucial question—"why they bought" or "why they are going to buy."

Consumption context is changing; yesterday it was composed of: uniformity, needs, loyal, brand, concreteness, interaction and eyesight supremacy. Today it is composed of: patchwork, desires, nomadic & wondering, category, atmosphere & experience, networking and polisensualism, i.e., the search for a global involving of senses during the experience of consuming.

In order to properly manage relationships with core consumers and increase their profitability, a company needs to: (1) create value for the company and for the consumer; (2) create and develop the consumer's loyalty; and (3) improve and monitor the consumer satisfaction level.

Figure 6:
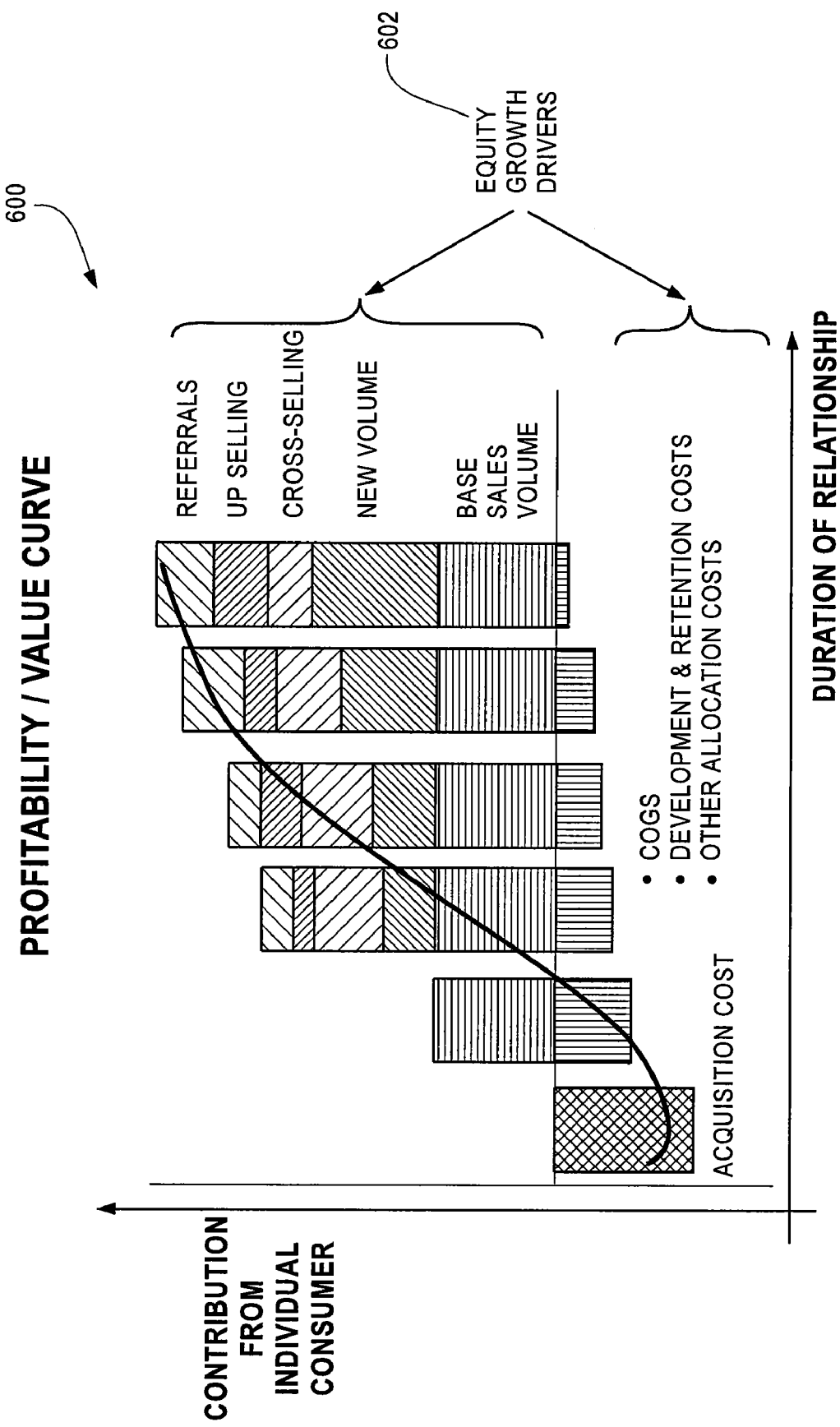
FIG. 6 shows a graph of a profitability/value curve based on the length of consumer relationship in a retail CPG market.

FIG. 6 shows an example of profitability trend 600 due to individual consumers in relation with the duration of the relationship between the consumer and the consumed product. The graph contains a list of Equity Growth Drivers 602 which contribute to the overall profitability, highlighting the importance of the consumer's loyalty to the Company's products or brands.

There are many trends and various contexts that influence Consumer Analysis. There are more fragmented consumer base and buyer values due to demographic and social shifts. The retail competition is intensified and there is increasing saturation in established markets. There is a proliferation of products, services and messages and increasing commoditization. "Cash rich, time poor" consumers demand more relevant offerings, experiences and communication. Consumers may require some activation in controlling the consumption cycle.

Why is it important for a company to know consumer and shopper behavior? There are many reasons from the business prospective. For instance, acquiring new consumer can cost 5 times more than retaining current customer. A 2% increasing in consumer retention has the same effects on profits as cutting cost as 10%. The average company loses 10% of its consumer each year. One particular consumer does not generate the same costs and revenues over time as another one. Each customer has a unique "DNA profile." The consumer is now becoming more informed, hard to please, selective and smart.

Figure 7:
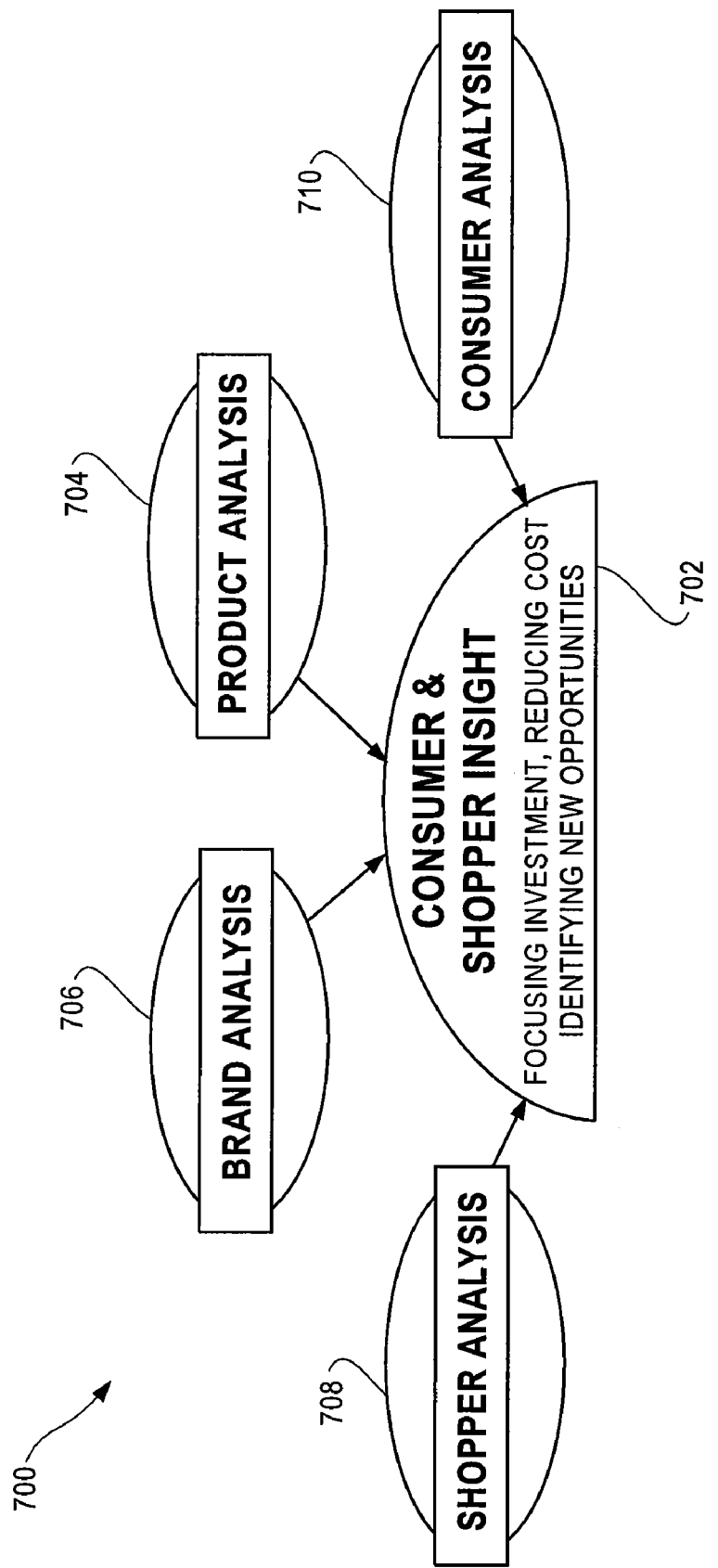
FIG. 7 shows analytical components that comprise the market insight module of the system of FIG. 3.

FIG. 7 conceptually illustrates the analysis components as contribution factors to the Consumer and Shopper Insight 702, which is a part to the first CVM Module called "Market Insight" 102. Shopper and Consumer analysis is a collection of processes supported by reporting tools, to help CG&S Companies and Retails interpreting market information about shoppers and consumers behavior. The following analysis processes are used for the Shopper and Consumer analysis 700. Product Analysis 704 allows analyzing sell out information about the company. No competitor data are involved in the process. Brand Analysis 706 allows analyzing sell out information involving also competitor data. Shopper Analysis 708 allows analyzing shopper behavior using the data coming from loyalty card. This kind of process involves also competitor data. Consumer Analysis 710 allows analyzing consumer behavior using the data coming from External Data Providers. This kind of process involves also competitor data.

Figure 8:
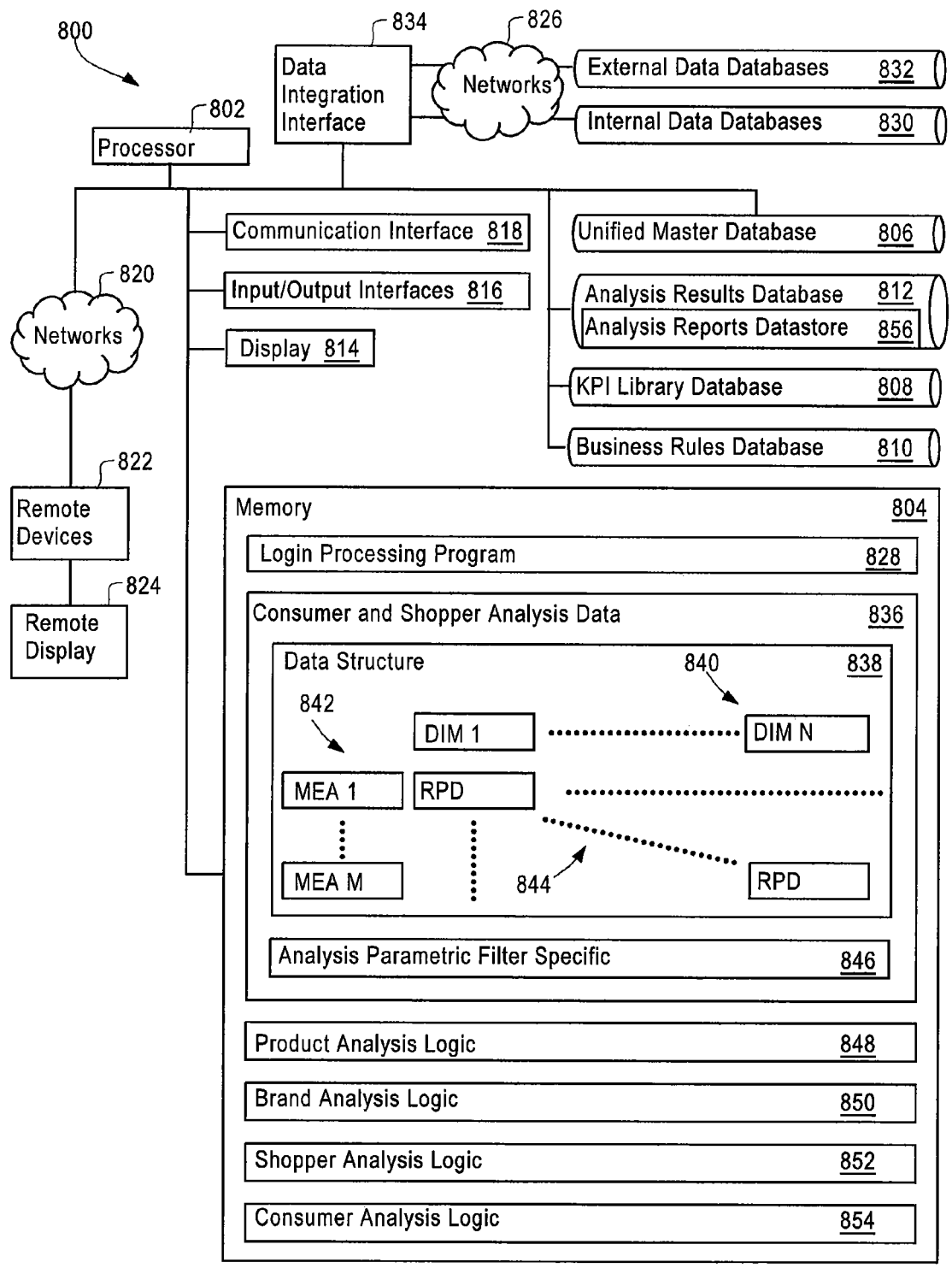
FIG. 8 shows a data processing system for analysis of consumer and shopper data.

Referring to FIG. 8, another embodiment of a consumer and shopper analysis system ("system") 800 is shown, which illustrates an implementation of the analyses processes for Product Analysis 704, Brand Analysis 706, Shopper Analysis 708 and Consumer Analysis 710, referred to above. The system 800 includes a processor 802 and a memory 804. Several databases support the operation of the system 800, including a unified master database 806, a key performance indicator (KPI) library database 808, a business rules database 810, and an analysis results database 812. The system 800 may include a local display 814 and input/output interfaces 816 (e.g., including a keyboard, mouse, microphone, speakers, or other device), and, through the communication interface 818 and networks 820, may communicate with remote devices 822 and remote displays 824. The networks 820 and 826 may be any combination of external networks (e.g., the Internet) and internal networks (e.g., corporate LANs). The displays 814 and 824 may, for example, present consumer and shopper analysis reports that the system 800 retrieves from the reports datastore 826 coupled with the analysis results database 812 for review, modification, and application by business consultants or other individuals. With regard to local access or access by the remote devices 822, the system 800 may include a login processing program 828 to authenticate and/or authorize access to the system 800. To that end, the login processing program 828 may include username/password verification, private/public key encryption, or other validation and data protection capabilities.

The unified master database 806 stores a master data set for use by the various analysis logic models. The system may populate unified master database 806 with data sourced from internal master databases 830 of a specific company and external databases 832 from sources outside the company. A data integration interface 834 receives across a network 826 relevant data from a variety of sources from both internal databases 830 and external databases 832, and merges and aggregates select data to create a first master data set and transcodes and integrates select data to create a second master date set populated and stored in the unified master database 806. The KPI library database 808 stores key performance indicators useful for analyzing the performance of various business processes. The business rules database 810 stores a variety of rules to be applied to the analysis logic to provide a specific style and characteristic to the analysis of the business performance in accordance with a company's requirements. The analysis results database 812 may store the data created from the analysis of the various analytical models as well as the specific reports generated to illustrate the performance of the business processes and sales performance that have been analyzed.

The system 800 facilitates the review, modification, creation, and application of analysis logic. In that role, system 800 retrieves and stores subsets of data 836 in the memory 804. The system may establish the data in a consumer and shopper analysis data structure 838 with multiple dimensions ("DIM") 840 and multiple measures ("MEA") 842 organized along a key factor dimension, and representative performance data ("RPD") 844 that populates the consumer and shopper analysis structure 836. The DIM and MEA values may be selectively retrieved from the KPI Library database 808 using the business rules database 810 and the selected analysis logic to be executed. Execution of the selected analysis logic from the group of Product Analysis 848, Brand Analysis 850, Shopper Analysis 152 and Consumer Analysis 854 may be performed on a subset of data retrieved from the unified master database that is restricted by the inputs to the analysis parametric filter specified 846. The resulting RPD may be populated into the data structure 838, and then a report engine (not shown) may generate various reports illustrating the results which are stored in the analysis reports data store 856. The data architecture may vary widely in implementation, and, may enhance data integrity by using a unified database for source data for all analysis.

In addition to the analysis process described above, the system 800 preferably may provide an automated analysis of additional analysis modules using the same data sources. As one example, the system 800 may be adapted to implement some or all of the analysis modules depicted in FIGS. 1, 2 and 3, which are described above.

The data processing system may provide a data processing graphical user interface that integrates multiple software tools to provide seamless communication and collaboration among systems and the people who use the systems. The graphical user interface may further provide transparency into an organization and enhance the management of business processes via advanced workflow tools. The graphical user interface may secure, integrate, and provide a single point of entry for all relevant content and resources, and support managing scale across all areas of an organization. A common repository for knowledge is provided that creates a single authoritative source for both data and documents. Both current and historical data for on-demand analysis and reporting may be accessible. The data processing system may facilitate getting the right information to the right people in a timely fashion and transform raw sales, market and consumer data into re-usable sales information and analysis.

The analysis logic embodied by the Product Analysis 848, Brand Analysis 850, Shopper Analysis 152 and Consumer Analysis 854 may be illustrated in reference to the user interfaces or screen displays for inputting the specified analysis parametric filter 846 and the reports generated from the analysis results datastore 856. The user interfaces may be implemented with interfaces displayed separately, or several user interfaces for both the filter selection and the results reports may be displayed simultaneously on a single screen display in the combinations as shown in the figures accompanying the following discussion.

Product Analysis

As suggested by the name, the current analysis is performed at the bottom level of the product hierarchy and this is the reason why the analysis does not contains competitors data.

Product analysis is composed of many different sub processes:
    Sell Out by Brand and EAN (European Article Number)
    Sell Out by Sub Category—Value Share Period To Date
    Sell Out by Sub Category—Trend
    New Item Introduction Product Analysis Sell Out by Brand or EAN This analysis is used to explore shopper behavior and it is performed at Brand or EAN level.

Figure 9:
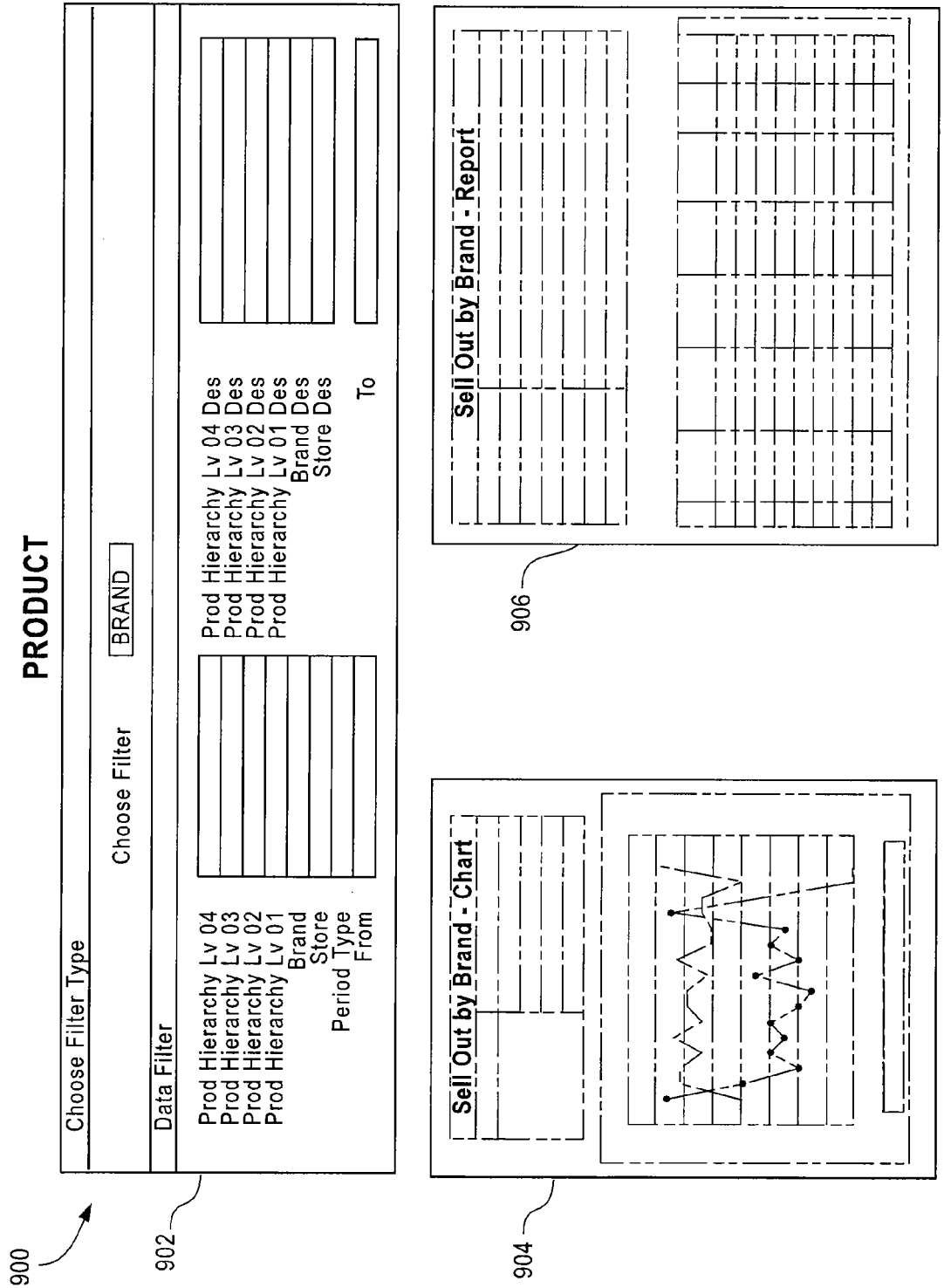
Figure 9A:
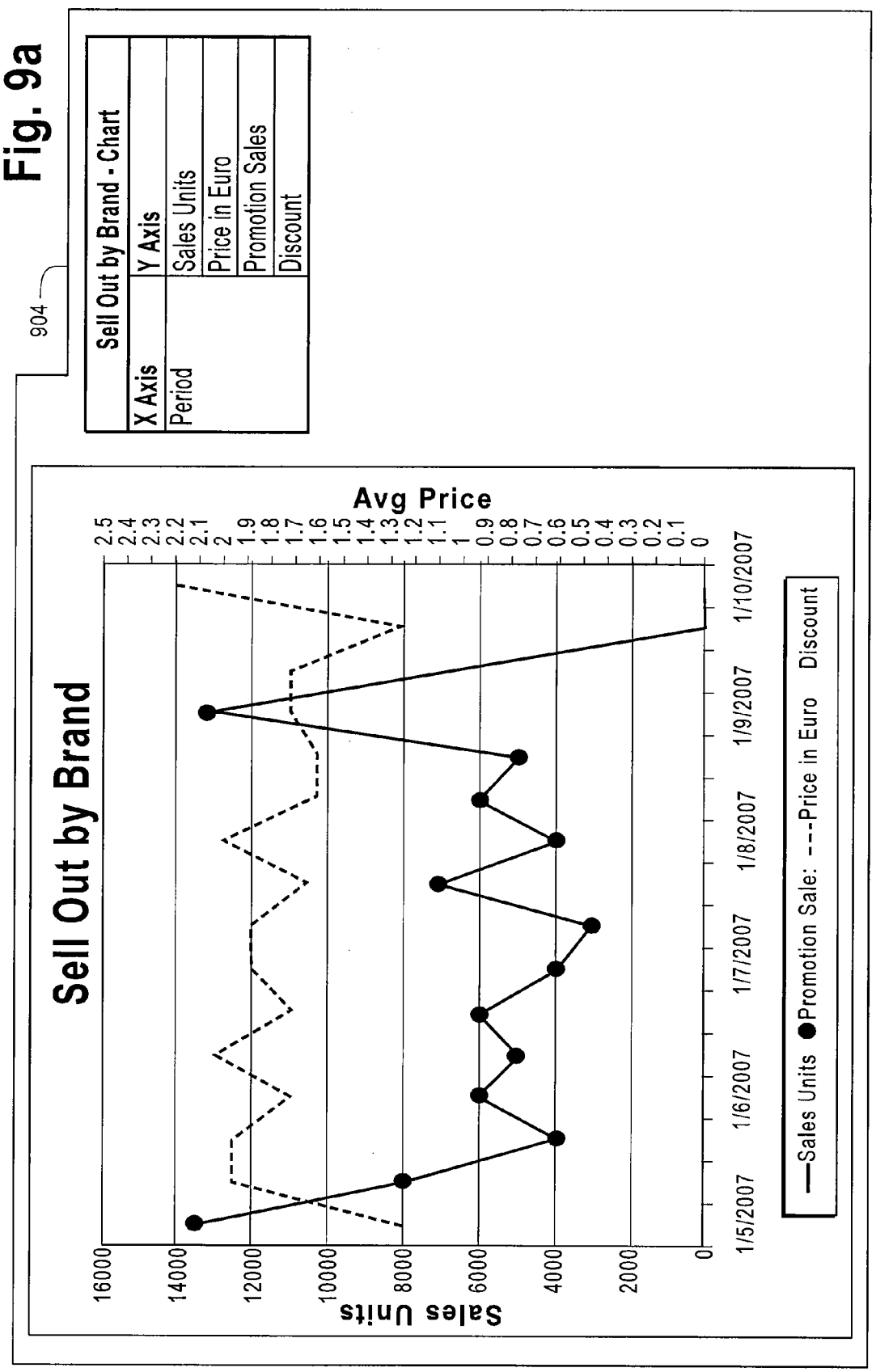

FIGS. 9, 9a and 9b show an exemplary screen display 900 for a parametric filter user interface 902, a graphical report 904, and an analytical result data table 906, respectively, for the product sales analysis per brand. As shown in FIG. 9, the analysis requires filling up the following groups of filters using the parametric filter input table 902:
    Product Hierarchy (four levels to fill up)
    Store Information (different kind of information about the considered store)
    Period Type (week, month or year)
    Period (Timing)

The following table contains logical dimensions and measures about the described report. The adjective "logical" is used to emphasize the fact that dimensions and measures listed in the table below are not the physical information available in the analytics, but the conceptual idea behind the name.

TABLE 1

| DIMENSIONS | MEASURES |
| --- | --- |
| Time | Sales Units |
| Store Information | Sales Value |
|  | Sales Volume |
|  | Average Price |
|  | Discount |
|  | Promotion Sales |

The input user interface 902 is used to show the selection page to choose if you want to perform the analysis at Brand or EAN level and set parametric filter information about the extraction to run. The graphic report 904 is used to show graphically the results highlighting the promotion period and the comparison with the average price trend. Table 906 is used to show in table the same results shown graphically in the graphical report 904.

Product Analysis

Sell Out by Sub Category—Value Share Period to Date

This analysis is used to explore shopper behavior and it is performed at Category level.

FIGS. 10, 10a and 10b show an exemplary screen display 1000 for a parametric filter user interface 1002, a graphical report 1004, and an analytical result data table 1006, respectively, for the product sales trend analysis per sub category. As shown in FIG. 10, the analysis requires filling up in the input user interface 1002 the following groups of filters:
    Select Category
    Category
    Store Information (different kind of information about the considered store)
    Period Type (week, month or year)
    Period (Timing)

The following table contains dimensions and measures about the described report.

TABLE 2

| DIMENSIONS | MEASURES |
|---|---|
| Frequency | Category Sales Value CP |
| Period | % Change Category Sales Value CP |
| Category | Subcategory Sales Value CP |
| Subcategory | % Change Subcategory Sales Value CP |
| Brand | Subcategory Sales Value Contribution to Category |
| Store Information | % Change Subcategory Sales Value Contribution to Category |
| | Brand Sales Value |
| | % Change Brand Sales Value |
| | Brand Sales Value Contribution to Subcategory CP |
| | Brand Sales Value Contribution to Subcategory PY |
| | % Change Brand Sales Value Contribution to Subcategory |
| | Brand Sales Value Contribution to Category CP |
| | % Change Brand Sales Value Contribution to Category |

The user input interface 1002 is used to show the selection page to set filter information about the extraction to run.

The graphical report 1004 is used to show graphically the results highlighting the trend of the different sub-category belonging to the selected category and the comparison with selected brand. Each column represents the contribution of each sub category to the category.

The data table 1006 is used to show in table the same results shown graphically in the graphical report 1004.

Product Analysis

Sell Out by Subcategory—Trend

This analysis is used to explore shopper behavior and it is performed at Category level.

Figure 11:
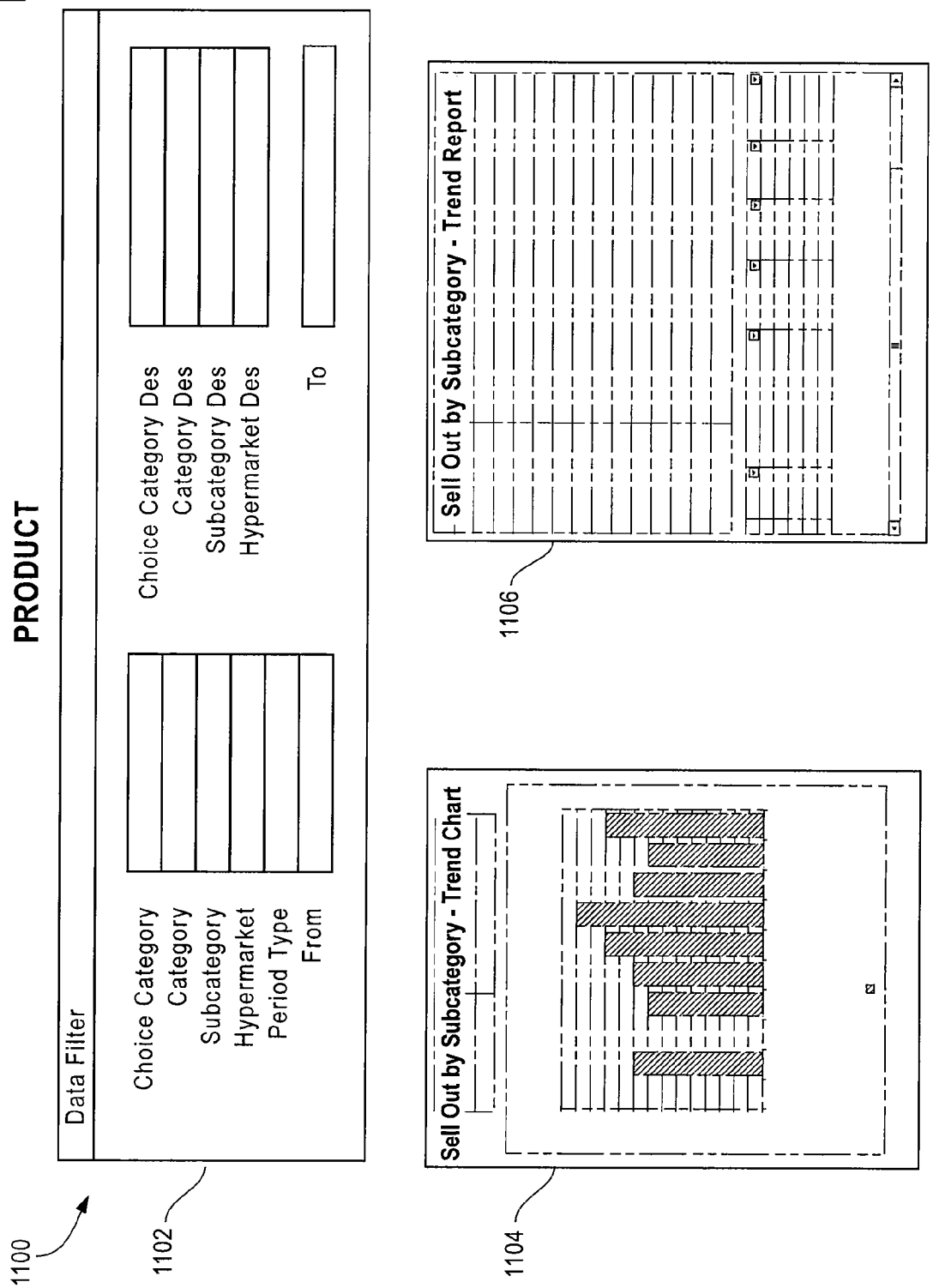
Figure 11A:
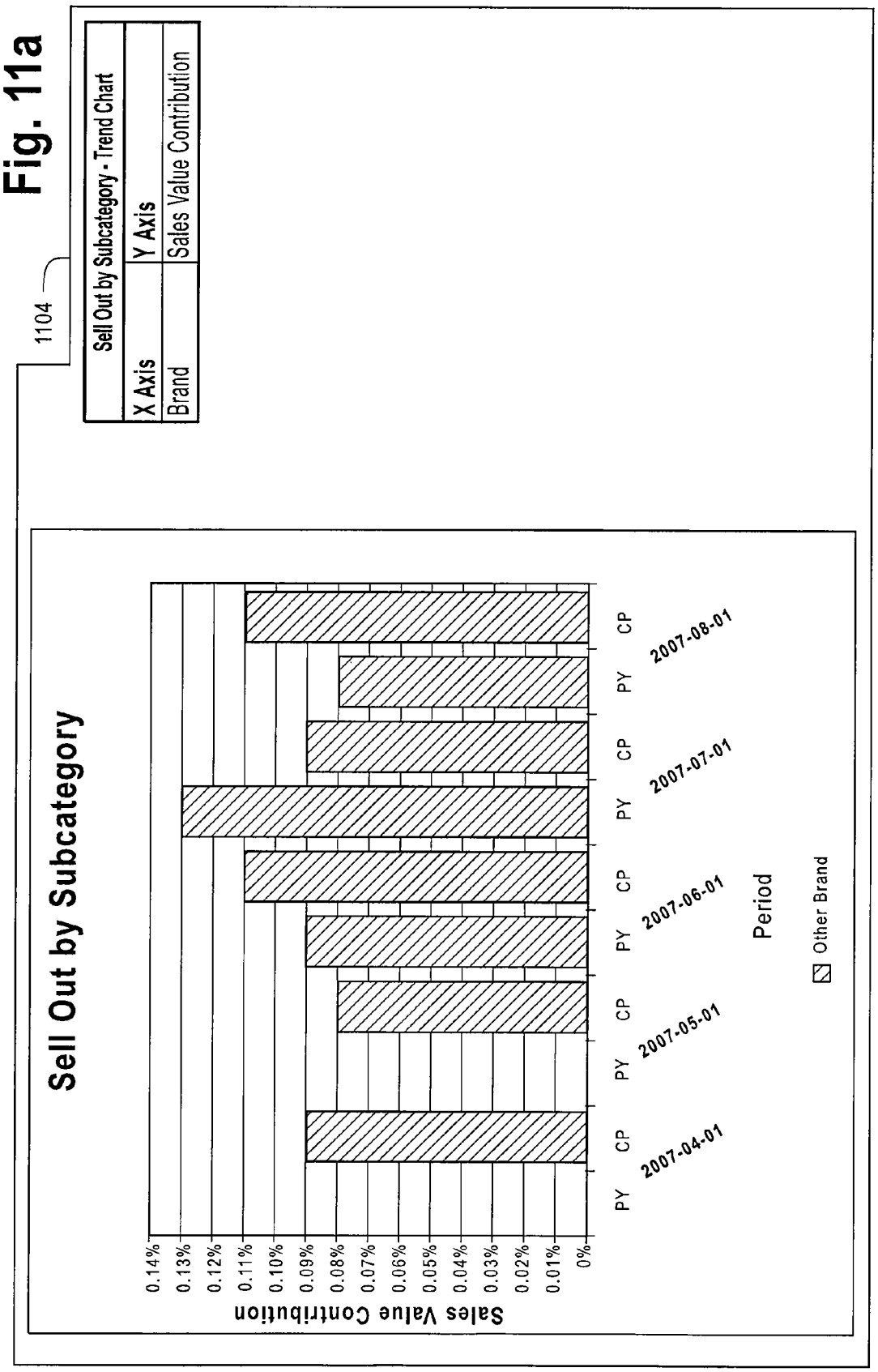

FIGS. 11, 11a and 11b show an exemplary screen display 1100 for a parametric filter user interface 1102, a graphical report 1004, and an analytical result data table 1106, respectively, for the product analysis for new item introduction. As shown in FIG. 11, the analysis requires filling up in the input user interface 1002 the following groups of filters:

Select Category
Category
Sub Category
Store Information (different kind of information about the considered store)
Period Type (week, month or year)
Period (Timing)

The following table contains dimensions and measures about the described report.

TABLE 3

| DIMENSIONS | MEASURES |
|---|---|
| Frequency | Category Sales Value CP |
| Period | % Change Category Sales Value CP |
| Category | Subcategory Sales Value CP |
| Subcategory | % Change Subcategory Sales Value CP |
| Brand | Subcategory Sales Value Contribution to Category |
| Store Information | % Change Subcategory Sales Value Contribution to Category |
| | Brand Sales Value |
| | % Change Brand Sales Value |
| | Brand Sales Value Contribution to |

TABLE 3-continued

| DIMENSIONS | MEASURES |
|---|---|
| | Subcategory CP |
| | Brand Sales Value Contribution to Subcategory PY |
| | % Change Brand Sales Value Contribution to Subcategory |
| | Brand Sales Value Contribution to Category CP |
| | % Change Brand Sales Value Contribution to Category |

The user input interface 1102 is used to show the selection page to set filter information about the extraction to run.

The graphical report 1104 is used to show graphically the results highlighting the comparison between current year and prior year on the different period for a specific sub category.

The data table 1106 is used to show in table the same results shown graphically in the graphical report 1104.

Product Analysis

New Item Introduction

This analysis is used to explore shopper behavior and it is performed on New Item Introduced.

Figure 12:
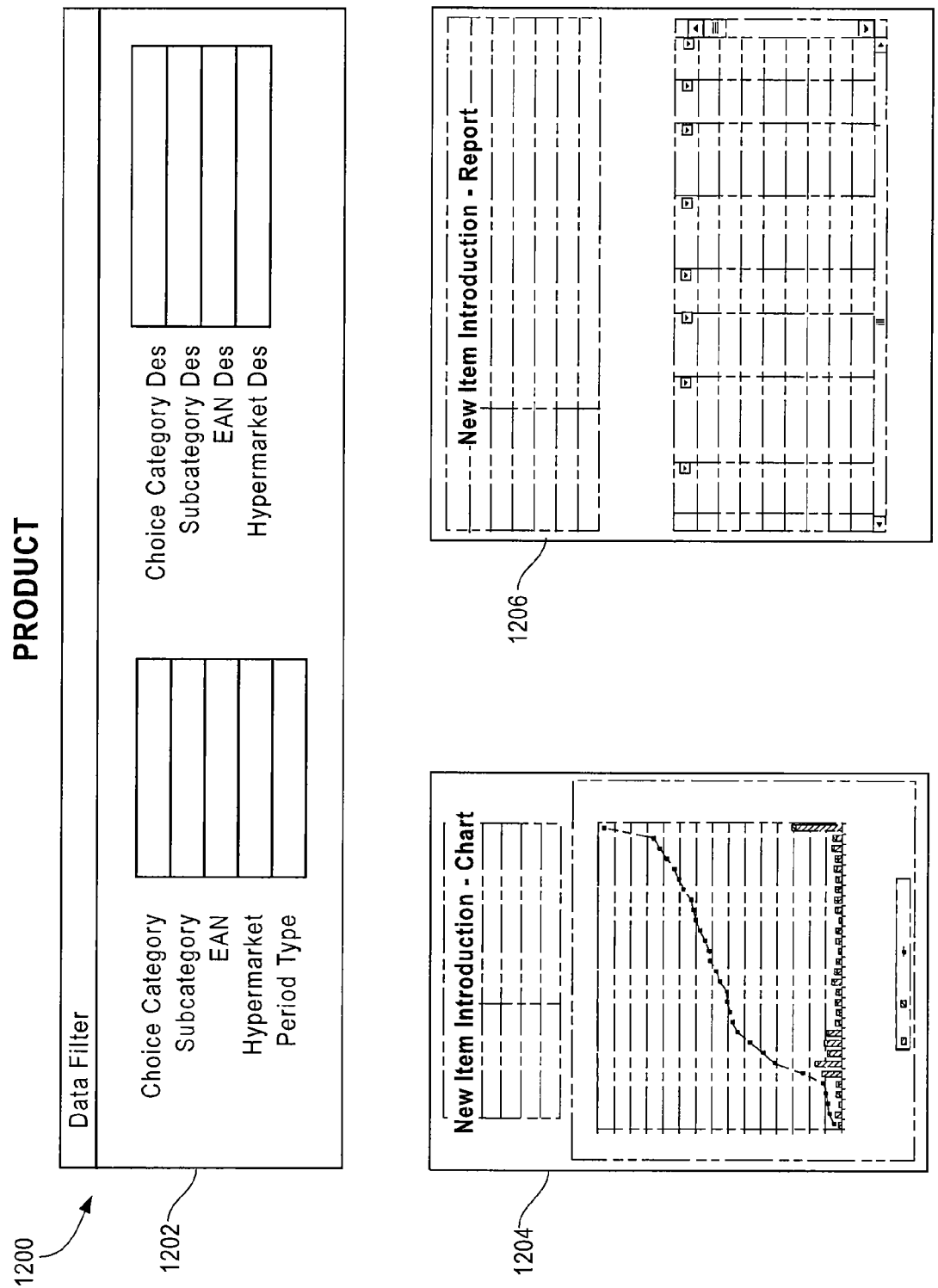

FIGS. 12, 12a and 12b show an exemplary screen display for a parametric filter user interface 1202, a graphical report 1204, and an analytical result data table 1206, respectively, for the product analysis for new item introduction. As shown in FIG. 12, the analysis requires filling up in the input user interface 1202 the following groups of filters:

Select Subcategory
Subcategory
Store Information (different kind of information about the considered store)
Period Type (week, month or year)
EAN Value The following table contains dimensions and measures about the described report.

TABLE 4

| DIMENSIONS | MEASURES |
|---|---|
| Time | Number of Triers |
| Store Information | % of Triers |
| EAN Description | Number of Repeaters |
| | % of Repeaters |
| | Number of Customers (cumulated) |

The user input interface 1202 is used to show the selection page to set filter information about the extraction to run.

The graphical report 1204 is used to show graphically the results highlighting triers on repeaters and on top of that cumulative number of customer for each period.

The data table 1206 is used to show in table the same results shown graphically in the graphical report 1204.

Brand Analysis

As suggested by the name, the current analysis is performed mostly at the brand level on the product hierarchy and this is the reason why the analysis contains also competitors' data. This kind of data, supplied by external institute, is usually detailed up to category or brand level; in case of an agreement between the company and the institute, data can be detailed also at lower levels.

Brand analysis is composed of many different sub processes:
Brand Value Share by Sub Category—Period Ta Date
Brand Value Share Trend by Sub Category
Brand Positioning
Pareto Analysis
Joiners, Leavers and Repeaters customers analysis
Brand Switching Brand Analysis Brand Value Share by Sub Category—Period Ta Date This analysis is used to explore shopper behavior and it is performed at Brand Level.

Figure 13A:
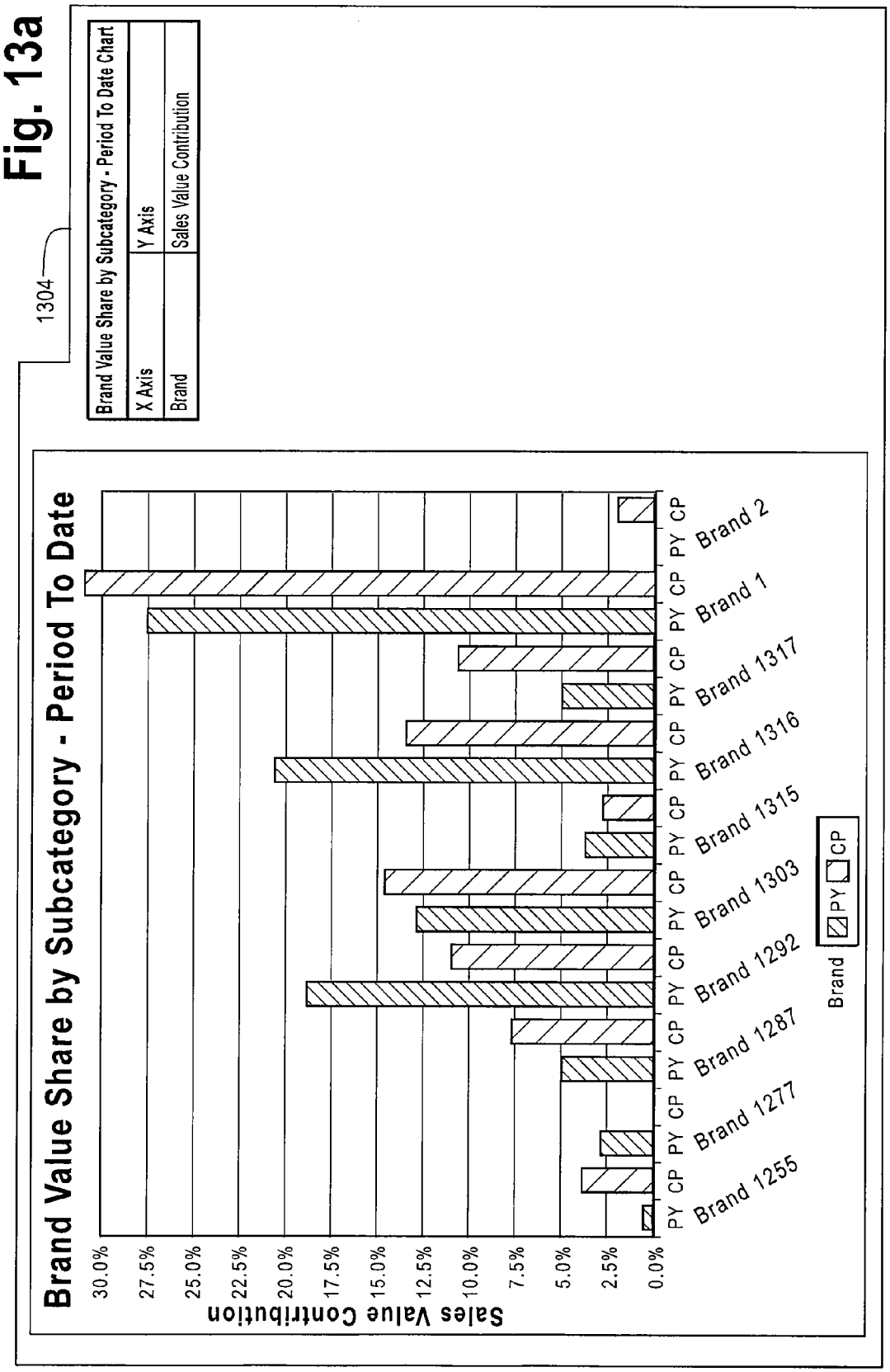

FIGS. 13, 13a and 13b show an exemplary screen display 1300 for a parametric filter user interface 1302, a graphical report 1304, and an analytical result data table 1306, respectively, for the brand value share analysis per sub category (cumulative brand share in the selected period). As shown in FIG. 13, the analysis requires filling up in the input user interface 1302 the following groups of filters:
Select Sub Category
Sub Category
Store Information (different kind of information about the considered store)
Period Type (week, month or year)
Period (Timing)

The following table contains dimensions and measures about the described report.

TABLE 5

| DIMENSIONS | MEASURES |
| --- | --- |
| Frequency | Category Sales Value CP |
| Period | % Change Category Sales Value CP |
| Category | Subcategory Sales Value CP |
| Subcategory | % Change Subcategory Sales Value CP |
| Brand | Subcategory Sales Value Contribution to Category |
| Store Information | % Change Subcategory Sales Value Contribution to Category |
| | Brand Sales Value |
| | % Change Brand Sales Value |
| | Brand Sales Value Contribution to Subcategory CP |
| | Brand Sales Value Contribution to Subcategory PY |
| | % Change Brand Sales Value Contribution to Subcategory |
| | Brand Sales Value Contribution to Category CP |
| | % Change Brand Sales Value Contribution to Category |

The user input interface 1302 is used to show the selection page to set filter information about the extraction to run.

The graphical report 1304 is used to show graphically the results comparing current and prior year data on different brand belonging to the same category. In this example, the chart contains also competitors' results and each column represents the contribution of each brand to the sub category.

The data table 1306 is used to show in table the same results shown graphically in the graphical report 1304.

Brand Analysis

Brand Value Share Trend by Sub Category

This analysis is used to explore shopper behavior and it is performed at Brand Level.

Figure 14:
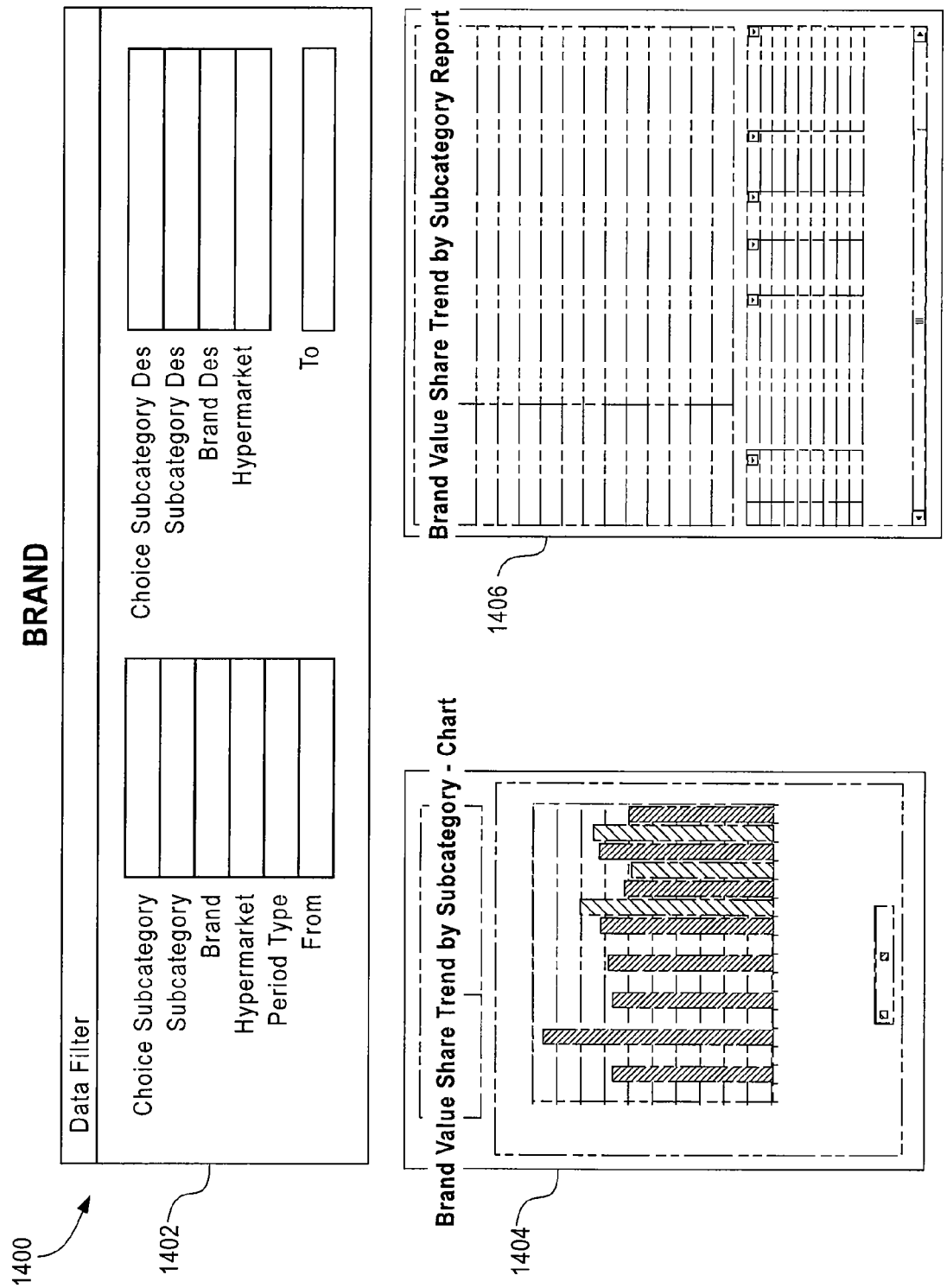
Figure 14A:
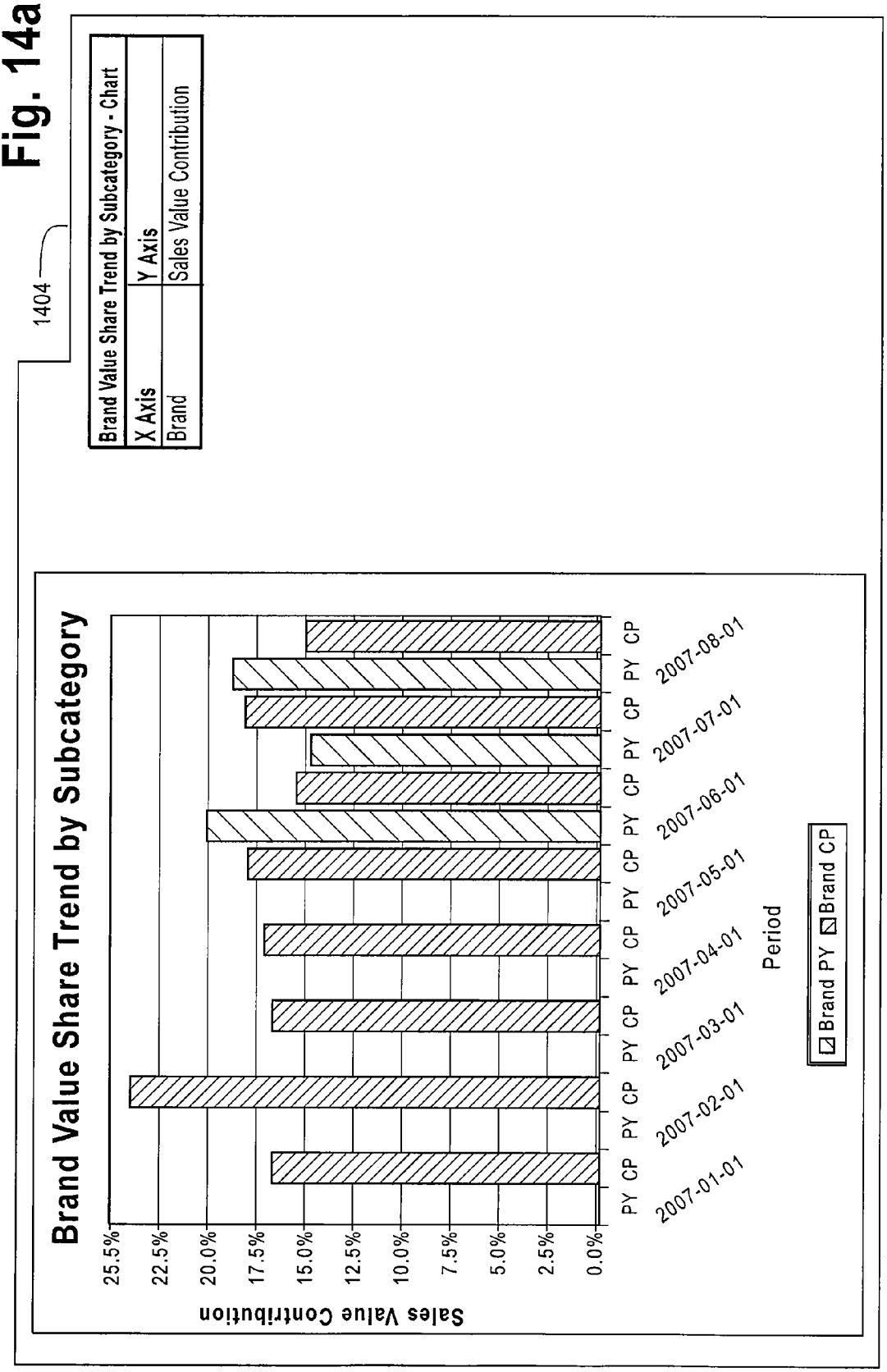

FIGS. 14, 14a and 14b show an exemplary screen display 1400 for a parametric filter user interface 1402, a graphical report 1404, and an analytical result data table 1406, respectively, for the brand value share trend analysis per sub category. As shown in FIG. 14, the analysis requires filling up in the user input interface 1402 the following groups of filters:
Select Sub Category
Sub Category
Brand Distribution
Store Information (different kind of information about the considered store)
Period Type (week, month or year)
Period (Timing)

The following table contains dimensions and measures about the described report.

TABLE 6

| DIMENSIONS | MEASURES |
| --- | --- |
| Frequency | Category Sales Value CP |
| Period | % Change Category Sales Value CP |
| Category | Subcategory Sales Value CP |
| Subcategory | % Change Subcategory Sales Value CP |
| Brand | Subcategory Sales Value Contribution to Category |
| Store Information | % Change Subcategory Sales Value Contribution to Category |
| | Brand Sales Value |
| | % Change Brand Sales Value |
| | Brand Sales Value Contribution to Subcategory CP |
| | Brand Sales Value Contribution to Subcategory PY |
| | % Change Brand Sales Value Contribution to Subcategory |
| | Brand Sales Value Contribution to Category CP |
| | % Change Brand Sales Value Contribution to Category |

The user input interface 1402 is used to show the selection page to set filter information about the extraction to run.

The graphical report 1404 is used to show graphically the results highlighting the trend on the sales value between current and prior year for a specific brand. Missing Prior Year data for a specific period is due to missing brand on the market.

The data table 1406 is used to show in table the same results shown graphically in the graphical report 1404.

Brand Analysis

Brand Positioning

This analysis is used to explore shopper behavior and it is performed at Brand Level.

Figure 15A:
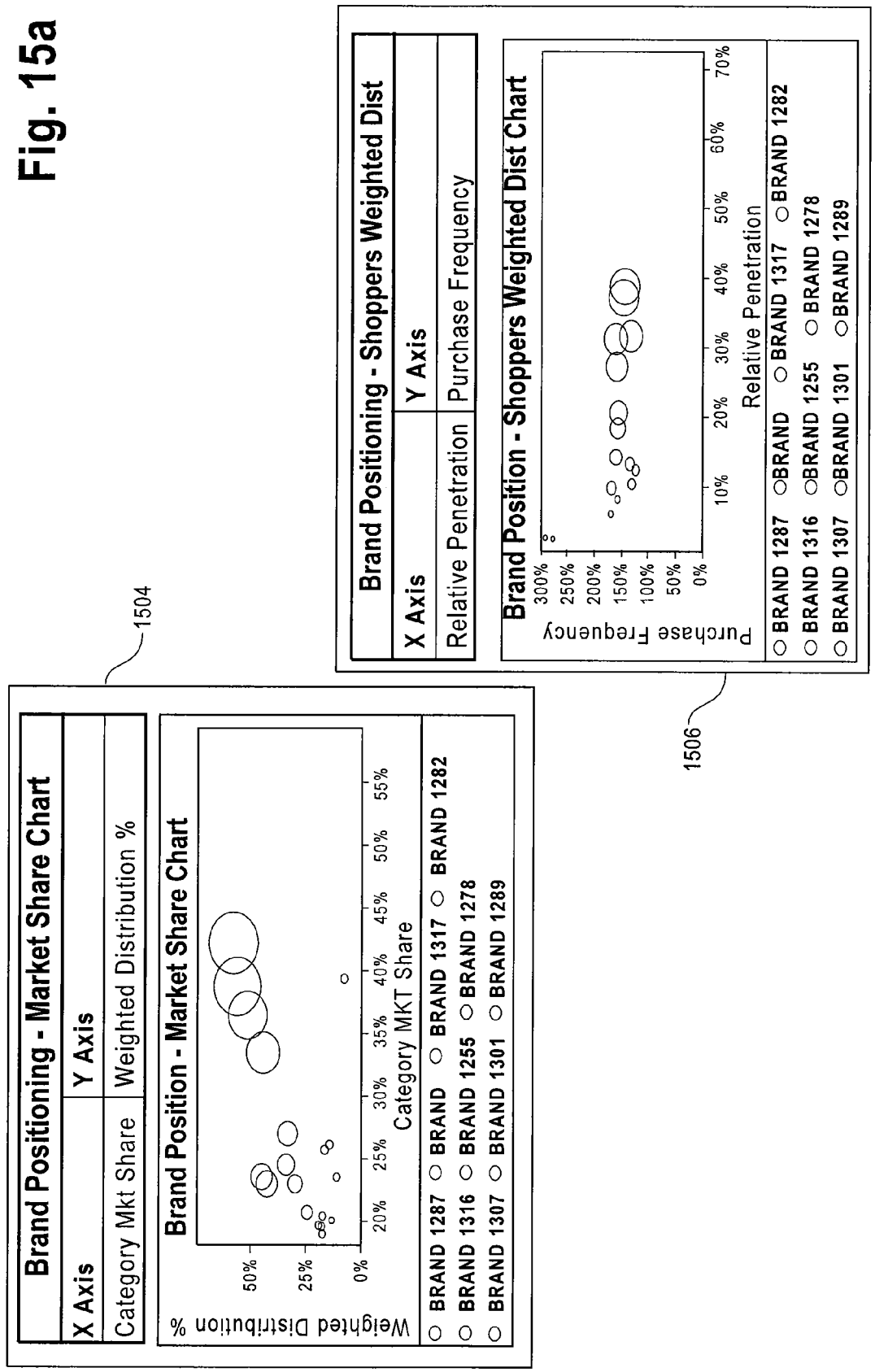

FIGS. 15, 15a, and 15b show an exemplary screen display 1500 for a parametric filter user interface 1502, a first graphical report 1504, a second graphical report 1506 and an analytical result data table 1508, respectively, for the brand positioning analysis. As shown in FIG. 15, the analysis requires filling up in the user input interface 1502 the following groups of filters:
Select Sub Category
Sub Category
Store Information (different kind of information about the considered store)
Period Type (week, month or year)
Period (Timing)

The following table contains dimensions and measures about the described report.

TABLE 7

| DIMENSIONS | MEASURES |
| --- | --- |
| Brand | Category Market Share |
| | Category Market Share PP |
| | Weighted Distribution |
| | Weighted Distribution PP |
| | Market Share |
| | Market Share PP |
| | Relative Penetration |
| | Relative Penetration PP |
| | Purchase Frequency |
| | Purchase Frequency PP |

The user input interface 1502 is used to show the selection page to set filter information about the extraction to run.

The first graphical report 1504 is used to show graphically the results with a bubble chart where the weighted distribution values are expressed in relation of the Brand Share in Category. Bubble size represents the market share.

The second graphical report 1506 is used to show graphically the results with a bubble chart where the Brand Purchase Intensity values are expressed in relation of the Relative Brand Penetration. Bubble size represents the Weighted Distribution.

The data table 1508 is used to show in table the same results shown graphically in the graphical reports 1504 and 1506.

Brand Analysis

Pareto Analysis

This analysis is used to explore shopper behavior and it is performed at Brand Level.

Figure 16:
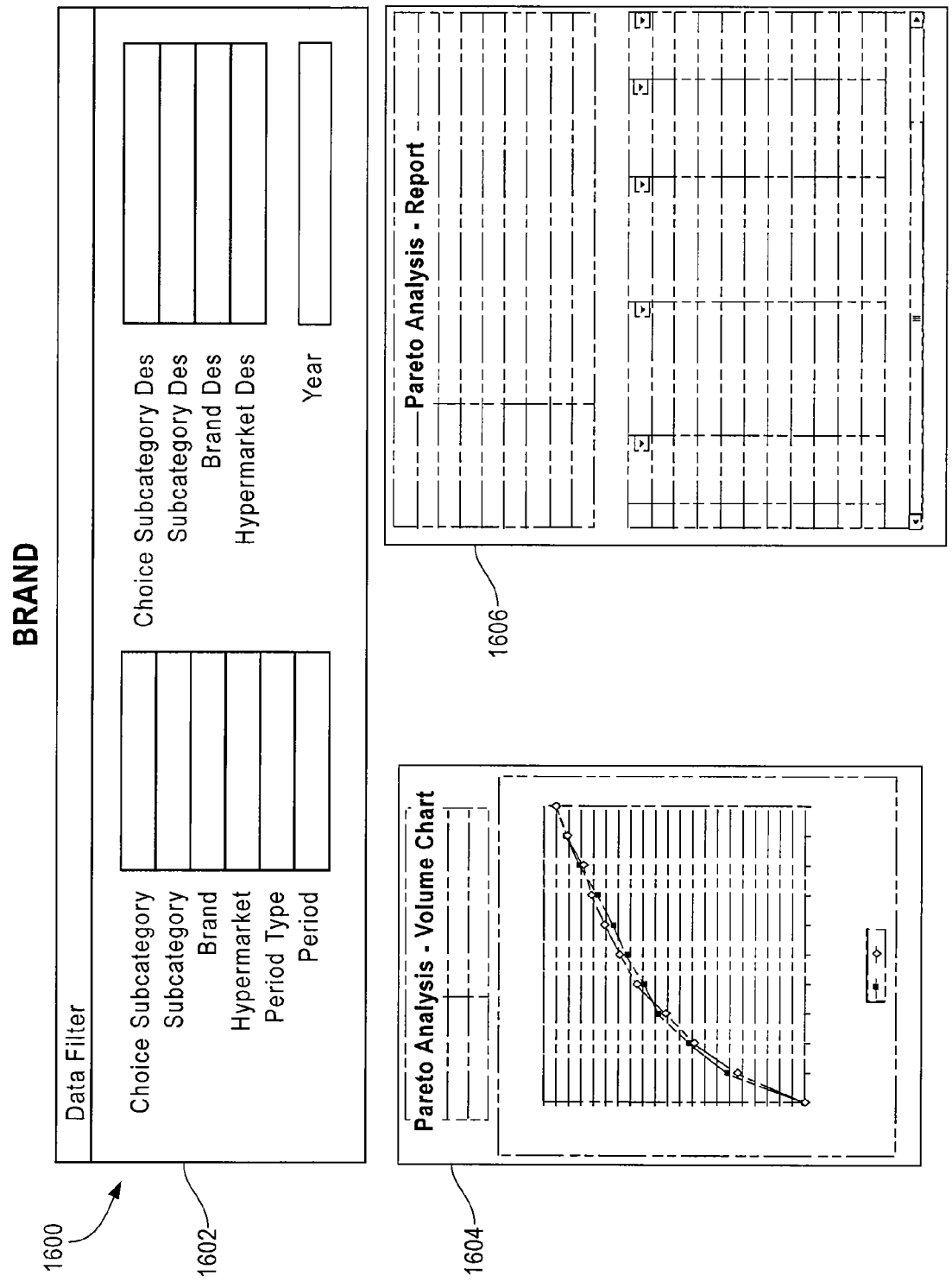
Figure 16A:
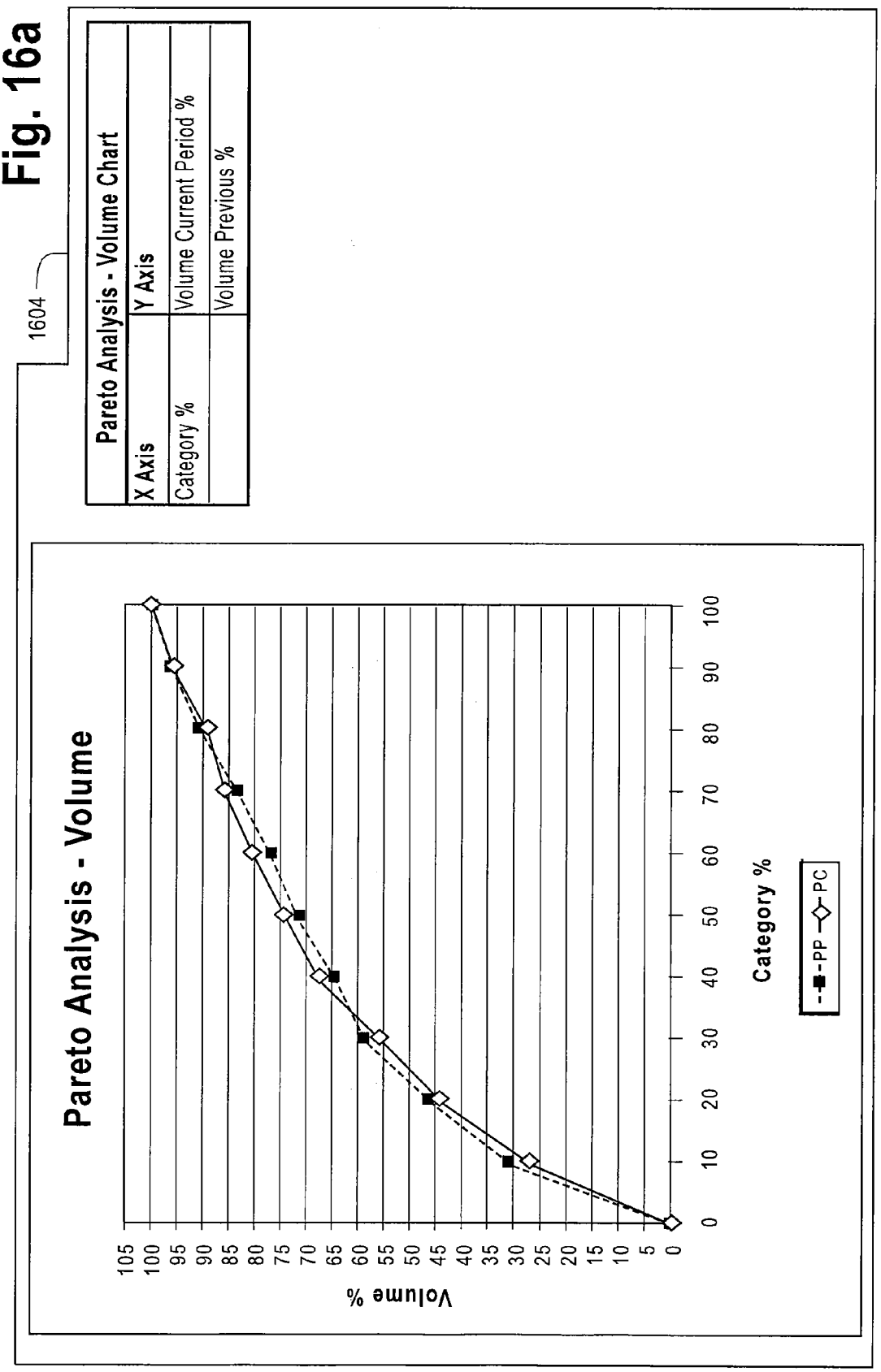

FIGS. 16, 16*a* and 16*b* show an exemplary screen display 1600 for a parametric filter user interface 1602, a graphical report 1604, and an analytical result data table 1606, respectively, for the brand analysis using Pareto analysis. As shown in FIG. 16, the analysis requires filling up in the user input interface 1602 the following groups of filters:
Select Sub Category
Sub Category
Brand Distribution
Store Information (different kind of information about the considered store)
Period Type (week, month or year)
Period (Timing)

The following table contains dimensions and measures about the described report.

TABLE 8

| DIMENSIONS | MEASURES |
| --- | --- |
| Year | Category % |
| Period | Value % |
| Store Information | Quantity % |
| Subcategory | Volume % |
| Brand | Value PP % |
| | Quantity PP % |
| | Volume PP % |

The user input interface 1602 is used to show the selection page to set filter information about the extraction to run.

The graphical report 1604 is used to show graphically the results with a Pareto (Concentration) Curve on Volume data for the Prior and the Current Period.

The data table 1604 is used to show in table the same results shown graphically in the graphical report 1604.

Brand Analysis

Joiners, Leavers and Repeaters Customers' Analysis

This analysis is used to explore shopper behavior and it is performed at Brand Level on customers.

Figure 17:
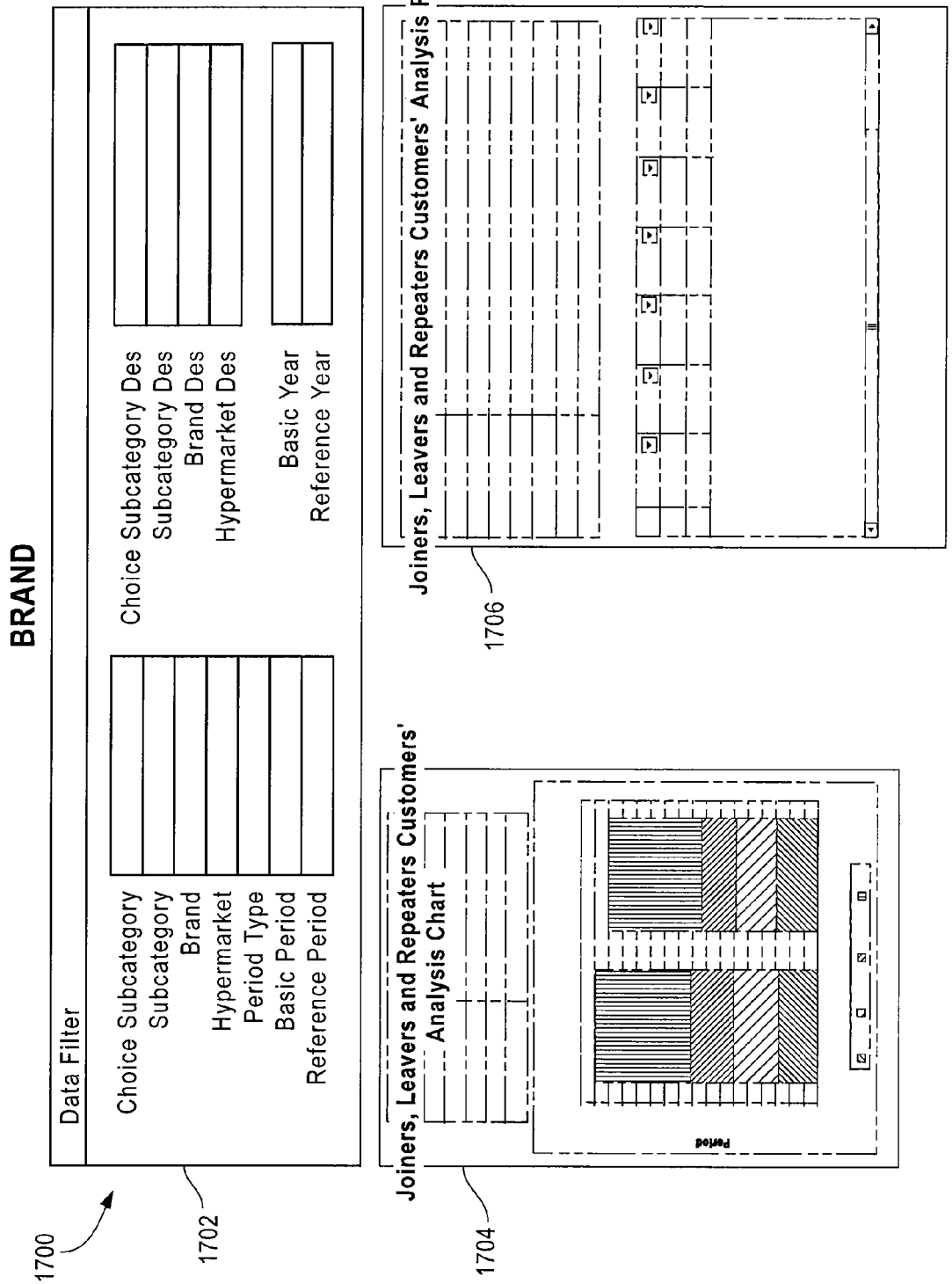
Figure 17A:
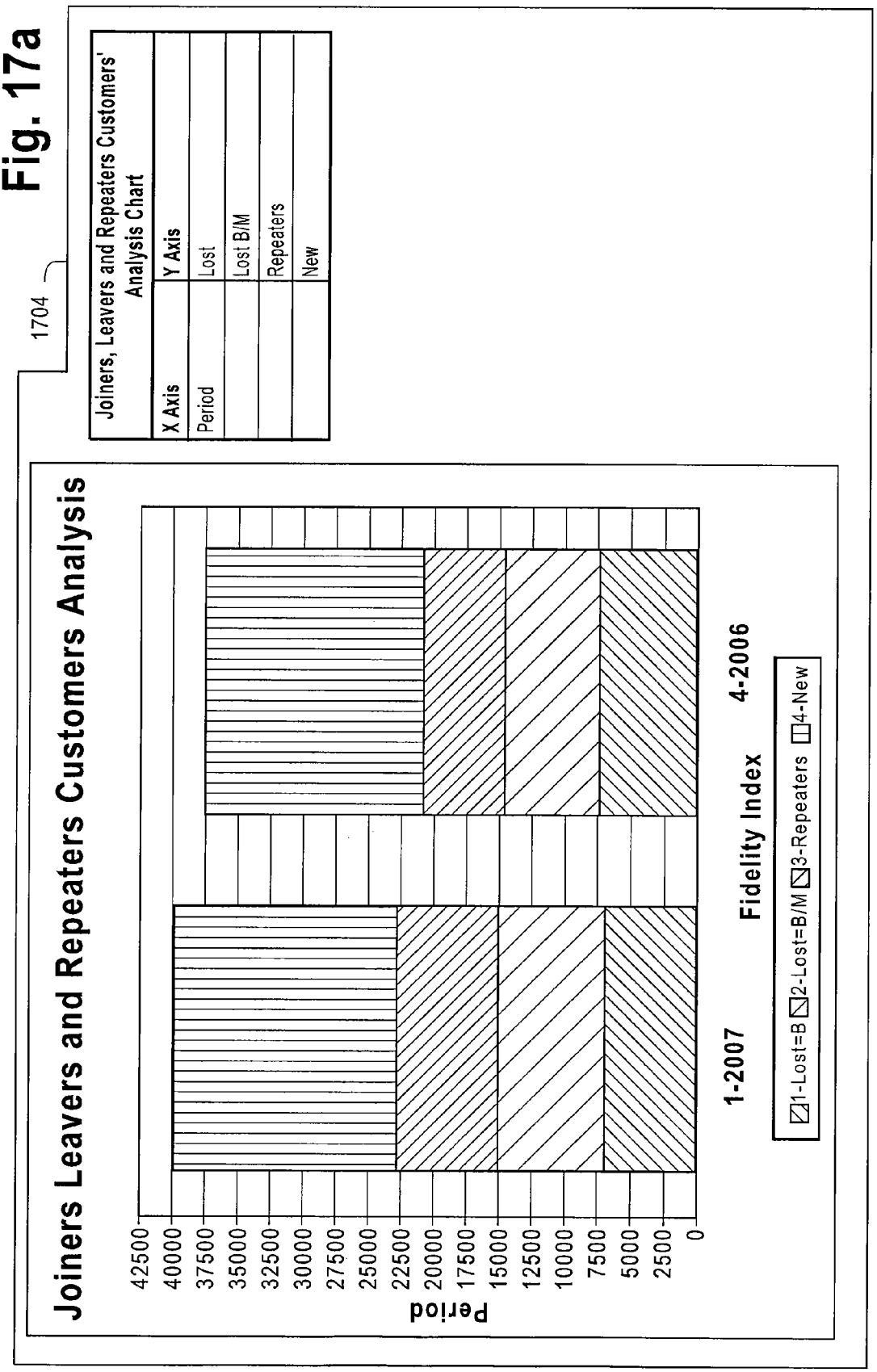

FIGS. 17, 17*a* and 17*b* show an exemplary screen display 1700 for a parametric filter user interface 1702, a graphical report 1704, and an analytical result data table 1706, respectively, for the brand analysis for customer joiners, leavers and repeaters. As shown in FIG. 17, the analysis requires filling up in the user input interface 1702 the following groups of filters:
Select Sub Category
Sub Category
Store Information (different kind of information about the considered store)
Brand Distribution
Period Type (week, month or year)
Period (Timing)
Period Evolution The following table contains dimensions and measures about the described report.

TABLE 9

| DIMENSIONS | MEASURES |
| --- | --- |
| Year | Stable Customers |
| Period | New Customers |
| | Lost Customers - Brand |
| | Lost Customers - Brand Category |
| | Stable Customers % |
| | New Customers % |
| | RPR |

The user input interface 1702 is used to show the selection page to set filter information about the extraction to run.

The graphical report 1704 is used to show graphically the results highlighting with different colors the contribution of the different kind of customer to the total amount. Two columns are used to compare current and prior period.

The data table 1706 is used to show in table the same results shown graphically in the graphical report 1704.

Brand Analysis

Brand Switching

This analysis is used to explore shopper behavior and it is performed at Brand Level.

Figure 18:
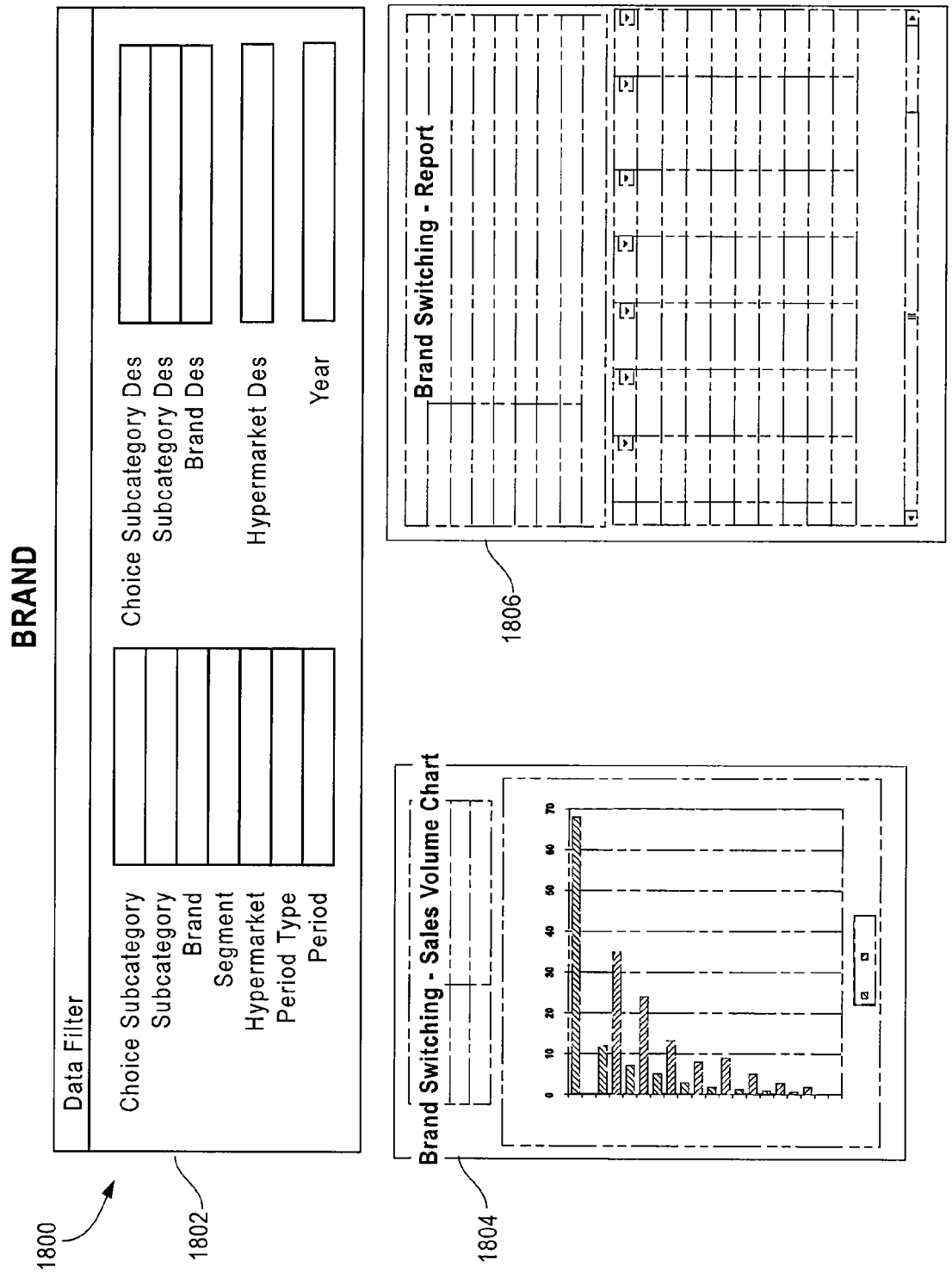
Figure 18A:
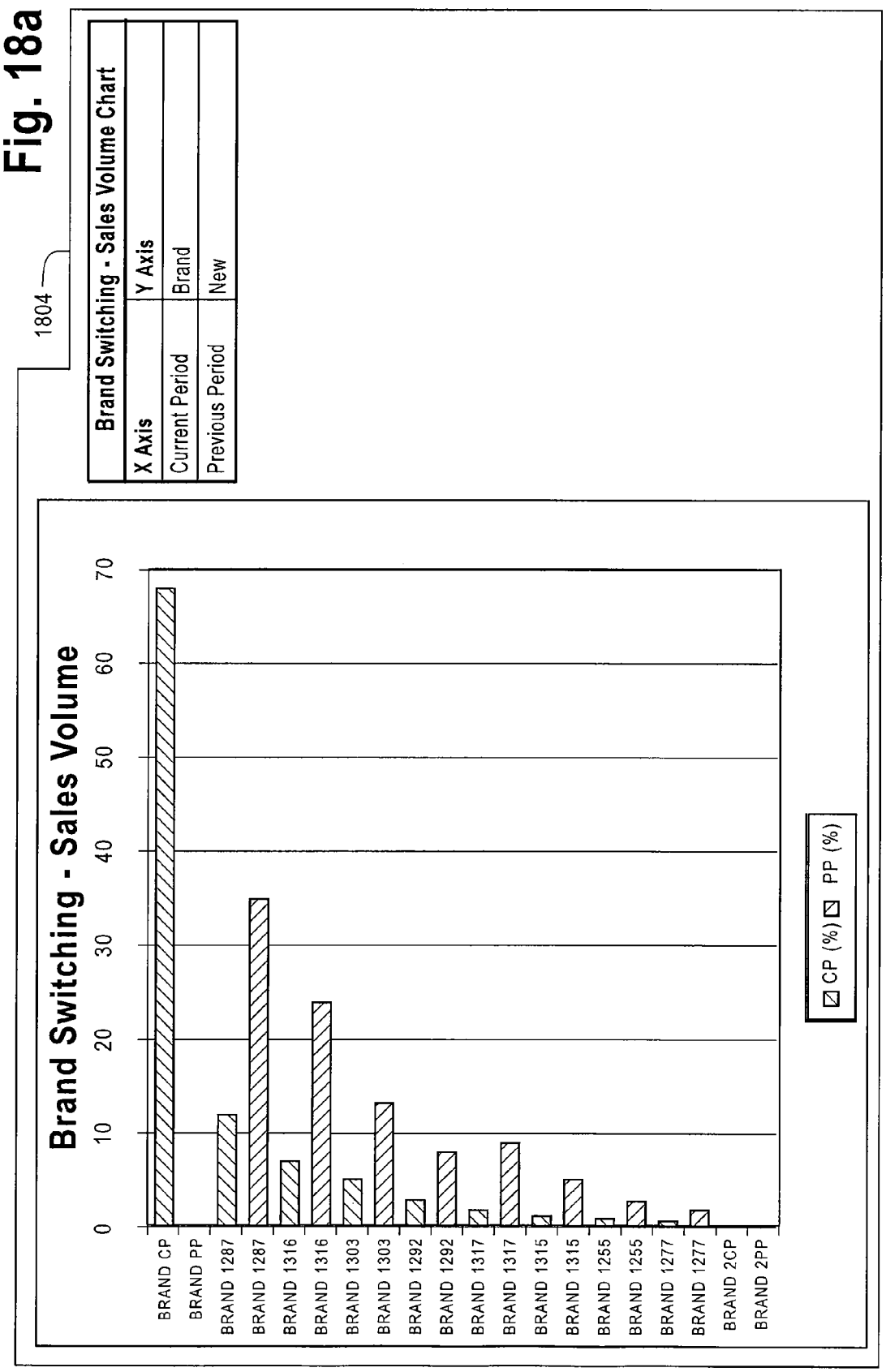
Figure 19:
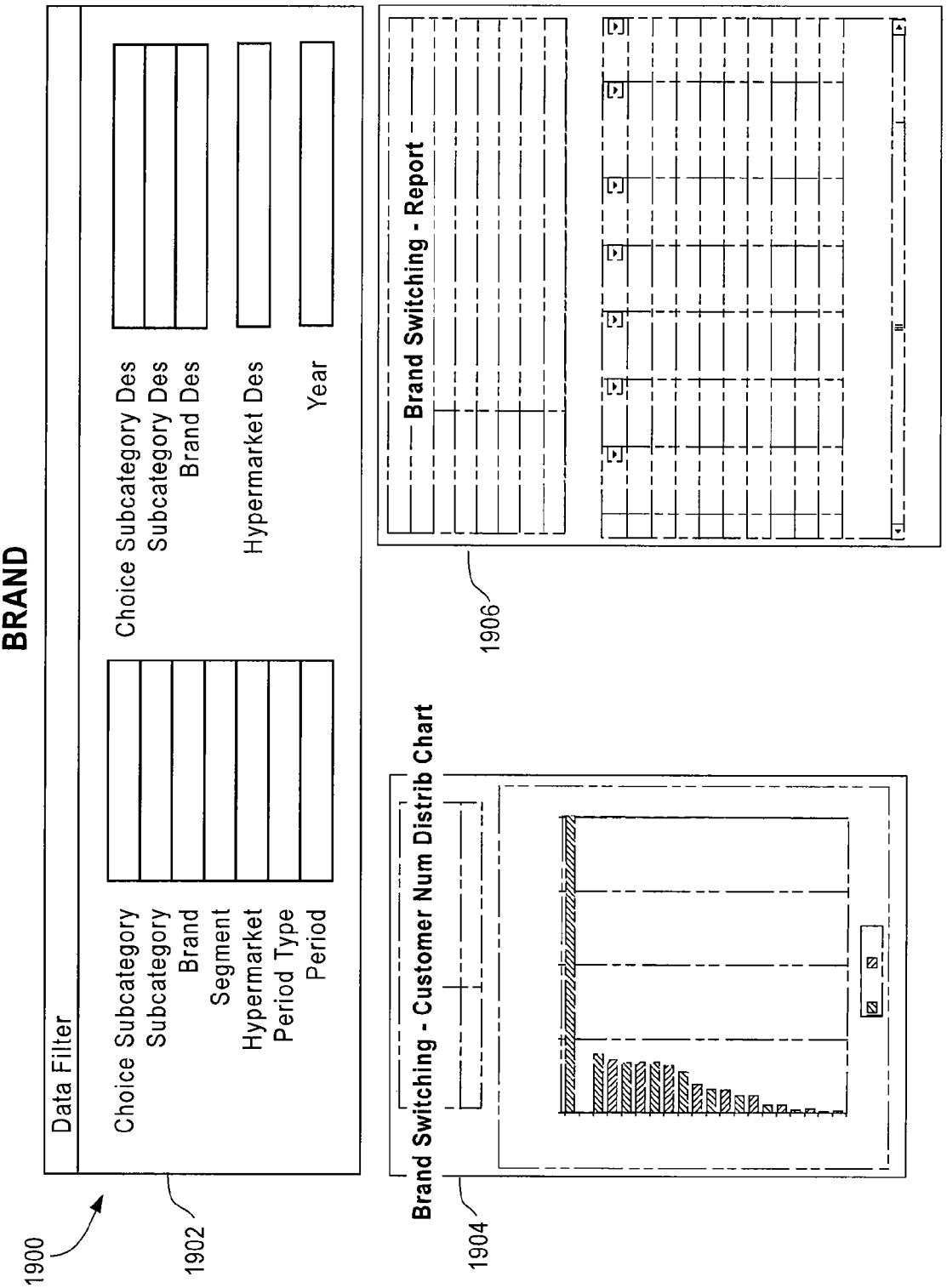

FIGS. 18, 18*a*, 18*b,* 19, 19*a* and 19*b* show exemplary screen displays 1800 and 1900 for a parametric filter user interface 1802 and 1902, a graphical report 1804 and 1904, and an analytical result data table 1806 and 1906, respectively, for the brand switching analysis per sub category. As shown in FIGS. 18 and 19, the analysis requires filling up in the user input interface 1802 and 1902 the following groups of filters:
Select Sub Category
Sub Category
Store Information (different kind of information about the considered store)
Brand Distribution
Channel
Period Type (week, month or year)
Period (Timing)

The following table contains dimensions and measures about the described report.

TABLE 10

| DIMENSIONS | MEASURES |
| --- | --- |
| Year | Sales Volume |
| Period | Sales Volume PP |
| Store Information | Sales Volume % |
| Subcategory | Customers Num Distribution |
| Segment | Customers Num Distribution PP |
|  | Customers Num Distribution % |

The user input interface 1802 and 1902 is used to show the selection page to set filter information about the extraction to run.

The graphical report 1804 is used to show graphically the results with a bar chart for the Sales Volume on the different brands (competitors' data included). Comparison between current and prior period allows identifying brands switching.

The graphical report 1904 is used to show graphically the results with a bar chart for the Number of Customers associated to different brands (competitors' data included). Comparison between current and prior period allows identifying brands switching.

The data table 1806 is used to show in table the same results shown graphically in the graphical reports 1804 and 1904.

Figure 20:
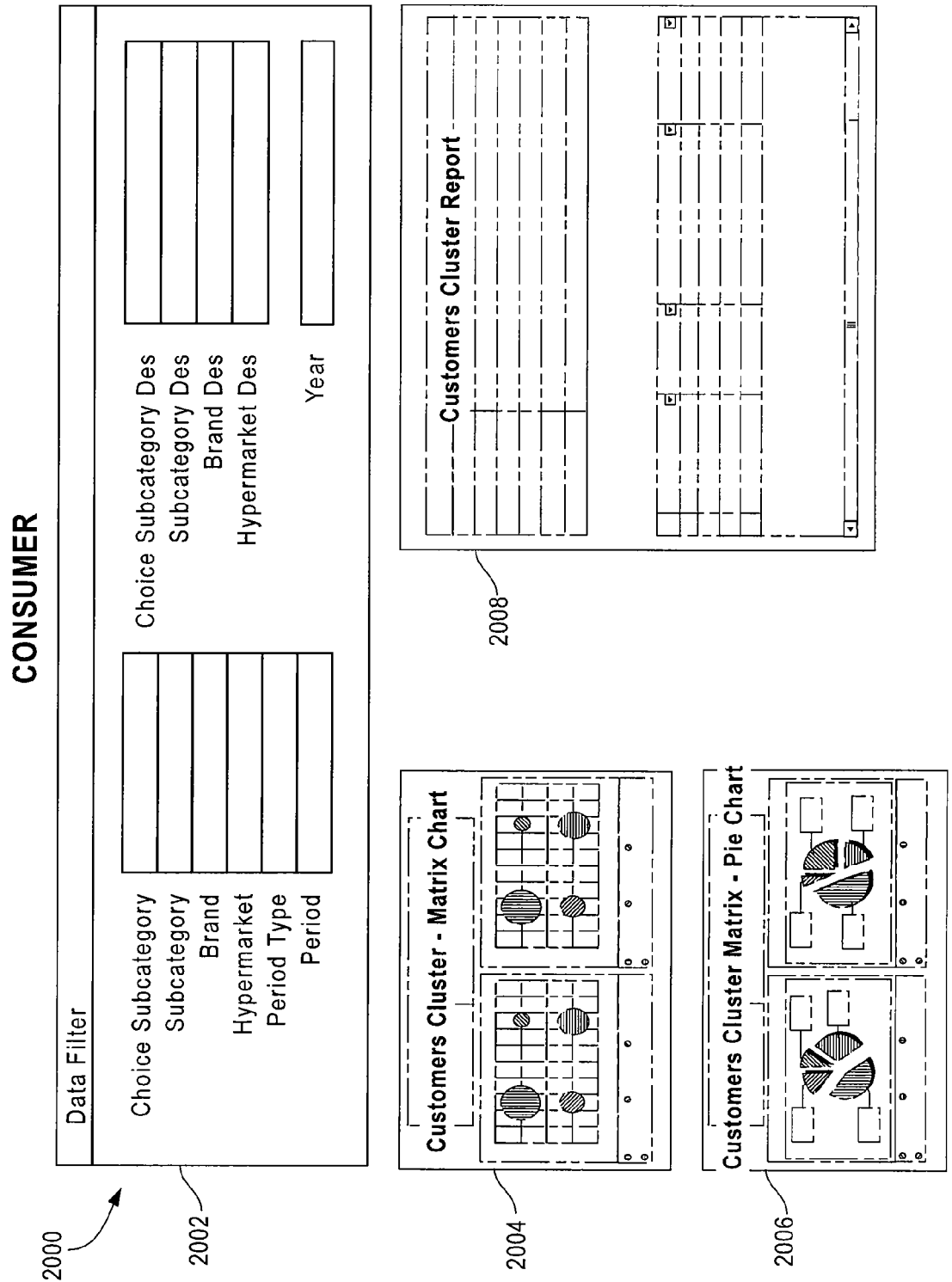

Because the user input interfaces 1802 and 1902 are the same, and the data tables 1806 and 1906 are the same, alternatively to what is shown in FIGS. 18 and 19, one screen display may be used to display both graphical reports 1804 and 1904, such as depicted in FIGS. 15 and 20.

Shopper Analysis

As suggested by the name, the current analysis is used to track shopper behavior. This set of analysis uses the Retailer Loyalty cards as Data Source and for this reason it contains also competitors' data. This kind of data is usually very detailed: product data are available up to EAN level, while customer data contains information up to store level.

Shopper analysis is composed of many different sub processes:
 Customer Cluster Matrix
 Customer Segmentation by Brand
 Sub Category Customer Segmentation Shopper Analysis Customer Cluster Matrix This analysis is used to explore shopper behavior and it is performed per Cluster of Customers.

FIGS. 20, 20a and 20b show an exemplary screen display 2000 for a parametric filter user interface 2002, a first graphical report 2004, a second graphical report 2006, and an analytical result data table 2008, respectively, for the shopper analysis per customer clusters. As shown in FIG. 20, the analysis requires filling up in the user input interface 2002 the following groups of filters:
 Select Sub Category
 Sub Category
 Store Information (different kind of information about the considered store)
 Brand Distribution
 Period Type (week, month or year)
 Period (Timing)

The following table contains dimensions and measures about the described report.

TABLE 11

| DIMENSIONS | MEASURES |
| --- | --- |
| Store Information | Number of Customer per Cluster CP |
| Cluster Type | Number of Customer per Cluster PP |
| Cluster | Number of Customer per Cluster CP % |
|  | Brand Sales Value CP |
|  | Brand Sales Value CP % |

The current analysis uses different Cluster of Customer created mixing Customer Loyalty Index and Customer Value:
 Cluster LL: Low Value—Low Loyalty.
 Cluster HL: High Value—Low Loyalty.
 Cluster LH: Low Value—High Loyalty.
 Cluster HH: High Value—High Loyalty.

The user input interface 2002 is used to show the selection page to set filter information about the extraction to run.

The first graphical report 2004 is used to show graphically the results with a bubble chart where the number of customer per cluster are expressed in relation of the customer value and his Loyalty Index. Two charts are needed to compare results between current and prior period.

The second graphical report 2006 is used to show graphically the results with a pie chart containing information about Customer per Cluster and with another pie chart containing information about Sales Value per Cluster for a specific Brand.

The data table 2008 is used to show in table the same results shown graphically in the first and second graphical reports 2004 and 2006.

Alternatively to what is shown, two separate screen displays may be used to show this report with each screen display including one of the two graphical reports 2004 and 2006 displayed with the user input interface 2002 and the data table 2008.

Shopper Analysis

Customer Segmentation by Brand

This analysis is used to explore shopper behavior and it is performed per Cluster of Customers. Consumer Segmentation allows manufacturers to improve their ability to define strategic intent in terms of resource allocation and investments.

The analysis requires filling up the following groups of filters:
 Select Sub Category
 Sub Category
 Store Information (different kind of information about the considered store)
 Cluster
 Period Type (week, month or year)
 Period (Timing)

The following table contains dimensions and measures about the described report.

TABLE 12

| DIMENSIONS | MEASURES |
| --- | --- |
| Period | First Criterion |
| Store Information | Second Criterion |

TABLE 12-continued

| DIMENSIONS | MEASURES |
| --- | --- |
| Subcategory | Customers Numeric Distribution - Subcategory |
| Brand | Customers Numeric Distribution - Brand |

The current analysis uses different Cluster of Customer created mixing Customer Loyalty Index and Customer Value:
Cluster LL: Low Value—Low Loyalty.
Cluster HL: High Value—Low Loyalty.
Cluster LH: Low Value—High Loyalty.
Cluster HH: High Value—High Loyalty.
No Figures are shown for this analysis.

Shopper Analysis

Sub Category Customer Segmentation

This analysis is used to explore shopper behavior at category level.

Figure 21A:
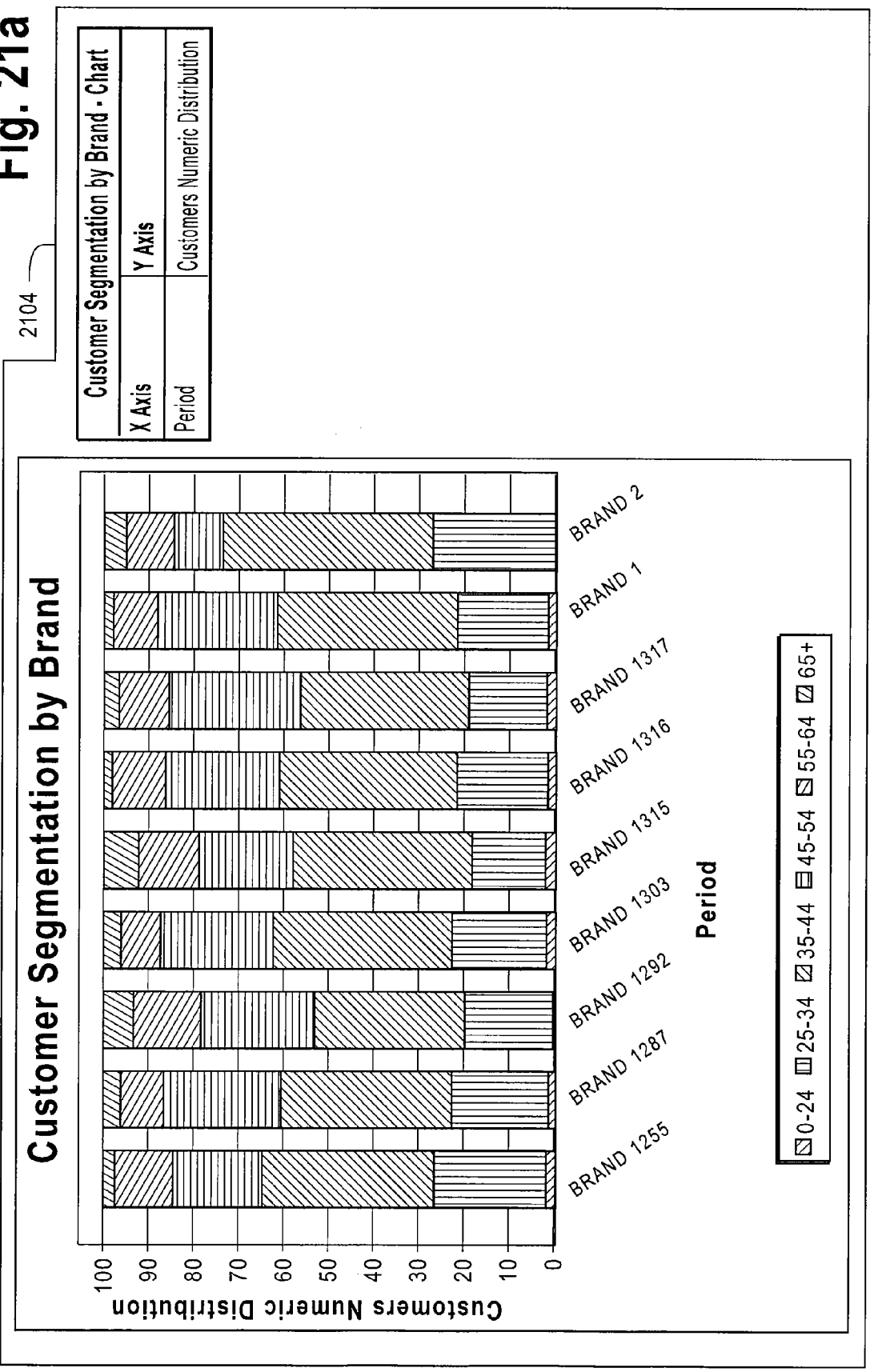
Figure 22:
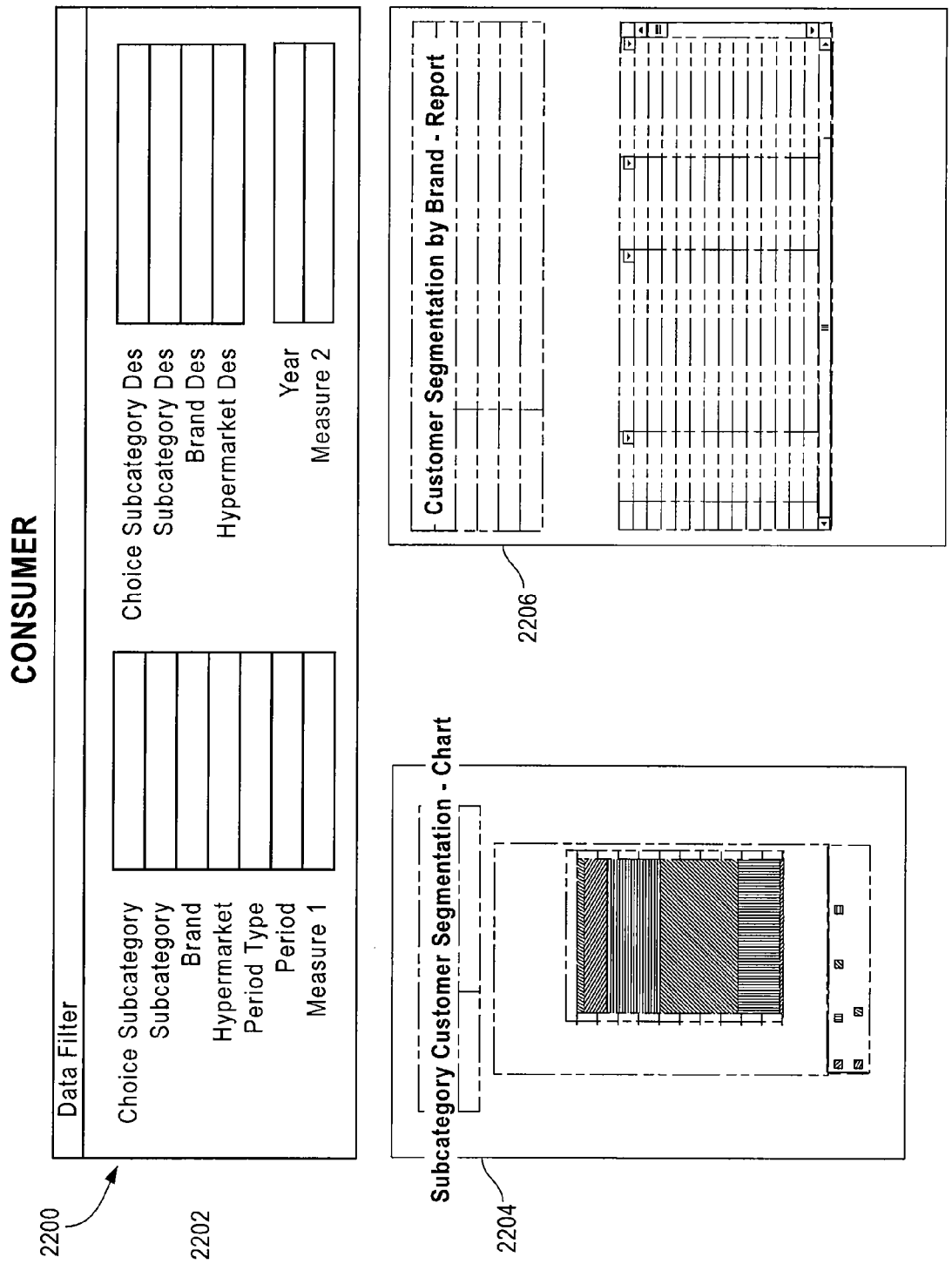
Figure 22A:
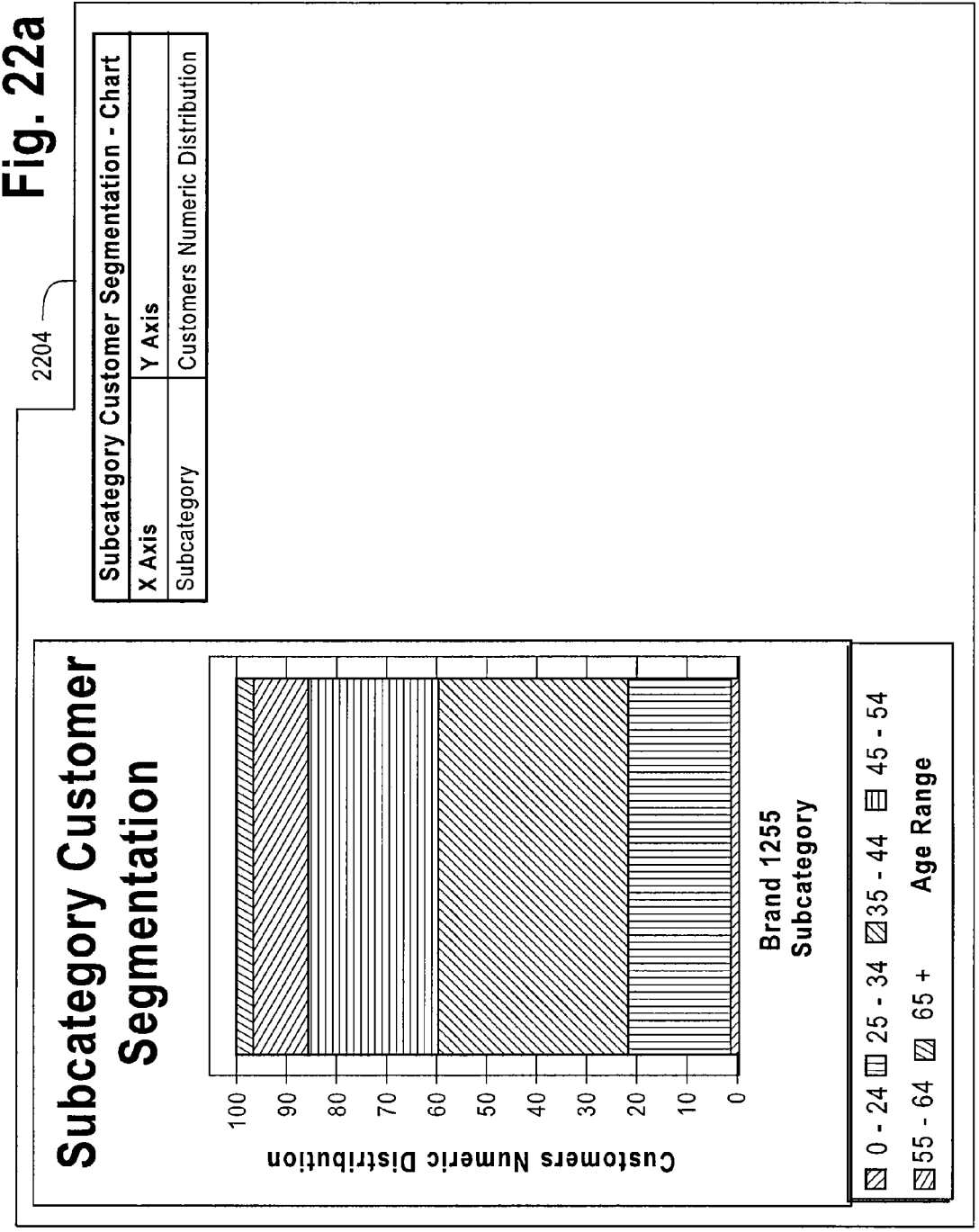

FIGS. 21, 21a, 21b, 22, 22a and 22b show exemplary screen displays 2100 and 2200 for a parametric filter user interface 2102 and 2202, a graphical report 2104 and 2204, and an analytical result data table 2106 and 2206, respectively, for the shopper analysis for customer cluster segmentation. As shown in FIGS. 21 and 22, the analysis requires filling up in the user input interface 2102 and 2202 the following groups of filters:
Select Sub Category
Sub Category
Store Information (different kind of information about the considered store)
Comparison Criteria
Period Type (week, month or year)
Period (Timing)

The following table contains dimensions and measures about the described report.

TABLE 13

| DIMENSIONS | MEASURES |
| --- | --- |
| Time | % of Customer per Brand |
| Store Information | % of Customer per Category |
| Category | |
| Brand | |

The user input interface 2102 and 2202 is used to show the selection page to set filter information about the extraction to run.

The graphical reports 2104 and 2204 are used to show graphically the results with a comparison at brand and category level, on the different segment of customers based on their age. The graphical report 2104 includes a chart that shows results at Brand level while the graphical report 2204 includes a chart that shows results at the category or subcategory level.

The data tables 2106 and 2206 are is used to show in table the same results shown graphically in the graphical reports 2104 and 2204.

Because the user input interfaces 2102 and 2202 are the same, and the data tables 2106 and 2206 are the same, alternatively to what is shown in FIGS. 21 and 22, one screen display may be used to display both graphical reports 2104 and 2204, such as depicted in FIGS. 15 and 20.

Consumer Analysis

As suggested by the name, the current analysis is used to track consumer behavior. This set of analysis uses different External Data Providers and for this reason it contains also competitors' data. This kind of data is usually very detailed: product data are available up to EAN level, while customer data contains information up to store level. There are different methods to collect data from the consumer, depending on the target data to collect. Many are the Institute available on the market and each one is specialized on one or more than one method, performing data collection with different degrees of innovation for the used technologies.

There are several different methods used to collect data from the consumer. (1) Family Interview: an employee of the External Data Provider Institute interviews the different components of the families to collect information about consumed goods in the last specific period. In this case the analysis on the results will be more approximated and aggregation data will be usually stopped at Category—Brand/Banner level. (2) Family Diary: the External Data Provider Institute supplies to the family representative a diary to fill up, basing on the goods consumed by family component. In this case the analysis on the results will be pretty approximated and aggregation data will be usually stopped at Category—Brand/Banner level. Consumes will be register as average value for each family component. (3) Family Diary: the External Data Provider Institute supplies a PDA to each family component to record information about consumed goods. In this case the analysis on the results will be more precise and aggregation data will be usually stopped at EAN/Store level. Consumes will be register as exact value for each consumed good.

Given the target of the analysis performed, Consumer and Shopper analysis usually use the same analytics. The most important difference between Shopper and Consumer analysis is the Data Provider: in fact, while for the Shopper analysis data coming from the Loyalty Card, in the case of the Consumer Analysis data coming from External Data Providers. Thus, in the first case analysis is performed on the purchased goods, while in the second case the analysis is performed on the consumed goods. For this reason, the sub-processes and the analytics listed above for the shopper analysis can be used also for the Consumer Analysis, changing the data provider.

It is therefore intended that the foregoing detailed description be regarded as illustrative rather than limiting, and it should be understood that the following claims, including all equivalents, are intended to define the spirit and scope of this invention.

We claim:

1. A data processing system for analyzing shopper packaged goods retail sales data comprising:
   a processor;
   a data integration interface for receiving market and sales data from a plurality of data collection source systems external to a company and sales and shipment data from a data collection system internal to the company;
   a data integration component coupled with the data integration interface for transforming the received data into a unified, harmonized master data set;
   a unified master data store for receiving and storing said unified, harmonized master data set;
   a plurality of analysis modules for analyzing, via the processor, data in the unified master data store, the plurality of analysis modules including a market insight module comprising a plurality of analysis components comprising product analysis, brand analysis, shopper analysis and consumer analysis for analyzing said data, wherein the shopper analysis component is configured for analyzing data in the unified master data store based on the dimensions of period or time, store information, category, sub-category and brand to determine customer numeric distribution of product categories, product brands, and product brand subcategories sold by the company, the customer numeric distribution divided by customer age segments;

a database for storing a library of key performance indicators and business rules in communication with the plurality of analysis components;

a user interface component associated with each of the plurality of analysis components; the user interface presenting, via the processor, input fields for data filters to be input to the plurality of analysis components, said input data defining the filters applied to the generated report, wherein the user interface for the shopper analysis component includes at least one display area comprising:

a data filter user interface area for receiving user filter inputs, where the user filter inputs filter the shopper analysis of the company generated by the shopper analysis component, where categories of the user filter input comprise choice subcategory, subcategory, brand, hypermarket, period type, period, year, and measures, where the measures comprise percentage of customers per brand and percentage of customers per category;

a data filter description display area for describing received user filter inputs, where categories of user filter input descriptions comprise a choice subcategory description, a subcategory description, a brand description, and a hypermarket description;

a graphical display for graphically displaying the shopper sis of the company comprising:

a graphical display area below the data filter user interface area and the data filter description area; the graphical display area comprising a bar chart with a vertical axis representing customer numeric distribution percentages and a horizontal axis divided into multiple columns, each column identifying a product brand; wherein each column spans from a percentage of customer numeric distribution value of zero to a percentage of customer numeric distribution value of one hundred, wherein each column of data is divided into customer age segment portions, each customer age segment portion representing the percentage of sales of the product brand to the customer age segment, wherein the customer age segment portions are differentiated from one another with visibly distinguishable indicia; and a report area for displaying the shopper analysis of the company in tabular form, the report area positioned adjacent to the graphical display area and below the data filter user interface area and the data filter description area, the report area comprising:

a chart area listing dimensions and corresponding measures displayed in the report area, wherein the dimensions comprise period, store information, subcategory, and brand; and a table area displaying the period, the hypermarket, the subcategory description, the brand, the customer age segment, and the customer numeric distribution percentage for each of the customer age segments for each of the brands; and a reporting component for generating reports illustrating the analyses in a plurality of dimensions and a plurality of measures.

2. The data processing system of claim 1 wherein the reporting component is configured to provide reports for a plurality of information channels including web access, automated e-mail distribution and automated board packs.

3. The data processing system of claim 1 further comprising:

an alert and audit engine in communication with the plurality of analysis modules; and an alert presentation component for displaying alerts generated by the alert and audit engine when said one of the plurality of analysis modules calculates a measure that exceeds a predetermined threshold.

4. The data processing system of claim 1 wherein the analysis components are configured to apply the business rules to the received data to calculate predetermined key performance indicators associated with the analysis component.

5. The data processing system of claim 1, wherein the data integration component comprises a merge and aggregation module for receiving shipment and consumption data and creating a unique repository of shopper and consumer data.

6. The data processing system of claim 5, wherein the data integration component comprises a transcoding and integration module for receiving external and Internal Master Data and creating said unified, harmonized master data set.

7. The data processing system of claim 1, wherein the user interface presentation module associated with the plurality of modules includes input fields for receiving filters for product hierarchy level, store information, interval period, and date range.

8. The data processing system of claim 1, wherein the product analysis component operates only on the data internal to the company comprising sales data associated with a selected product, but no data external to the company comprising competitor data; the brand analysis component operates on the data internal to the company comprising sales data associated with a selected brand and data external to the company comprising competitor data associated with a competitor brand; the shopper analysis component operates on data external to the company comprising sales data collected from a retailer loyalty card program and data external to the company comprising sales data associated with competitor products; and the consumer analysis; operates only on data external to the company.

9. The data processing system of claim 8, wherein the plurality of analysis modules further comprise a logistics module, a supply chain module, a sales module, a sales force module, a promotion module, a market insight module, and a customer module operative coupled for analyzing predetermined portions the unified data sets.

10. A method of analyzing data for shopper packaged goods sales data of a company and consumer data comprising:

through a processor:

receiving data internal to the company, the data comprising master sales data associated with products and shipment data associated with products;

receiving data external to the company, the data comprising sales data from retailers and consumer research companies;

merging and aggregating the internal data comprising the shipment data and the external data comprising the consumer research data to create a merged data set;

transcoding and integrating the internal master data and the external sales data from retailers to create a unified master data set;

storing the unified master sales data in a data store;

selecting a data analysis to be performed, said data analysis selected from the group consisting of product analysis, brand analysis, shopper analysis and consumer analysis;

receiving selected parameters from input fields of a user interface associated with the selected data analysis for restricting the analysis of data;

retrieving a set of business rules and key performance indicators associated with the selected data analysis;

for each selected data analysis, analyzing portions of the merged data set and the unified master sales data across the selected parameters in accordance with the retrieved business rules to calculate values for the retrieved key performance indicators, wherein the shopper analysis comprises analyzing the portions of the merged data set and the unified master sales data based on the dimensions of period or time, store information, category, subcategory and brand to determine customer numeric distribution of product categories, product brands, and product brand subcategories sold by the company, the customer numeric distribution divided by customer age segments;

generating a report illustrating the analysis in a plurality of dimensions and for a plurality of measures; and displaying the report illustrating the analysis, where the display of the report illustrating the shopper analysis includes a user interface, where the user interface includes at least one display area comprising:

a data filter user interface area for receiving user filter inputs, where the user filter inputs filter the shopper analysis, where categories of the user filter input comprise choice subcategory, subcategory, brand, hypermarket, period type, period, year, and measures, where the measures comprise percentage of customers per brand and percentage of customers per category;

a data filter description display area for describing received user filter inputs, where categories of user filter input descriptions comprise a choice subcategory description, a subcategory description, a brand description, and a hypermarket description;

a graphical display for graphically displaying the shopper analysis comprising:

a graphical display area below the data filter user interface area and the data filter description area; the graphical display area comprising a bar chart with a vertical axis representing customer numeric distribution percentages and a horizontal axis divided into multiple columns, each column identifying a product brand; wherein each column spans from a percentage of customer numeric distribution value of zero to a percentage of customer numeric distribution value of one hundred, wherein each column of data is divided into customer age segment portions, each customer age segment portion representing the percentage of sales of the product brand to the customer age segment, wherein the customer age segment portions are differentiated from one another with visibly distinguishable indicia; and a report area for displaying the shopper analysis in tabular form, the report area positioned adjacent to the graphical display area and below the data filter user interface area and the data filter description area, the report area comprising:

a chart area listing dimensions and corresponding measures displayed in the report area, wherein the dimensions comprise period, store information, subcategory, and brand; and a table area displaying the period, the hypermarket, the subcategory description, the brand, the customer age segment, and the customer numeric distribution percentage for each of the customer age segments for each of the brands.

11. The method of claim 10, further comprising providing the report in a plurality of information channels including web access, automated e-mail distribution and automated board packs.

12. The method of claim 10, further comprising displaying alerts generated when a calculated value for a key performance indicator exceeds a predetermined threshold.

13. The method of claim 10, further comprising selecting a portion of the data sets associated with the selected parameters for product hierarchy level, store information, interval period, and date range.

14. The method of claim 10, wherein generating a report comprises creating a graphical representation of the calculated values of the key performance measures.

15. The method of claim 14, wherein generating a report further comprises generating a plurality of graphical representations displayed in a single view of four quadrants of a display.

16. The method of claim 10, wherein:

the product analysis operates only on the data internal to the company comprising sales data associated with a selected product, but no data external to the company comprising competitor data;

the brand analysis operates on the data internal to the company comprising sales data associated with a selected brand and data external to the company comprising competitor data associated with a competitor brand;

the shopper analysis operates on data external to the company comprising sales data collected from a retailer loyalty card program and data external to the company comprising sales data associated with competitor products; and the consumer analysis, operates only on data external to the company.

* * * * *

UNITED STATES PATENT AND TRADEMARK OFFICE
CERTIFICATE OF CORRECTION

| | | |
|---|---|---|
| PATENT NO. | : 8,306,845 B2 | |
| APPLICATION NO. | : 12/406542 | |
| DATED | : November 6, 2012 | |
| INVENTOR(S) | : Angelo D'Imporzano et al. | |

It is certified that error appears in the above-identified patent and that said Letters Patent is hereby corrected as shown below:

In column 25, claim 1, line 36, before "of the company comprising:" replace "sis" with --analysis--.

Signed and Sealed this
Fifteenth Day of January, 2013

David J. Kappos
*Director of the United States Patent and Trademark Office*